(12) United States Patent
Hendricks et al.

(10) Patent No.: US 9,099,097 B2
(45) Date of Patent: *Aug. 4, 2015

(54) ELECTRONIC BOOK WITH VOICE EMULATION FEATURES

(71) Applicant: ADREA, LLC, Sunnyvale, CA (US)

(72) Inventors: John S. Hendricks, Potomac, MD (US); Michael L. Asmussen, Herndon, VA (US)

(73) Assignee: ADREA, LLC, Sunnyvale, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 13/757,409

(22) Filed: Feb. 1, 2013

(65) Prior Publication Data

US 2013/0191131 A1    Jul. 25, 2013

Related U.S. Application Data

(60) Continuation of application No. 13/298,898, filed on Nov. 17, 2011, which is a division of application No. 09/344,499, filed on Jun. 25, 1999, now Pat. No. 8,073,695.

(51) Int. Cl.
*G10L 15/00* (2013.01)
*G10L 21/06* (2013.01)
(Continued)

(52) U.S. Cl.
CPC .............. *G10L 21/06* (2013.01); *G09B 5/065* (2013.01); *G06F 1/1613* (2013.01)

(58) Field of Classification Search
CPC ............................. G10L 15/00; G06F 1/1613
USPC ............................ 704/235, 260, 275; 715/776
See application file for complete search history.

(56) References Cited

U.S. PATENT DOCUMENTS

| 3,860,873 | A | 1/1975 | Ringstad |
| 3,891,792 | A | 6/1975 | Kimura |

(Continued)

FOREIGN PATENT DOCUMENTS

| CA | 2044574 | 12/1992 |
| CA | 2257659 | 11/1993 |

(Continued)

OTHER PUBLICATIONS

"A Survey and Classification of Hypertext Documentation Systems," Boyle, C. et al.; *IEEE Transactions on Professional Communication*; IEEE Inc.; New York; vol. 35, No. 2; Jun. 1, 1992, pp. 98-111.

(Continued)

*Primary Examiner* — Daniel Abebe
(74) *Attorney, Agent, or Firm* — Arent Fox LLP

(57) ABSTRACT

A method and system for providing text-to-audio conversion of an electronic book displayed on a viewer. A user selects a portion of displayed text and converts it into audio. The text-to-audio conversion may be performed via a header file and pre-recorded audio for each electronic book, via text-to-speech conversion, or other available means. The user may select manual or automatic text-to audio conversion. The automatic text-to-audio conversion may be performed by automatically turning the pages of the electronic book or by the user manually turning the pages. The user may also select to convert the entire electronic book, or portions of it, into audio. The user may also select an option to receive an audio definition of a particular word in the electronic book. The present invention allows a user to control the system by selecting options from a screen or by entering voice commands.

12 Claims, 48 Drawing Sheets

(51) Int. Cl.
*G09B 5/06* (2006.01)
*G06F 1/16* (2006.01)

(56) References Cited

U.S. PATENT DOCUMENTS

| | | |
|---|---|---|
| 3,978,470 A | 8/1976 | McGuire |
| 4,023,408 A | 5/1977 | Ryan et al. |
| 4,071,697 A | 1/1978 | Bushnell et al. |
| 4,159,417 A | 6/1979 | Rubincam |
| 4,160,242 A | 7/1979 | Fowler |
| 4,179,212 A | 12/1979 | Lahr |
| 4,197,590 A | 4/1980 | Sukonick et al. |
| 4,272,819 A | 6/1981 | Katsumata et al. |
| 4,298,793 A | 11/1981 | Melis et al. |
| 4,302,193 A | 11/1981 | Haynes |
| 4,361,848 A | 11/1982 | Poigner et al. |
| 4,381,522 A | 4/1983 | Lambert |
| 4,398,216 A | 8/1983 | Field et al. |
| 4,405,829 A | 9/1983 | Rivest et al. |
| 4,406,626 A | 9/1983 | Anderson et al. |
| 4,429,385 A | 1/1984 | Cichelli et al. |
| 4,455,570 A | 6/1984 | Saeki et al. |
| 4,484,217 A | 11/1984 | Block et al. |
| 4,488,179 A | 12/1984 | Kruger et al. |
| 4,513,390 A | 4/1985 | Walter et al. |
| 4,517,598 A | 5/1985 | Van Valkenburg et al. |
| 4,528,589 A | 7/1985 | Block et al. |
| 4,528,643 A | 7/1985 | Freeny, Jr. |
| 4,532,540 A | 7/1985 | Wine |
| 4,533,948 A | 8/1985 | McNamara et al. |
| 4,546,382 A | 10/1985 | McKenna et al. |
| 4,567,512 A | 1/1986 | Abraham |
| 4,578,531 A | 3/1986 | Everhart et al. |
| 4,579,533 A | 4/1986 | Anderson et al. |
| 4,587,520 A | 5/1986 | Astle |
| 4,602,279 A | 7/1986 | Freeman et al. |
| 4,604,710 A | 8/1986 | Amezcua et al. |
| 4,605,964 A | 8/1986 | Chard |
| 4,613,901 A | 9/1986 | Gilhousen et al. |
| 4,616,263 A | 10/1986 | Eichelberger |
| 4,621,282 A | 11/1986 | Ahern |
| 4,623,920 A | 11/1986 | Dufresne et al. |
| 4,625,076 A | 11/1986 | Okamoto et al. |
| 4,625,235 A | 11/1986 | Watson |
| 4,633,462 A | 12/1986 | Stifle et al. |
| 4,639,225 A | 1/1987 | Washizuka |
| 4,644,470 A | 2/1987 | Feigenbaum et al. |
| 4,653,100 A | 3/1987 | Barnett et al. |
| 4,668,218 A | 5/1987 | Virtanen |
| 4,673,976 A | 6/1987 | Wreford-Howard |
| 4,688,218 A | 8/1987 | Blineau et al. |
| 4,688,246 A | 8/1987 | Eilers et al. |
| 4,694,483 A | 9/1987 | Cheung |
| 4,694,490 A | 9/1987 | Harvey et al. |
| 4,697,209 A | 9/1987 | Kiewit et al. |
| 4,706,121 A | 11/1987 | Young |
| 4,712,105 A | 12/1987 | Kohler |
| 4,712,130 A | 12/1987 | Casey |
| 4,716,543 A | 12/1987 | Ogawa et al. |
| 4,724,491 A | 2/1988 | Lambert |
| 4,731,840 A | 3/1988 | Mniszewski et al. |
| 4,739,510 A | 4/1988 | Jeffers et al. |
| 4,742,543 A | 5/1988 | Frederiksen |
| 4,751,578 A | 6/1988 | Reiter et al. |
| 4,768,087 A | 8/1988 | Taub et al. |
| 4,774,655 A | 9/1988 | Kollin et al. |
| 4,776,011 A | 10/1988 | Busby |
| 4,792,972 A | 12/1988 | Cook, Jr. |
| 4,796,220 A | 1/1989 | Wolfe |
| 4,805,014 A | 2/1989 | Sahara et al. |
| 4,816,901 A | 3/1989 | Music et al. |
| 4,816,904 A | 3/1989 | McKenna et al. |
| 4,820,167 A | 4/1989 | Nobles et al. |
| D301,037 S | 5/1989 | Matsuda |
| 4,829,372 A | 5/1989 | McCalley et al. |
| 4,829,558 A | 5/1989 | Welsh |
| 4,829,569 A | 5/1989 | Seth-Smith et al. |
| 4,835,607 A | 5/1989 | Keith |
| 4,854,878 A | 8/1989 | Malvino |
| 4,855,725 A | 8/1989 | Fernandez |
| 4,860,379 A | 8/1989 | Schoeneberger et al. |
| 4,866,770 A | 9/1989 | Seth-Smith |
| 4,868,866 A | 9/1989 | Williams, Jr. |
| 4,876,736 A | 10/1989 | Kiewit |
| 4,885,803 A | 12/1989 | Hermann et al. |
| 4,890,319 A | 12/1989 | Seth-Smith et al. |
| 4,890,321 A | 12/1989 | Seth-Smith |
| 4,891,838 A | 1/1990 | Faber |
| 4,899,292 A | 2/1990 | Montagna |
| 4,920,432 A | 4/1990 | Eggers et al. |
| 4,924,378 A | 5/1990 | Hershey et al. |
| 4,924,513 A | 5/1990 | Herbison et al. |
| 4,928,168 A | 5/1990 | Iwashita |
| 4,928,177 A | 5/1990 | Martinez |
| 4,930,160 A | 5/1990 | Vogel |
| 4,941,089 A | 7/1990 | Fischer |
| 4,941,125 A | 7/1990 | Boyne |
| 4,947,244 A | 8/1990 | Fenwick et al. |
| 4,947,429 A | 8/1990 | Bestler et al. |
| 4,949,187 A | 8/1990 | Cohen |
| 4,959,810 A | 9/1990 | Darbee et al. |
| 4,961,109 A | 10/1990 | Tanaka |
| 4,965,819 A | 10/1990 | Kannes |
| 4,965,825 A | 10/1990 | Harvey et al. |
| 4,975,951 A | 12/1990 | Bennett |
| 4,977,455 A | 12/1990 | Young |
| 4,982,344 A | 1/1991 | Jordan |
| 4,985,697 A | 1/1991 | Boulton |
| D314,383 S | 2/1991 | Hafner |
| 4,995,078 A | 2/1991 | Monslow et al. |
| 4,996,597 A | 2/1991 | Duffield |
| 5,001,554 A | 3/1991 | Johnson et al. |
| 5,003,384 A | 3/1991 | Durden et al. |
| 5,003,591 A | 3/1991 | Kauffman et al. |
| 5,010,499 A | 4/1991 | Yee |
| 5,014,125 A | 5/1991 | Pocock et al. |
| 5,014,234 A | 5/1991 | Edwards, Jr. |
| 5,015,829 A | 5/1991 | Eilert et al. |
| 5,020,129 A | 5/1991 | Martin et al. |
| 5,027,400 A | 6/1991 | Baji et al. |
| 5,036,394 A | 7/1991 | Morii |
| 5,036,537 A | 7/1991 | Jeffers et al. |
| 5,038,402 A | 8/1991 | Robbins |
| 5,046,093 A | 9/1991 | Wachob |
| 5,047,867 A | 9/1991 | Strubbe et al. |
| 5,049,862 A | 9/1991 | Dao |
| 5,049,990 A | 9/1991 | Kondo et al. |
| 5,054,984 A | 10/1991 | Chan et al. |
| 5,056,138 A | 10/1991 | Tyson, Sr. |
| 5,057,917 A | 10/1991 | Shalkauser et al. |
| 5,073,930 A | 12/1991 | Green et al. |
| 5,075,771 A | 12/1991 | Hashimoto |
| 5,077,607 A | 12/1991 | Johnson et al. |
| 5,078,019 A | 1/1992 | Aoki |
| 5,089,956 A | 2/1992 | MacPhail |
| 5,091,782 A | 2/1992 | Krause et al. |
| 5,093,718 A | 3/1992 | Hoarty et al. |
| 5,099,319 A | 3/1992 | Esch et al. |
| 5,099,331 A | 3/1992 | Truong |
| D325,581 S | 4/1992 | Schwartz |
| 5,103,314 A | 4/1992 | Keenan |
| 5,105,268 A | 4/1992 | Yamanouchi et al. |
| 5,109,413 A | 4/1992 | Comerford et al. |
| D326,446 S | 5/1992 | Wong |
| 5,115,426 A | 5/1992 | Spanke |
| 5,121,476 A | 6/1992 | Yee |
| 5,124,980 A | 6/1992 | Maki |
| 5,128,662 A | 7/1992 | Failla |
| 5,130,792 A | 7/1992 | Tindell et al. |
| 5,130,924 A | 7/1992 | Barker et al. |
| 5,132,789 A | 7/1992 | Ammon et al. |
| 5,132,992 A | 7/1992 | Yurt et al. |
| 5,133,079 A | 7/1992 | Ballantyne et al. |
| 5,140,419 A | 8/1992 | Galumbeck et al. |

(56) References Cited

U.S. PATENT DOCUMENTS

| | | |
|---|---|---|
| D329,238 S | 9/1992 | Grasso et al. |
| 5,144,663 A | 9/1992 | Kudelski et al. |
| 5,144,665 A | 9/1992 | Takaragi et al. |
| 5,146,552 A | 9/1992 | Cassorla et al. |
| 5,146,600 A | 9/1992 | Sugiura |
| 5,150,118 A | 9/1992 | Finkle |
| 5,151,782 A | 9/1992 | Ferraro |
| 5,151,789 A | 9/1992 | Young |
| 5,152,011 A | 9/1992 | Schwob |
| 5,155,590 A | 10/1992 | Beyers, II et al. |
| 5,155,591 A | 10/1992 | Wachob |
| 5,157,783 A | 10/1992 | Anderson |
| 5,159,452 A | 10/1992 | Kinoshita et al. |
| 5,159,669 A | 10/1992 | Trigg et al. |
| 5,166,886 A | 11/1992 | Molnar et al. |
| D331,760 S | 12/1992 | Renk, Jr. |
| 5,172,413 A | 12/1992 | Bradley et al. |
| 5,173,051 A | 12/1992 | May et al. |
| 5,182,639 A | 1/1993 | Jutamulia et al. |
| 5,185,667 A | 2/1993 | Zimmermann et al. |
| 5,195,181 A | 3/1993 | Bryant et al. |
| 5,199,104 A * | 3/1993 | Hirayama ............ 715/776 |
| 5,202,817 A | 4/1993 | Koenck et al. |
| 5,204,947 A | 4/1993 | Bernstein et al. |
| 5,206,722 A | 4/1993 | Kwan |
| 5,206,929 A | 4/1993 | Langford et al. |
| 5,206,954 A | 4/1993 | Inoue et al. |
| 5,208,665 A | 5/1993 | McCalley et al. |
| 5,208,745 A | 5/1993 | Quentin et al. |
| 5,210,611 A | 5/1993 | Yee et al. |
| 5,212,553 A | 5/1993 | Maruoka |
| 5,216,515 A | 6/1993 | Steele et al. |
| 5,220,438 A | 6/1993 | Yamamoto |
| 5,220,649 A | 6/1993 | Forcier |
| 5,221,962 A | 6/1993 | Backus et al. |
| 5,222,136 A | 6/1993 | Rasmussen et al. |
| 5,223,924 A | 6/1993 | Strubbe |
| 5,231,631 A | 7/1993 | Buhrke |
| 5,233,333 A | 8/1993 | Borsuk |
| 5,235,419 A | 8/1993 | Krause et al. |
| 5,235,619 A | 8/1993 | Beyers et al. |
| 5,235,680 A | 8/1993 | Bijnagte |
| 5,237,311 A | 8/1993 | Mailey et al. |
| 5,237,610 A | 8/1993 | Gammie et al. |
| 5,237,614 A | 8/1993 | Weiss |
| 5,239,665 A * | 8/1993 | Tsuchiya ............ 715/776 |
| 5,241,671 A | 8/1993 | Reed et al. |
| 5,247,347 A | 9/1993 | Litteral et al. |
| 5,247,575 A | 9/1993 | Sprague et al. |
| 5,251,324 A | 10/1993 | McMullan |
| 5,253,066 A | 10/1993 | Vogel |
| 5,253,275 A | 10/1993 | Yurt et al. |
| 5,253,341 A | 10/1993 | Rozmanith et al. |
| 5,256,067 A | 10/1993 | Gildea |
| 5,257,185 A | 10/1993 | Farley et al. |
| 5,260,778 A | 11/1993 | Kauffman et al. |
| 5,260,788 A | 11/1993 | Takano et al. |
| 5,262,875 A | 11/1993 | Mincer et al. |
| 5,282,028 A | 1/1994 | Johnson et al. |
| 5,283,639 A | 2/1994 | Esch et al. |
| 5,285,272 A | 2/1994 | Bradley et al. |
| 5,289,271 A | 2/1994 | Watson |
| 5,289,288 A | 2/1994 | Silverman et al. |
| 5,291,554 A | 3/1994 | Morales |
| 5,293,540 A | 3/1994 | Trani et al. |
| 5,293,633 A | 3/1994 | Robbins |
| 5,301,172 A | 4/1994 | Richards et al. |
| D346,620 S | 5/1994 | McSorley |
| 5,315,711 A | 5/1994 | Barone et al. |
| 5,318,450 A | 6/1994 | Carver |
| 5,319,454 A | 6/1994 | Schutte |
| 5,319,455 A | 6/1994 | Hoarty et al. |
| 5,319,542 A | 6/1994 | King et al. |
| 5,319,649 A | 6/1994 | Raghavan et al. |
| 5,319,707 A | 6/1994 | Wasilewski et al. |
| 5,321,846 A | 6/1994 | Yokota et al. |
| 5,323,240 A | 6/1994 | Amano et al. |
| 5,327,554 A | 7/1994 | Palazzi, III et al. |
| 5,329,590 A | 7/1994 | Pond |
| D349,923 S | 8/1994 | Billings et al. |
| 5,339,091 A | 8/1994 | Yamazaki et al. |
| 5,339,239 A | 8/1994 | Manabe et al. |
| 5,339,315 A | 8/1994 | Maeda et al. |
| 5,341,166 A | 8/1994 | Garr et al. |
| 5,341,425 A | 8/1994 | Wasilewski et al. |
| 5,341,426 A | 8/1994 | Barney et al. |
| 5,341,474 A | 8/1994 | Gelman et al. |
| 5,343,239 A | 8/1994 | Lappington |
| 5,343,516 A | 8/1994 | Callele et al. |
| 5,345,580 A | 9/1994 | Tamaru et al. |
| 5,345,594 A | 9/1994 | Tsuda |
| 5,349,638 A | 9/1994 | Pitroda et al. |
| 5,351,075 A | 9/1994 | Herz et al. |
| 5,353,121 A | 10/1994 | Young et al. |
| 5,355,162 A | 10/1994 | Yazolino et al. |
| 5,357,276 A | 10/1994 | Banker et al. |
| 5,365,265 A | 11/1994 | Shibata et al. |
| 5,365,434 A | 11/1994 | Figliuzzi |
| 5,367,330 A | 11/1994 | Haave et al. |
| 5,367,571 A | 11/1994 | Bowen et al. |
| 5,367,621 A | 11/1994 | Cohen et al. |
| 5,367,643 A | 11/1994 | Chang et al. |
| 5,371,532 A | 12/1994 | Gelman et al. |
| 5,372,507 A | 12/1994 | Goleh |
| 5,373,324 A | 12/1994 | Kuroda et al. |
| 5,375,068 A | 12/1994 | Palmer et al. |
| 5,375,160 A | 12/1994 | Guidon et al. |
| 5,379,057 A | 1/1995 | Clough et al. |
| 5,383,112 A | 1/1995 | Clark |
| 5,384,588 A | 1/1995 | Martin et al. |
| 5,388,101 A | 2/1995 | Dinkins |
| 5,388,196 A | 2/1995 | Pajak et al. |
| 5,390,348 A | 2/1995 | Magin et al. |
| 5,392,387 A | 2/1995 | Fitzpatrick |
| 5,396,546 A | 3/1995 | Remillard |
| 5,400,401 A | 3/1995 | Wasilewski et al. |
| 5,404,393 A | 4/1995 | Remillard |
| 5,404,505 A | 4/1995 | Levinson |
| 5,407,357 A | 4/1995 | Cutler |
| 5,408,258 A | 4/1995 | Kolessar |
| 5,408,465 A | 4/1995 | Gusella et al. |
| 5,410,326 A | 4/1995 | Goldstein |
| 5,410,344 A | 4/1995 | Graves et al. |
| 5,410,692 A | 4/1995 | Torres |
| 5,412,416 A | 5/1995 | Nemirofsky |
| 5,414,426 A | 5/1995 | O'Donnell et al. |
| 5,416,508 A | 5/1995 | Sakuma et al. |
| 5,417,575 A | 5/1995 | McTaggart |
| 5,418,559 A | 5/1995 | Blahut |
| 5,418,957 A | 5/1995 | Narayan |
| 5,420,974 A | 5/1995 | Morris et al. |
| 5,424,770 A | 6/1995 | Schmelzer et al. |
| 5,425,102 A | 6/1995 | Moy |
| 5,426,594 A | 6/1995 | Wright et al. |
| 5,428,529 A | 6/1995 | Hartrick et al. |
| 5,432,542 A | 7/1995 | Thibadeau et al. |
| 5,432,561 A | 7/1995 | Strubbe |
| 5,437,552 A | 8/1995 | Baer et al. |
| 5,438,372 A | 8/1995 | Tsumori et al. |
| 5,440,632 A | 8/1995 | Bacon et al. |
| 5,442,390 A | 8/1995 | Hooper et al. |
| 5,442,626 A | 8/1995 | Wei |
| 5,444,853 A | 8/1995 | Lentz |
| 5,446,488 A | 8/1995 | Vogel |
| 5,446,490 A | 8/1995 | Blahut et al. |
| 5,446,919 A | 8/1995 | Wilkins |
| D362,429 S | 9/1995 | Lande et al. |
| 5,453,796 A | 9/1995 | Duffield |
| 5,457,746 A | 10/1995 | Dolphin |
| 5,459,507 A | 10/1995 | Sakuma et al. |
| 5,461,667 A | 10/1995 | Remillard |
| 5,465,213 A | 11/1995 | Ross |
| 5,465,401 A | 11/1995 | Thompson |
| 5,466,158 A | 11/1995 | Smith, III |

(56) References Cited

U.S. PATENT DOCUMENTS

| | | |
|---|---|---|
| 5,467,102 A | 11/1995 | Kuno et al. |
| 5,469,206 A | 11/1995 | Strubbe et al. |
| 5,473,362 A | 12/1995 | Fitzgerald et al. |
| 5,475,398 A | 12/1995 | Yamazaki et al. |
| 5,475,399 A | 12/1995 | Borsuk |
| 5,475,585 A | 12/1995 | Bush |
| 5,475,682 A | 12/1995 | Choudhury |
| 5,477,262 A | 12/1995 | Banker et al. |
| 5,477,263 A | 12/1995 | O'Callaghan et al. |
| 5,479,268 A | 12/1995 | Young |
| 5,479,508 A | 12/1995 | Bestler et al. |
| 5,479,615 A | 12/1995 | Ishii et al. |
| 5,481,294 A | 1/1996 | Thomas et al. |
| 5,481,296 A | 1/1996 | Cragun et al. |
| 5,481,542 A | 1/1996 | Logston |
| 5,483,278 A | 1/1996 | Strubbe et al. |
| 5,484,292 A | 1/1996 | McTaggart |
| 5,485,176 A | 1/1996 | Ohara |
| 5,485,221 A | 1/1996 | Banker et al. |
| 5,486,686 A | 1/1996 | Zdybel, Jr. et al. |
| 5,495,581 A | 2/1996 | Tsai |
| 5,497,187 A | 3/1996 | Banker et al. |
| 5,497,459 A | 3/1996 | Tanihira et al. |
| 5,499,330 A | 3/1996 | Lucas et al. |
| 5,500,794 A | 3/1996 | Fujita et al. |
| 5,502,576 A | 3/1996 | Ramsay et al. |
| 5,506,902 A | 4/1996 | Kubota |
| 5,509,074 A | 4/1996 | Choudhury et al. |
| 5,512,934 A | 4/1996 | Kochanski |
| 5,515,098 A | 5/1996 | Carles |
| 5,517,254 A | 5/1996 | Monta et al. |
| 5,519,780 A | 5/1996 | Woo et al. |
| 5,521,631 A | 5/1996 | Budow et al. |
| 5,524,193 A | 6/1996 | Covington et al. |
| 5,524,201 A | 6/1996 | Shwarts et al. |
| 5,526,035 A | 6/1996 | Lappington et al. |
| 5,526,469 A | 6/1996 | Brindle et al. |
| 5,528,281 A | 6/1996 | Grady et al. |
| 5,528,490 A | 6/1996 | Hill |
| 5,530,235 A | 6/1996 | Stefik |
| 5,531,227 A | 7/1996 | Schneider |
| 5,531,600 A | 7/1996 | Baer |
| 5,532,920 A | 7/1996 | Hartrick et al. |
| 5,534,888 A | 7/1996 | Lebby et al. |
| 5,537,473 A | 7/1996 | Saward |
| 5,538,430 A | 7/1996 | Smith |
| 5,544,320 A | 8/1996 | Konrad |
| 5,544,342 A | 8/1996 | Dean |
| 5,550,863 A | 8/1996 | Yurt et al. |
| 5,553,216 A | 9/1996 | Yoshioka et al. |
| 5,555,441 A | 9/1996 | Haddad |
| 5,557,722 A | 9/1996 | DeRose et al. |
| 5,557,744 A | 9/1996 | Kobayakawa et al. |
| 5,561,708 A | 10/1996 | Remillard |
| 5,561,803 A | 10/1996 | Kilis |
| 5,563,216 A | 10/1996 | Niwano et al. |
| 5,564,043 A | 10/1996 | Siefert |
| 5,565,908 A | 10/1996 | Ahmad |
| 5,565,999 A | 10/1996 | Takahashi |
| 5,570,126 A | 10/1996 | Blahut et al. |
| 5,572,625 A | 11/1996 | Raman et al. |
| 5,572,652 A | 11/1996 | Robusto |
| 5,579,055 A | 11/1996 | Hamilton et al. |
| 5,579,057 A | 11/1996 | Banker et al. |
| 5,581,560 A | 12/1996 | Shimada et al. |
| 5,581,686 A | 12/1996 | Koppolu et al. |
| 5,585,858 A | 12/1996 | Harper et al. |
| 5,586,235 A | 12/1996 | Kauffman et al. |
| 5,587,724 A | 12/1996 | Matsuda |
| 5,596,697 A | 1/1997 | Foster et al. |
| 5,598,209 A | 1/1997 | Cortjens et al. |
| 5,598,279 A | 1/1997 | Ishii |
| 5,598,351 A | 1/1997 | Chater et al. |
| 5,598,470 A | 1/1997 | Cooper et al. |
| 5,598,523 A | 1/1997 | Fujita |
| 5,600,368 A | 2/1997 | Matthews, III |
| 5,600,573 A | 2/1997 | Hendricks et al. |
| 5,602,596 A | 2/1997 | Claussen et al. |
| 5,604,824 A | 2/1997 | Chui et al. |
| 5,608,449 A | 3/1997 | Swafford et al. |
| 5,613,109 A | 3/1997 | Yamauchi et al. |
| 5,621,456 A | 4/1997 | Florin et al. |
| 5,621,658 A | 4/1997 | Jackson et al. |
| 5,624,265 A | 4/1997 | Redford et al. |
| 5,625,833 A | 4/1997 | Levine et al. |
| 5,630,103 A | 5/1997 | Smith et al. |
| 5,630,125 A | 5/1997 | Zellweger |
| 5,631,693 A | 5/1997 | Wunderlich et al. |
| 5,631,694 A | 5/1997 | Aggarwal et al. |
| 5,632,022 A | 5/1997 | Warren et al. |
| 5,634,064 A | 5/1997 | Warnock et al. |
| 5,635,918 A | 6/1997 | Tett |
| 5,636,036 A | 6/1997 | Ashbey |
| 5,638,443 A | 6/1997 | Stefik |
| 5,640,193 A | 6/1997 | Wellner |
| 5,640,196 A | 6/1997 | Behrens et al. |
| 5,644,354 A | 7/1997 | Thompson et al. |
| 5,646,675 A | 7/1997 | Copriviza et al. |
| 5,649,230 A | 7/1997 | Lentz |
| 5,657,414 A | 8/1997 | Lett et al. |
| 5,661,516 A | 8/1997 | Carles |
| 5,663,748 A | 9/1997 | Huffman |
| 5,663,757 A | 9/1997 | Morales |
| 5,666,493 A | 9/1997 | Wojcik et al. |
| 5,682,206 A | 10/1997 | Wehmeyer et al. |
| 5,689,641 A | 11/1997 | Ludwig et al. |
| 5,689,648 A | 11/1997 | Diaz et al. |
| 5,689,663 A | 11/1997 | Williams |
| 5,691,777 A | 11/1997 | Kassaatly |
| 5,696,906 A | 12/1997 | Peters et al. |
| 5,696,982 A | 12/1997 | Tanigawa et al. |
| 5,697,793 A | 12/1997 | Huffman et al. |
| 5,708,960 A | 1/1998 | Kamisaka |
| 5,710,887 A | 1/1998 | Chelliah et al. |
| 5,715,314 A | 2/1998 | Payne et al. |
| 5,715,515 A | 2/1998 | Akins, III |
| 5,719,938 A | 2/1998 | Haas et al. |
| 5,721,832 A | 2/1998 | Westrope et al. |
| 5,721,908 A | 2/1998 | Lagarde et al. |
| 5,721,956 A | 2/1998 | Martin et al. |
| 5,722,418 A | 3/1998 | Bro |
| 5,724,091 A | 3/1998 | Freeman et al. |
| 5,724,521 A | 3/1998 | Dedrick |
| 5,726,909 A | 3/1998 | Krikorian |
| 5,727,065 A | 3/1998 | Dillon |
| 5,734,823 A | 3/1998 | Saigh et al. |
| 5,734,891 A | 3/1998 | Saigh |
| 5,737,725 A | 4/1998 | Case |
| 5,737,747 A | 4/1998 | Vishlitzky et al. |
| 5,739,814 A | 4/1998 | Ohara et al. |
| 5,740,549 A | 4/1998 | Reilly et al. |
| 5,742,680 A | 4/1998 | Wilson |
| 5,745,711 A | 4/1998 | Kitahara et al. |
| 5,748,441 A | 5/1998 | Loritz et al. |
| 5,749,735 A | 5/1998 | Redford |
| 5,754,172 A | 5/1998 | Kubota et al. |
| 5,758,257 A | 5/1998 | Herz et al. |
| 5,760,771 A | 6/1998 | Blonder |
| 5,761,468 A | 6/1998 | Emberson |
| 5,761,485 A | 6/1998 | Munyan |
| 5,761,606 A | 6/1998 | Wolzien |
| 5,761,681 A | 6/1998 | Huffman |
| 5,764,276 A | 6/1998 | Martin et al. |
| 5,767,896 A | 6/1998 | Nemirofsky |
| 5,768,521 A | 6/1998 | Dedrick |
| 5,771,354 A | 6/1998 | Crawford |
| 5,774,109 A | 6/1998 | Winksy et al. |
| 5,774,170 A | 6/1998 | Hite et al. |
| 5,784,565 A | 7/1998 | Lewine |
| 5,786,521 A | 7/1998 | Darsow |
| 5,787,171 A | 7/1998 | Kubota et al. |
| 5,788,504 A | 8/1998 | Rice et al. |
| 5,790,176 A | 8/1998 | Craig |
| 5,790,935 A | 8/1998 | Payton |

(56) References Cited

U.S. PATENT DOCUMENTS

| | | |
|---|---|---|
| 5,793,414 A | 8/1998 | Shaffer |
| 5,796,954 A | 8/1998 | Hanif |
| 5,798,785 A | 8/1998 | Hendricks et al. |
| 5,799,071 A | 8/1998 | Azar et al. |
| 5,799,157 A | 8/1998 | Escallon |
| 5,802,465 A | 9/1998 | Hamalainen et al. |
| 5,802,526 A | 9/1998 | Fawcett et al. |
| 5,805,204 A | 9/1998 | Thompson et al. |
| 5,815,662 A | 9/1998 | Ong |
| 5,815,671 A | 9/1998 | Morrison |
| 5,819,301 A | 10/1998 | Rowe et al. |
| 5,835,732 A | 11/1998 | Kikinis et al. |
| 5,844,600 A | 12/1998 | Kerr |
| 5,844,890 A | 12/1998 | Delp et al. |
| 5,850,218 A | 12/1998 | LaJoie et al. |
| 5,850,520 A | 12/1998 | Griebenow et al. |
| 5,850,629 A | 12/1998 | Holm et al. |
| 5,859,594 A | 1/1999 | King et al. |
| 5,862,325 A | 1/1999 | Reed et al. |
| 5,862,329 A | 1/1999 | Aras et al. |
| 5,864,823 A | 1/1999 | Levitan |
| 5,870,717 A | 2/1999 | Wiecha |
| 5,877,755 A | 3/1999 | Hellhake |
| 5,877,801 A | 3/1999 | Martin et al. |
| 5,881,269 A | 3/1999 | Dobbelstein |
| 5,884,288 A | 3/1999 | Chang |
| 5,890,122 A | 3/1999 | Van Kleeck et al. |
| 5,890,177 A | 3/1999 | Moody et al. |
| 5,892,900 A | 4/1999 | Ginter et al. |
| 5,892,915 A | 4/1999 | Duso et al. |
| 5,893,109 A | 4/1999 | DeRose et al. |
| 5,893,132 A | 4/1999 | Huffman et al. |
| 5,898,852 A | 4/1999 | Petolino et al. |
| 5,903,319 A | 5/1999 | Busko et al. |
| 5,903,652 A | 5/1999 | Mital |
| 5,903,901 A | 5/1999 | Kawakura et al. |
| 5,914,706 A | 6/1999 | Kono |
| 5,917,543 A | 6/1999 | Uehara |
| 5,917,915 A | 6/1999 | Hirose |
| 5,918,213 A | 6/1999 | Bernard et al. |
| 5,923,656 A | 7/1999 | Duan |
| 5,926,624 A | 7/1999 | Katz et al. |
| 5,929,848 A | 7/1999 | Albukerk et al. |
| 5,930,768 A | 7/1999 | Hooban |
| 5,933,498 A | 8/1999 | Schneck et al. |
| 5,937,162 A | 8/1999 | Funk et al. |
| 5,940,073 A | 8/1999 | Klosterman et al. |
| 5,940,595 A | 8/1999 | Reber et al. |
| 5,956,034 A | 9/1999 | Sachs et al. |
| 5,957,695 A | 9/1999 | Redford et al. |
| 5,957,697 A | 9/1999 | Iggulden et al. |
| 5,959,945 A | 9/1999 | Kleiman |
| 5,963,246 A | 10/1999 | Kato |
| 5,978,841 A | 11/1999 | Berger |
| 5,986,677 A | 11/1999 | Jones et al. |
| 5,986,690 A | 11/1999 | Hendricks |
| 5,990,927 A | 11/1999 | Hendricks et al. |
| 5,991,594 A | 11/1999 | Froeber |
| 5,995,943 A | 11/1999 | Bull et al. |
| 5,999,214 A | 12/1999 | Inagaki |
| 6,009,401 A | 12/1999 | Horstmann |
| 6,012,890 A | 1/2000 | Celorio |
| 6,014,184 A | 1/2000 | Knee et al. |
| 6,016,484 A | 1/2000 | Williams et al. |
| 6,025,837 A | 2/2000 | Matthews, III et al. |
| 6,025,871 A | 2/2000 | Kantor et al. |
| 6,029,045 A | 2/2000 | Picco et al. |
| 6,029,141 A | 2/2000 | Bezos et al. |
| 6,029,176 A | 2/2000 | Cannon |
| 6,034,680 A | 3/2000 | Kessenich |
| 6,052,717 A | 4/2000 | Reynolds et al. |
| 6,061,504 A | 5/2000 | Tzelnic et al. |
| 6,072,463 A | 6/2000 | Glaser |
| 6,091,823 A | 7/2000 | Hosomi et al. |
| 6,091,930 A | 7/2000 | Mortimer et al. |
| 6,101,485 A | 8/2000 | Fortenberry et al. |
| 6,112,049 A | 8/2000 | Sonnenfeld |
| 6,115,040 A | 9/2000 | Bladow et al. |
| 6,115,482 A | 9/2000 | Sears et al. |
| 6,141,413 A | 10/2000 | Waldner et al. |
| 6,161,093 A | 12/2000 | Watari et al. |
| 6,163,796 A | 12/2000 | Yokomizo |
| 6,173,335 B1 | 1/2001 | Culbert |
| 6,195,667 B1 | 2/2001 | Duga et al. |
| 6,204,885 B1 | 3/2001 | Kwoh |
| 6,229,694 B1 | 5/2001 | Kono |
| 6,243,071 B1 | 6/2001 | Shwarts et al. |
| 6,249,785 B1 | 6/2001 | Paepke |
| 6,252,876 B1 | 6/2001 | Brueckheimer |
| 6,252,879 B1 | 6/2001 | Zhang |
| 6,260,024 B1 | 7/2001 | Shkedy |
| 6,269,483 B1 | 7/2001 | Broussard |
| 6,278,448 B1 | 8/2001 | Brown et al. |
| 6,279,017 B1 | 8/2001 | Walker |
| 6,281,986 B1 | 8/2001 | Form |
| 6,295,542 B1 | 9/2001 | Corbin |
| 6,298,441 B1 | 10/2001 | Handelman et al. |
| 6,301,584 B1 | 10/2001 | Ranger |
| 6,313,828 B1 | 11/2001 | Chombo |
| 6,314,474 B1 | 11/2001 | Walter et al. |
| 6,320,591 B1 | 11/2001 | Griencewic |
| 6,331,865 B1 | 12/2001 | Sachs et al. |
| 6,331,867 B1 | 12/2001 | Eberhard et al. |
| 6,334,109 B1 | 12/2001 | Kanevsky et al. |
| 6,335,678 B1 | 1/2002 | Heutschi |
| 6,339,842 B1 | 1/2002 | Fernandez et al. |
| 6,351,750 B1 | 2/2002 | Duga et al. |
| 6,363,418 B1 | 3/2002 | Conboy et al. |
| 6,385,614 B1 | 5/2002 | Vellandi |
| 6,411,973 B1 | 6/2002 | Yianilos |
| 6,411,994 B2 | 6/2002 | van Allen et al. |
| 6,415,316 B1 | 7/2002 | Van Der Meer |
| 6,418,214 B1 | 7/2002 | Smythe et al. |
| 6,438,233 B1 | 8/2002 | Yoshimune et al. |
| 6,452,614 B1 | 9/2002 | King et al. |
| 6,452,933 B1 | 9/2002 | Duffield et al. |
| 6,460,036 B1 | 10/2002 | Herz |
| 6,462,729 B2 | 10/2002 | Morita |
| 6,486,895 B1 | 11/2002 | Robertson et al. |
| 6,493,734 B1 | 12/2002 | Sachs et al. |
| 6,507,342 B1 | 1/2003 | Hirayama |
| 6,510,531 B1 | 1/2003 | Gibbons |
| 6,535,505 B1 | 3/2003 | Hwang et al. |
| 6,546,016 B1 | 4/2003 | Gerszberg et al. |
| 6,556,561 B1 | 4/2003 | Himbeault et al. |
| 6,557,173 B1 | 4/2003 | Hendricks |
| 6,585,776 B1 | 7/2003 | Bates |
| 6,597,314 B1 | 7/2003 | Beezer |
| 6,606,603 B1 | 8/2003 | Joseph |
| 6,611,531 B1 | 8/2003 | Chen et al. |
| 6,634,028 B2 | 10/2003 | Handelman |
| 6,654,754 B1 | 11/2003 | Knauft |
| 6,657,654 B2 | 12/2003 | Narayanaswami |
| 6,675,384 B1 | 1/2004 | Block et al. |
| 6,714,238 B2 | 3/2004 | Urisaka et al. |
| 6,725,203 B1 | 4/2004 | Seet et al. |
| 6,772,394 B1 | 8/2004 | Kamada |
| 6,813,249 B1 | 11/2004 | Lauffenburger et al. |
| 6,847,403 B1 | 1/2005 | Forsberg, Jr. et al. |
| 6,886,000 B1 | 4/2005 | Aggarwal et al. |
| 6,976,028 B2 | 12/2005 | Fenton |
| 6,990,464 B1 | 1/2006 | Pirillo |
| 7,020,663 B2 | 3/2006 | Hay |
| 7,051,351 B2 | 5/2006 | Goldman et al. |
| 7,181,468 B2 | 2/2007 | Spring |
| 7,181,692 B2 | 2/2007 | Siegel |
| 7,185,274 B1 | 2/2007 | Rubin et al. |
| 7,350,704 B2 | 4/2008 | Barsness et al. |
| 7,401,286 B1 | 7/2008 | Hendricks et al. |
| 2001/0021950 A1 | 9/2001 | Hawley et al. |
| 2002/0034296 A1 | 3/2002 | Yoshimune |
| 2002/0087555 A1 | 7/2002 | Murata |
| 2002/0120635 A1 | 8/2002 | Joao |
| 2003/0014754 A1 | 1/2003 | Chang |

(56) References Cited

U.S. PATENT DOCUMENTS

| | | |
|---|---|---|
| 2003/0018543 A1 | 1/2003 | Alger et al. |
| 2003/0093336 A1 | 5/2003 | Ukita et al. |
| 2003/0093382 A1 | 5/2003 | Himeno et al. |
| 2003/0110084 A1 | 6/2003 | Eberhard et al. |
| 2003/0198932 A1 | 10/2003 | Stuppy |
| 2005/0144133 A1 | 6/2005 | Hoffman |
| 2007/0288959 A1 | 12/2007 | Istvan et al. |
| 2008/0229182 A1 | 9/2008 | Hendricks et al. |
| 2009/0216623 A1 | 8/2009 | Hendricks et al. |

FOREIGN PATENT DOCUMENTS

| | | |
|---|---|---|
| CA | 2177154 | 6/1995 |
| CA | 2458564 | 6/1995 |
| CA | 2256591 | 11/1997 |
| CA | 2458346 | 5/2004 |
| CA | 2458564 | 5/2004 |
| CA | 2459528 | 10/2004 |
| CA | 2458337 | 12/2004 |
| CA | 2458564 | 12/2004 |
| CA | 2458346 | 4/2005 |
| CA | 2458355 | 11/2005 |
| CA | 2458337 | 12/2005 |
| CA | 2458317 | 3/2006 |
| CA | 2459063 | 3/2006 |
| CA | 2361371 | 7/2006 |
| CA | 2458258 | 10/2006 |
| CA | 2459048 | 10/2006 |
| CA | 2458317 | 11/2006 |
| CA | 2458355 | 11/2006 |
| CA | 2459063 | 12/2006 |
| CA | 2458337 | 1/2007 |
| CA | 2459059 | 5/2007 |
| CA | 2458379 | 6/2007 |
| CA | 2459048 | 6/2007 |
| CA | 2459529 | 6/2007 |
| CA | 2361371 | 10/2007 |
| CA | 2458307 | 10/2007 |
| CA | 2458355 | 11/2007 |
| CA | 2459779 | 11/2007 |
| CA | 2459780 | 11/2007 |
| CA | 2459059 | 3/2008 |
| CA | 2458317 | 5/2008 |
| CA | 2459063 | 5/2008 |
| CA | 2359690 | 9/2008 |
| CA | 2459779 | 1/2009 |
| CA | 2459780 | 1/2009 |
| CA | 2385097 | 2/2009 |
| CA | 2458307 | 2/2009 |
| CA | 2361371 | 4/2009 |
| CA | 2369779 | 4/2009 |
| CA | 2459059 | 4/2009 |
| CA | 2388648 | 8/2009 |
| CA | 2388649 | 8/2009 |
| CA | 2377405 | 9/2009 |
| CA | 2459780 | 9/2009 |
| CA | 2458345 | 11/2009 |
| CA | 2369759 | 12/2009 |
| CA | 2371379 | 12/2009 |
| CA | 2458307 | 12/2009 |
| CA | 2459779 | 12/2009 |
| CA | 2382650 | 1/2010 |
| CA | 2359690 | 7/2010 |
| CA | 2369779 | 7/2010 |
| CA | 2388648 | 7/2010 |
| CA | 2382650 | 9/2010 |
| CA | 2361371 | 11/2010 |
| CA | 2385097 | 11/2010 |
| DE | 3423846 | 1/1986 |
| DE | 3935294 | 4/1991 |
| DE | 42 12 184 | 10/1993 |
| EP | 0103438 | 3/1984 |
| EP | 140302 | 5/1985 |
| EP | 0145063 | 6/1985 |
| EP | 0149536 | 7/1985 |
| EP | 0158548 | 10/1985 |
| EP | 0158767 | 10/1985 |
| EP | 0167237 | 1/1986 |
| EP | 0243312 | 10/1987 |
| EP | 0277014 | 8/1988 |
| EP | 0281293 | 9/1988 |
| EP | 0299830 | 1/1989 |
| EP | 0314572 | 5/1989 |
| EP | 0328440 | 8/1989 |
| EP | 0340643 | 11/1989 |
| EP | 0355 697 | 2/1990 |
| EP | 0377334 | 7/1990 |
| EP | 0384986 | 9/1990 |
| EP | 0396186 | 11/1990 |
| EP | 0399200 | 11/1990 |
| EP | 0402 809 | 12/1990 |
| EP | 0420 123 | 4/1991 |
| EP | 0187 961 | 5/1991 |
| EP | 0424 648 | 5/1991 |
| EP | 0425 834 | 5/1991 |
| EP | 0450841 | 10/1991 |
| EP | 0472070 | 2/1992 |
| EP | 0506 435 | 9/1992 |
| EP | 0513 763 | 11/1992 |
| EP | 0516533 | 12/1992 |
| EP | 0539106 | 4/1993 |
| EP | 0567800 | 11/1993 |
| EP | 0570785 | 11/1993 |
| EP | 09322877 | 11/1993 |
| EP | 0586954 | 3/1994 |
| EP | 0620689 | 10/1994 |
| EP | 0646856 | 4/1995 |
| EP | 0690426 | 1/1996 |
| EP | 0702491 | 3/1996 |
| EP | 0372384 | 5/1997 |
| EP | 0810534 A | 12/1997 |
| EP | 0838798 | 4/1998 |
| EP | 95904787.9 | 5/1998 |
| EP | 0892388 | 1/1999 |
| EP | 0924629 A | 6/1999 |
| EP | 0924687 | 6/1999 |
| EP | 0701220 | 7/2001 |
| EP | 0726535 | 5/2003 |
| EP | 00968375.6 | 3/2004 |
| EP | 00909958.1 | 5/2004 |
| EP | 00974003.6 | 7/2004 |
| EP | 00974006.9 | 7/2004 |
| EP | 00923211.7 | 5/2005 |
| EP | 00923210.9 | 6/2005 |
| EP | 00909958.1 | 7/2005 |
| EP | 00968375.6 | 7/2005 |
| EP | 00909966.4 | 6/2006 |
| EP | 00974003.6 | 6/2006 |
| EP | 00909958.1 | 9/2006 |
| EP | 00909958.1 | 10/2006 |
| EP | 00943086.9 | 12/2006 |
| EP | 00925915.1 | 4/2007 |
| EP | 00960077.6 | 10/2007 |
| EP | 00941287.5 | 2/2010 |
| GB | 1204190 | 9/1970 |
| GB | 2149544 | 6/1985 |
| GB | 2168227 | 6/1986 |
| GB | 2 177 873 A | 1/1987 |
| GB | 2269302 A | 2/1994 |
| GB | 2344009 | 5/2000 |
| JP | 060-143086 | 7/1985 |
| JP | 61-028150 | 2/1986 |
| JP | 061060150 | 3/1986 |
| JP | 62-24777 | 2/1987 |
| JP | 62-140134 | 6/1987 |
| JP | 62-245167 | 10/1987 |
| JP | 64-086778 | 3/1989 |
| JP | 01-130683 | 5/1989 |
| JP | 01-142918 | 6/1989 |
| JP | 64-007786 | 11/1989 |
| JP | 02-284571 | 11/1990 |
| JP | 03-114375 | 5/1991 |
| JP | 03-198119 | 8/1991 |

(56) References Cited

FOREIGN PATENT DOCUMENTS

| | | |
|---|---|---|
| JP | 03225445 | 10/1991 |
| JP | 04-170183 | 6/1992 |
| JP | 05-046045 | 2/1993 |
| JP | 05056405 | 3/1993 |
| JP | 05-236437 | 9/1993 |
| JP | 05233547 | 9/1993 |
| JP | 05236437 | 9/1993 |
| JP | 05250106 | 9/1993 |
| JP | 05-334167 A | 12/1993 |
| JP | 05334167 A | 12/1993 |
| JP | 06-068339 A | 3/1994 |
| JP | 06068339 A | 3/1994 |
| JP | 06134489 | 5/1994 |
| JP | 06187359 | 7/1994 |
| JP | 07135594 | 5/1995 |
| JP | 07-230466 A | 8/1995 |
| JP | 07-230477 | 8/1995 |
| JP | 07-235909 | 9/1995 |
| JP | 08-008850 A | 1/1996 |
| JP | 08008851 | 1/1996 |
| JP | 08-051614 A | 2/1996 |
| JP | 08137913 | 5/1996 |
| JP | 08214074 | 8/1996 |
| JP | 08215158 | 8/1996 |
| JP | 08-228328 | 9/1996 |
| JP | 08314790 | 11/1996 |
| JP | 08510869 | 11/1996 |
| JP | 08-328812 | 12/1996 |
| JP | 09081475 | 3/1997 |
| JP | 09101971 | 4/1997 |
| JP | 09506225 | 6/1997 |
| JP | 09-227193 | 9/1997 |
| JP | 09237096 | 9/1997 |
| JP | 09-284571 | 10/1997 |
| JP | 09282218 | 10/1997 |
| JP | 09511350 | 11/1997 |
| JP | 09330354 | 12/1997 |
| JP | 09330360 | 12/1997 |
| JP | 10070530 | 3/1998 |
| JP | 10134080 | 5/1998 |
| JP | 10207945 | 8/1998 |
| JP | 10240830 | 9/1998 |
| JP | 10-285568 A | 10/1998 |
| JP | 10275186 | 10/1998 |
| JP | 10301946 | 11/1998 |
| JP | 10312344 | 11/1998 |
| JP | 10327397 | 12/1998 |
| JP | 11003341 | 1/1999 |
| JP | 11-068770 | 3/1999 |
| JP | 11084999 | 3/1999 |
| JP | 11096175 | 4/1999 |
| JP | 11-143954 | 5/1999 |
| JP | 11143719 | 5/1999 |
| JP | 11250145 | 9/1999 |
| JP | 2000-501214 | 2/2000 |
| JP | 2000-507728 | 6/2000 |
| JP | 2002-512708 | 4/2002 |
| JP | 515760/95 | 4/2004 |
| JP | 515760/95 | 12/2004 |
| JP | 2000-596729 | 8/2009 |
| JP | 2000-611178 | 10/2009 |
| JP | 2000-611222 | 1/2010 |
| JP | 2000-611223 | 1/2010 |
| JP | 2000-596729 | 3/2010 |
| JP | 2001-525893 | 4/2010 |
| JP | 2000-611178 | 5/2010 |
| JP | 2001-506518 | 5/2010 |
| JP | 2001-502044 | 6/2010 |
| JP | 2001-522408 | 6/2010 |
| JP | 2001-533556 | 7/2010 |
| JP | 2001-539201 | 8/2010 |
| MX | 2001/010300 | 9/2004 |
| MX | 2001/010298 | 4/2005 |
| MX | 2001/007581 | 7/2006 |
| MX | 2001/010298 | 11/2006 |
| MX | 2002/002555 | 1/2007 |
| MX | 2002/000197 | 2/2007 |
| MX | 2002/002984 | 3/2007 |
| MX | 2001/007580 | 2/2008 |
| MX | 2001/007580 | 6/2008 |
| MX | 2001/010300 | 6/2008 |
| MX | 2001/010298 | 9/2008 |
| MX | 2002/002555 | 9/2008 |
| MX | 2001/010300 | 11/2008 |
| MX | 2001/007580 | 3/2009 |
| MX | 2001/007581 | 3/2009 |
| MX | 2001/007580 | 6/2010 |
| TW | 234223 | 11/1994 |
| TW | 235358 | 12/1994 |
| TW | 235359 | 12/1994 |
| TW | 236065 | 12/1994 |
| TW | 236744 | 12/1994 |
| TW | 238461 | 1/1995 |
| WO | WO 80/00209 | 2/1980 |
| WO | WO 83/03020 | 9/1983 |
| WO | WO 84/00237 | 1/1984 |
| WO | WO 86/01962 | 3/1986 |
| WO | WO 87/01481 | 3/1987 |
| WO | WO 88/01463 | 2/1988 |
| WO | WO 8809985 | 12/1988 |
| WO | WO 89/09528 | 10/1989 |
| WO | WO 89/12370 | 12/1989 |
| WO | WO 90/10988 | 9/1990 |
| WO | WO 9100670 | 1/1991 |
| WO | WO 91/03112 | 3/1991 |
| WO | WO 91/11769 | 8/1991 |
| WO | WO 91/15841 | 10/1991 |
| WO | WO 92/10040 | 6/1992 |
| WO | WO 92/11713 | 7/1992 |
| WO | WO 92/12599 | 7/1992 |
| WO | WO 92/17027 | 10/1992 |
| WO | WO 92/21206 | 11/1992 |
| WO | WO 93/01550 | 1/1993 |
| WO | WO 93/06692 | 4/1993 |
| WO | WO9307713 | 4/1993 |
| WO | WO 93/09490 | 5/1993 |
| WO | WO 93/09631 | 5/1993 |
| WO | WO93/15466 | 8/1993 |
| WO | WO 93/22877 | 11/1993 |
| WO | WO 94/01964 | 1/1994 |
| WO | WO 94/07327 A1 | 3/1994 |
| WO | WO 94/13107 | 6/1994 |
| WO | WO 94/14282 | 6/1994 |
| WO | WO 94/16527 | 7/1994 |
| WO | WO 9515649 A | 6/1995 |
| WO | WO 96/08109 | 3/1996 |
| WO | WO 96/17306 | 6/1996 |
| WO | WO 96/25006 | 8/1996 |
| WO | WO 96/41473 | 12/1996 |
| WO | WO 97/13368 | 4/1997 |
| WO | WO 97/18665 | 5/1997 |
| WO | WO 97/12105 | 6/1997 |
| WO | WO 97/20224 | 6/1997 |
| WO | WO 97/20274 | 6/1997 |
| WO | WO 97/22049 | 6/1997 |
| WO | WO 97/22062 | 6/1997 |
| WO | WO 97/22063 | 6/1997 |
| WO | WO 97/22064 | 6/1997 |
| WO | WO 97/22065 | 6/1997 |
| WO | WO 97/22067 | 6/1997 |
| WO | WO 97/22079 | 6/1997 |
| WO | WO 97/22080 | 6/1997 |
| WO | WO 97/22097 | 6/1997 |
| WO | WO 97/22099 | 6/1997 |
| WO | WO 97/22100 | 6/1997 |
| WO | WO 97/22101 | 6/1997 |
| WO | WO 97/22102 | 6/1997 |
| WO | WO 97/22103 | 6/1997 |
| WO | WO 97/22104 | 6/1997 |
| WO | WO 97/22105 | 6/1997 |
| WO | WO 97/22106 | 6/1997 |
| WO | WO 97/22107 | 6/1997 |
| WO | WO 97/22108 | 6/1997 |
| WO | WO 97/22109 | 6/1997 |

(56) References Cited

FOREIGN PATENT DOCUMENTS

| | | |
|---|---|---|
| WO | WO 97/22110 | 6/1997 |
| WO | WO 97/22111 | 6/1997 |
| WO | WO 97/22112 | 6/1997 |
| WO | WO9720274 | 6/1997 |
| WO | WO 97/12819 | 7/1997 |
| WO | WO 97/23819 | 7/1997 |
| WO | WO9737344 | 10/1997 |
| WO | WO 97/41688 A1 | 11/1997 |
| WO | WO 97/45798 | 12/1997 |
| WO | WO 98/02836 | 1/1998 |
| WO | WO 98/03923 | 1/1998 |
| WO | WO9808344 | 2/1998 |
| WO | WO 9808344 A | 2/1998 |
| WO | WO 9821679 | 2/1998 |
| WO | WO 9818086 | 4/1998 |
| WO | WO9827494 | 6/1998 |
| WO | WO 98/48566 | 10/1998 |
| WO | WO 98/53581 | 11/1998 |
| WO | WO 99/12349 | 3/1999 |
| WO | WO 99/18701 A1 | 4/1999 |
| WO | WO 99/26415 | 5/1999 |
| WO | WO 99/45491 | 9/1999 |
| WO | WO 9944144 A | 9/1999 |
| WO | WO 99/52285 | 10/1999 |
| WO | WO 99/66719 | 12/1999 |
| WO | WO 00/62228 A3 | 10/2000 |
| WO | WO 01/18665 A1 | 3/2001 |
| WO | WO 2007/022107 | 2/2007 |

OTHER PUBLICATIONS

"An Interactive Lesson in the Interactive Course Series" Waite Group Press, MacMillan Computer Publishing, "Online! 1996, XP00082591, Retrieved from the Internet: <URL:http//www.waite.com/> retrieved in 1996.

"Electronic Dictionary Pronounces over 83,000 Words," Goorfin, L., *Speech Technology*; Man-Machine Voice Communications, U.S., Media Dimensions Inc.; New York, vol. 4, No. 4; Apr. 1, 1989, pp. 78-79.

"Enabling the book metaphor for the World-Wide-Web: disseminating on-line information as dynamic Web documents," Rauch, T. et al.; *IEEE Transactions on Professional Communications*, Jun. 1997; vol. 40, No. 2, pp. 111-128.

"Fourth generation hypermedia: some missing links for the World Wide Web," Bieber, M. et al., *International Journal of Human-Computer Studies*; U.S.; Academic Press: New York; vol. 47, No. 1; Jul. 1997; pp. 31-65.

"A Dynamic Policy of Segment Replication for Load-Balancing in Video-on-Demand Servers,";Dan,A. et al.; Multimedia Systems, vol. 3, No. 3, Jul. 1995, pp. 93-103.

"Prototyping an Interactive Electronic Book System Using an Object-oriented Approach," Pasquier-Boltuck, J. et al.; *ECOOP*; European Conference on Object-oriented Programming; Aug. 15, 1988; pp. 177-190.

"Reading and Writing the Electronic Book," Yankelovich, N. et al., *Computer*; U.S. IEEE Computer Society, Long Beach, Calif., U.S. vol. 18, No. 10, Oct. 1, 1985, pp. 15-30.

"Subscription Teletext for Value Added Services", Dr. G.T. Sharpless, IEEE Transactions on Consumer Electronics, Aug. 1985, vol. CE-31, No. 3, pp. 283-289.

"The Internet bookstore opens for business", Medford: Jul./Aug. 1994. vol. 11, Iss. 4; p. 21 (1 page).

"Using an ER Query and Update Interface for Rapid Prototyping of Hypertext Systems," Czejdo, B.; Proceedings of the Annual Hawaii International Conference on System Sciences; Jan. 1, 1990, pp. 227-236.

"A Store-and-Forward Architecture for Video-on-Demand Service," Gelman, A.D. et al., ICC Conference, 1991, pp. 842-846.

Dinaro, M. et al., "Markets and Products Overview," Revue HF Tijdschrift, 1991, vol. 15, No. 3/4, pp. 135-148.

Alexander Gelman, et al., "An Architecture for Interactive Applications", May 1993, pp. 848-852.

Boom, H., "An Interactive Videotex System for Two-Way CATV Networks," 1986, vol. 40, No. 6, pp. 397-401.

"*Applied Cryptography Protocols, Algorithms, and Source Code in C*," Schneier, Bruce; 1996 by John Wiley & Sons, pp. 34-44.

Azuma J., "Creating Educational Web Sites", IEE Communications Magazine, U.S. IEEE Service Center, Piscataway, N.J., vol. 37, No. 3, Mar. 1999, pp. 109-113.

Barnes, 10 Minute Guide to Windows 3.1., Alpha Books, 1992, pp. 60-64.

Basch, Reva, "Books Online: Visions, Plans, and Perspectives for Electronic Text", Online, Medford: Jul. 1991, vol. 15, Iss. 4; pp. 13-23.

Bestler, C., "Flexible Data Structure and Interface Rituals for Rapid Development of OSD Applications", NCTA Technical Papers, pp. 223-236, Jun. 1993.

Broering, N. C., "The Electronic Library and IAIMS at Georgetown University", Policy Issues in Information and Communication Techniques in Medical Applications, 1988. Symposium Record, Sep. 29-30, 1988, pp. 27-29.

Chan, L. M., "Principles, Structure and Format", Immroth's Guide to the Library of Congress Classification, 4th Edition, 1990, Chapter 2, pp. 19-51.

Consumer Digest advertisement; "Xpand Your TV's Channel Capability;" Fall/Winter 1992; p. 215.

Daniel M. Moloney, "Digital Compression in Today's Addressable Environment;" 1993 NCTA Technical Papers; Jun. 6, 1993; pp. 308-316.

DeBuse, R., "So That's a Book . . . Advancing Technology and the Library," Mar. 1988, Information Technology and Libraries, vol. 7, Issue 1, pp. 7-18.

Endo, K. et al., "Electronic Book in 3.5" Floppy Disk", Consumer Electronics, Digest of Technical Papers, IEEE 1994 International Conference on Jun. 21-23, 1994 pp. 316-317.

Fox E. A., et al., "Users, user interfaces, and objects: Envision, a Digital Library," Sep. 1993, Journal of the American Society for Information Science, vol. 44, issue 8, p. 480-491.

Schepers, C., "Für Geschlossene Benutzergruppen" Funkschau, DE, Franzis-Verlag K.G. Munchen, No. 18, Aug. 25, 1989, pp. S53-S54.

Goldberg M W et al: "World Wide Web—course tool: An environment for building WWW-based courses," Computer Networks and ISDN Systems, NL, North Holland Publishing. Amsterdam, vol. 28, No. 11, May 1, 1996.

Great Presentations advertisement; "Remote, Remote;" 1987; p. 32H.

Hartley S et al.: "Enhancing Teaching Using the Internet" SIGCSE/SIGCUE Conference on Integrating Technology into Computer Science Education, US, New York, ACM, vol. Conf. 1, Jun. 2, 1996, pp. 218-228.

Herron T L: "Teaching with the Internet" Internet and Higher Education, US, JAI Press, Stamford, CT, vol. 1, No. 3, 1998, pp. 217-222.

Hong Kong Enterprise; Advertisement, "Two Innovative New Consumer Products From SVI," Nov. 1988, p. 379.

HP-41 C Operating Manual—A Guide for the Experienced User, Hewlett Packard Co., Jun. 1980.

"Applying Interactive Voice Response Technology in Psychiatric Practice", Sorce J. F. et al., Human Factors in Telecommunications; R. V. Decker's Verlag, Heidelberg, Germany, pp. 397-407.

Indian Patent Application 762-Cal-93.

Indian Patent Application 765-Cal-93.

Intner, S. S. et al., "The Dewey Decimal Classification", Special Libraries: A Cataloging Guide, 1998, Chapter 11, pp. 211-239.

John Reimer, "Memories in My Pocket;" BYTE; Feb. 1991; pp. 251-258.

Kubota H. et al.: "Terrestrial Data Multiplex Broadcasting News Delivery System and Its Terminal", IEE Transactions on Consumer Electronics, U.S., IEE Inc., New York, vol. 43, No. 3, Aug. 1, 1997, pp. 504-509.

Lewis, B.T. et al.; "Shared books: collaborative publication management for an office information system"; ACM SIGIOS Bulletin Conference sponsored by ACM SIGOIS and IEEECS TC-OA on Office information systems, vol. 9, Issue 2-3, Apr. 1988, pp. 197-204.

(56) References Cited

OTHER PUBLICATIONS

Mann et al.; "A coherent distributed file cache with directory write-behind" ACM Transactions on Computer Systems (TCOS), vol. 12, Issue 2, May 1994.
Miyazawa, M. et al., "An electronic book: APT Book," Aug. 1990, Human-Computer Interaction, Interact '90, Proceedings of the IFIP TC 13 Third International Conference, Cambridge, UK, pp. 513-519.
O'Gorman, L., "Image and document processing techniques for the RightPages electronic library system", Conference B: Pattern Recognition Methodology and Systems, Proceedings, 11th IAP International Conference on Aug. 30-Sep. 3, 1992 pp. 260-263.
Olshansky R. et al., "Subscriber Distribution Networks Using Compressed Digital Video;" Journal of Lightwave Technology; Nov. 1992; vol. 10, No. 11, pp. 1760-1765.
Pobiak, B.C., "Adjustable access electronic books", Computing Applications to Assist Persons with Disabilities, 1992, Proceedings of the John Hopkins National Search for Feb. 1-5, 1992 pp. 90-94.
Raman, T.V., "Audio System for Technical Readings," May 1994, Cornell University, pp. 1-129.
Rawlins, "The New Publishing—Technology's impact on the publishing industry over the next decade", Nov. 12, 1991, pp. 1-65.
Schatz, "Building an electronic scientific community", System Sciences, 1991. Proceeding of the Twenty-Fourth Annual Hawaii International Conference on vol. iii, Jan. 8-11, 1991 pp. 739-748 vol. 3.
Simpson, Alan, Mastering WORDPERFECT® 5.1 & 5.2 for Windows, 1993, Sybex, Inc., pp. 72-73.
Soloview; "Prefetching in segmented disk cache for multi-disk systems" Proceedings of the fourth workshop on I/O in parallel and distributed systems: part of the federated computing research conference; May 1996.
Valauskas, Edward J, "Electronic books as databases", Database, Aug. 1993. vol. 16, Iss. 4; p. 84-86.
Sep. 24, 1996, U.S. Appl. No. 29/030,157.
Sep. 8, 2009, U.S. Appl. No. 12/010,045.
Sep. 4, 2009, U.S. Appl. No. 09/964,883.
Feb. 17, 2009, U.S. Appl. No. 09/964,883.
Sep. 17, 2008, U.S. Appl. No. 09/964,883.
Feb. 6, 2008, U.S. Appl. No. 09/964,883.
Jun. 22, 2007, U.S. Appl. No. 09/964,883.
Jan. 3, 2007, U.S. Appl. No. 09/964,883.
Jul. 12, 2006, U.S. Appl. No. 09/964,883.
Feb. 2, 2006, U.S. Appl. No. 09/964,883.
Jun. 15, 2005, U.S. Appl. No. 09/964,883.
Sep. 27, 2004, U.S. Appl. No. 09/964,883.
Aug. 10, 2007, U.S. Appl. No. 09/964,882.
May 22, 2006, U.S. Appl. No. 09/964,882.
Dec. 2, 2005, U.S. Appl. No. 09/964,882.
Mar. 22, 2005, U.S. Appl. No. 09/964,882.
Jul. 22, 2005, U.S. Appl. No. 09/964,880.
Jan. 12, 2005, U.S. Appl. No. 09/964,880.
May 9, 2005, U.S. Appl. No. 09/964,857.
Jul. 7, 2004, U.S. Appl. No. 09/964,857.
Feb. 8, 2006, U.S. Appl. No. 09/723,282.
Aug. 17, 2005, U.S. Appl. No. 09/723,282.
Jun. 3, 2004, U.S. Appl. No. 09/723,282.
May 19, 2005, U.S. Appl. No. 09/723,280.
Jun. 7, 2004, U.S. Appl. No. 09/723,280.
Aug. 24, 2005, U.S. Appl. No. 09/722,823.
Jan. 4, 2005, U.S. Appl. No. 09/722,823.
Jul. 18, 2002, U.S. Appl. No. 09/722,744.
Jan. 16, 2002, U.S. Appl. No. 09/722,744.
Oct. 5, 2005, U.S. Appl. No. 09/722,743.
Dec. 16, 2004, U.S. Appl. No. 09/722,743.
Jan. 11, 2008, U.S. Appl. No. 09/722,742.
May 29, 2007, U.S. Appl. No. 09/722,742.
Oct. 2, 2006, U.S. Appl. No. 09/722,742.
Apr. 13, 2006, U.S. Appl. No. 09/722,742.
Oct. 7, 2003, U.S. Appl. No. 09/722,742.
Mar. 24, 2005, U.S. Appl. No. 09/722,741.
Jun. 28, 2004, U.S. Appl. No. 09/722,741.
Aug. 24, 2005, U.S. Appl. No. 09/722,740.
May 24, 2004, U.S. Appl. No. 09/722,740.
Apr. 10, 2009, U.S. Appl. No. 09/722,626.
Dec. 5, 2008, U.S. Appl. No. 09/722,626.
Jun. 9, 2008, U.S. Appl. No. 09/722,626.
Oct. 30, 2007, U.S. Appl. No. 09/722,626.
May 8, 2007, U.S. Appl. No. 09/722,626.
Aug. 1, 2006, U.S. Appl. No. 09/722,626.
Feb. 22, 2006, U.S. Appl. No. 09/722,626.
Jun. 20, 2005, U.S. Appl. No. 09/722,626.
Dec. 20, 2006, U.S. Appl. No. 09/722,519.
Aug. 15, 2006, U.S. Appl. No. 09/722,519.
Mar. 15, 2006, U.S. Appl. No. 09/722,519.
Nov. 22, 2005, U.S. Appl. No. 09/722,519.
Apr. 14, 2005, U.S. Appl. No. 09/722,519.
Aug. 10, 2004, U.S. Appl. No. 09/722,519.
Jan. 18, 2006, U.S. Appl. No. 09/722,463.
Jul. 27, 2005, U.S. Appl. No. 09/722,463.
Jan. 12, 2005, U.S. Appl. No. 09/722,463.
Jun. 6, 2005, U.S. Appl. No. 09/722,462.
Jun. 4, 2004, U.S. Appl. No. 09/722,462.
May 17, 2005, U.S. Appl. No. 09/722,460.
Jun. 18, 2004, U.S. Appl. No. 09/722,460.
Feb. 9, 2007, U.S. Appl. No. 09/722,456.
Aug. 11, 2006, U.S. Appl. No. 09/722,456.
Feb. 23, 2006, U.S. Appl. No. 09/722,456.
May 5, 2005, U.S. Appl. No. 09/722,456.
Jun. 16, 2004, U.S. Appl. No. 09/722,456.
Jul. 30, 2009, U.S. Appl. No. 09/539,773.
Jun. 24, 2009, U.S. Appl. No. 09/539,773.
Feb. 25, 2009, U.S. Appl. No. 09/539,773.
Aug. 25, 2008, U.S. Appl. No. 09/539,773.
Nov. 29, 2007, U.S. Appl. No. 09/539,773.
Nov. 24, 2006, U.S. Appl. No. 09/539,773.
Aug. 2, 2006, U.S. Appl. No. 09/539,773.
Apr. 4, 2006, U.S. Appl. No. 09/539,773.
Jun. 15, 2005, U.S. Appl. No. 09/539,773.
Jun. 22, 2004, U.S. Appl. No. 09/539,773.
Apr. 6, 2009, U.S. Appl. No. 09/520,344.
Oct. 23, 2008, U.S. Appl. No. 09/520,344.
Jun. 13, 2008, U.S. Appl. No. 09/520,344.
Dec. 26, 2007, U.S. Appl. No. 09/520,344.
Aug. 3, 2007, U.S. Appl. No. 09/520,344.
Jun. 23, 2005, U.S. Appl. No. 09/520,344.
Nov. 12, 2008, U.S. Appl. No. 09/441,892.
Apr. 29, 2008, U.S. Appl. No. 09/441,892.
Nov. 2, 2007, U.S. Appl. No. 09/441,892.
Jun. 18, 2007, U.S. Appl. No. 09/441,892.
Nov. 24, 2006, U.S. Appl. No. 09/441,892.
Feb. 3, 2006, U.S. Appl. No. 09/441,892.
May 17, 2005, U.S. Appl. No. 09/441,892.
Aug. 24, 2004, U.S. Appl. No. 09/441,892.
Jun. 19, 2009, U.S. Appl. No. 09/427,939.
Aug. 16, 2007, U.S. Appl. No. 09/427,939.
Mar. 29, 2007, U.S. Appl. No. 09/427,939.
Jun. 7, 2006, U.S. Appl. No. 09/427,939.
May 20, 2005, U.S. Appl. No. 09/427,939.
May 28, 2009, U.S. Appl. No. 09/427,938.
Dec. 3, 2008, U.S. Appl. No. 09/427,938.
Apr. 18, 2008, U.S. Appl.No. 09/427,938.
Oct. 19, 2007, U.S. Appl. No. 09/427,938.
Jun. 15, 2007, U.S. Appl. No. 09/427,938.
Jan. 31, 2007, U.S. Appl. No. 09/427,938.
Jun. 7, 2006, U.S. Appl. No. 09/427,938.
Apr. 25, 2005, U.S. Appl. No. 09/427,938.
Dec. 30, 2005, U.S. Appl. No. 09/400,296.
Apr. 8, 2005, U.S. Appl. No. 09/400,296.
Jun. 25, 2009, U.S. Appl. No. 09/391,461.
Jan. 7, 2009, U.S. Appl. No. 09/391,461.
Jul. 3, 2008, U.S. Appl. No. 09/391,461.
Dec. 13, 2007, U.S. Appl. No. 09/391,461.
Jun. 22, 2007, U.S. Appl. No. 09/391,461.
Nov. 17, 2006, U.S. Appl. No. 09/391,461.

(56) References Cited

OTHER PUBLICATIONS

Mar. 28, 2006, U.S. Appl. No. 09/391,461.
Jun. 15, 2005, U.S. Appl. No. 09/391,461.
Jun. 30, 2004, U.S. Appl. No. 09/391,461.
Aug. 10, 2009, U.S. Appl. No. 09/344,499.
Feb. 18, 2009, U.S. Appl. No. 09/344,499.
Feb. 8, 2008, U.S. Appl. No. 09/344,499.
Jun. 14, 2007, U.S. Appl. No. 09/344,499.
Dec. 15, 2006, U.S. Appl. No. 09/344,499.
Jun. 30, 2006, U.S. Appl. No. 09/344,499.
May 6, 2005, U.S. Appl. No. 09/344,499.
Jul. 13, 2009, U.S. Appl. No. 09/344,492.
Jan. 23, 2009, U.S. Appl. No. 09/344,492.
Aug. 5, 2008, U.S. Appl. No. 09/344,492.
Jan. 23, 2008, U.S. Appl. No. 09/344,492.
Jul. 11, 2007, U.S. Appl. No. 09/344,492.
Dec. 19, 2006, U.S. Appl. No. 09/344,492.
Jun. 26, 2006, U.S. Appl. No. 09/344,492.
Jan. 24, 2006, U.S. Appl. No. 09/344,492.
Jun. 6, 2005, U.S. Appl. No. 09/344,492.
Jan. 22, 2009, U.S. Appl. No. 09/335,268.
Jul. 9, 2008, U.S. Appl. No. 09/335,268.
Jan. 10, 2008, U.S. Appl. No. 09/335,268.
May 17, 2007, U.S. Appl. No. 09/335,268.
Oct. 2, 2006, U.S. Appl. No. 09/335,268.
Apr. 13, 2006, U.S. Appl. No. 09/335,268.
Oct. 28, 2005, U.S. Appl. No. 09/335,268.
Feb. 24, 2005, U.S. Appl. No. 09/335,268.
Feb. 19, 2009, U.S. Appl. No. 09/328,672.
Jun. 16, 2004, U.S. Appl. No. 09/328,672.
Jul. 7, 2009, U.S. Appl. No. 09/289,958.
Dec. 24, 2008, U.S. Appl. No. 09/289,958.
Jul. 29, 2008, U.S. Appl. No. 09/289,958.
Jan. 18, 2008, U.S. Appl. No. 09/289,958.
Jul. 31, 2007, U.S. Appl. No. 09/289,958.
Mar. 23, 2007, U.S. Appl. No. 09/289,958.
Jun. 6, 2006, U.S. Appl. No. 09/289,958.
Jan. 3, 2005, U.S. Appl. No. 09/289,958.
Jul. 22, 2009, U.S. Appl. No. 09/289,957.
Nov. 18, 2008, U.S. Appl. No. 09/289,957.
Mar. 25, 2008, U.S. Appl. No. 09/289,957.
Jul. 6, 2007, U.S. Appl. No. 09/289,957.
Oct. 11, 2006, U.S. Appl. No. 09/289,957.
Apr. 21, 2006, U.S. Appl. No. 09/289,957.
Nov. 3, 2005, U.S. Appl. No. 09/289,957.
Nov. 4, 2004, U.S. Appl. No. 09/289,957.
Sep. 9, 2009, U.S. Appl. No. 09/289,956.
Mar. 17, 2009, U.S. Appl. No. 09/289,956.
Nov. 13, 2008, U.S. Appl. No. 09/289,956.
Jun. 12, 2008, U.S. Appl. No. 09/289,956.
Mar. 22, 2007, U.S. Appl. No. 09/289,956.
Jul. 24, 2006, U.S. Appl. No. 09/289,956.
Jan. 30, 2006, U.S. Appl. No. 09/289,956.
Jun. 23, 2005, U.S. Appl. No. 09/289,956.
Oct. 3, 2007, U.S. Appl. No. 09/237,828.
Mar. 5, 2007, U.S. Appl. No. 09/237,828.
Sep. 8, 2006, U.S. Appl. No. 09/237,828.
May 12, 2005, U.S. Appl. No. 09/237,828.
Aug. 25, 2004, U.S. Appl. No. 09/237,828.
Aug. 28, 2009, U.S. Appl. No. 09/237,827.
Mar. 2, 2009, U.S. Appl. No. 09/237,827.
Aug. 18, 2008, U.S. Appl. No. 09/237,827.
Jan. 9, 2008, U.S. Appl. No. 09/237,827.
Jul. 23, 2007, U.S. Appl. No. 09/237,827.
May 16, 2007, U.S. Appl. No. 09/237,827.
Jan. 12, 2007, U.S. Appl. No. 09/237,827.
Aug. 2, 2006, U.S. Appl. No. 09/237,827.
Oct. 19, 2005, U.S. Appl. No. 09/237,827.
Jan. 26, 2005, U.S. Appl. No. 09/237,827.
Aug. 3, 2009, U.S. Appl. No. 09/237,826.
Feb. 13, 2009, U.S. Appl. No. 09/237,826.
Aug. 15, 2008, U.S. Appl. No. 09/237,826.
Dec. 7, 2007, U.S. Appl. No. 09/237,826.
Jun. 27, 2007, U.S. Appl. No. 09/237,826.
Dec. 19, 2006, U.S. Appl. No. 09/237,826.
Jun. 14, 2006, U.S. Appl. No. 09/237,826.
Dec. 6, 2005, U.S. Appl. No. 09/237,826.
Jun. 6, 2005, U.S. Appl. No. 09/237,826.
May 25, 2004, U.S. Appl. No. 09/237,826.
Jun. 15, 2005, U.S. Appl. No. 09/237,825.
Jun. 4, 2004, U.S. Appl. No. 09/237,825.
May 12, 1998, U.S. Appl. No. 08/336,247.
Jul. 24, 1997, U.S. Appl. No. 08/336,247.
Apr. 29, 1997, U.S. Appl. No. 08/336,247.
Aug. 28, 1996, U.S. Appl. No. 08/336,247.
Jun. 27, 1996, U.S. Appl. No. 08/336,247.
Nov. 1, 1995, U.S. Appl. No. 08/336,247.
IPER dated Mar. 6, 1996 for PCT/US94/13808.
Written Opinion dated Nov. 16, 1995 for PCT/US94/13808.
ISR dated Apr. 5, 1995 for PCT/US94/13808.
ISR dated Feb. 21, 2002 for PCT/US01/10559.
IPER dated Apr. 11, 2002 for PCT/US01/04946.
Written Opinion dated Dec. 4, 2001 for PCT/US01/04946.
ISR dated Oct. 16, 2001 for PCT/US01/04946.
Partial ISR dated Nov. 18, 2002 for PCT/US00/29813.
IPER dated Oct. 18, 2001 for PCT/US00/09542.
Written Opinion dated Jun. 19, 2001 for PCT/US00/01708.
ISR dated Jun. 26, 2000 for PCT/US00/01708.
ISR dated Feb. 4, 2003 for PCT/US00/29813.
IER dated Jan. 25, 2002 for PCT/US00/29813.
Written Opinion dated Sep. 5, 2001 for PCT/US00/29813.
ISR dated Feb. 21, 2003 for PCT/US00/29809.
IPER dated Feb. 11, 2002 for PCT/US00/29809.
Written Opinion dated Sep. 5, 2011 for PCT/US00/29809.
IPER dated Mar. 25, 2002 for PCT/US00/25826.
Written Opinion dated Nov. 2, 2001 for PCT/US00/25826.
ISR dated Jun. 22, 2001 for PCT/US00/25826.
Written Opinion dated May 29, 2001 for PCT/US00/09542.
ISR dated Nov. 2, 2000 for PCT/US00/09542.
ISR dated Nov. 2, 2000 for PCT/US00/09541.
IPER dated Feb. 14, 2002 for PCT/US00/31740.
Written Opinion dated Oct. 19, 2001 for PCT/US00/31740.
ISR dated Sep. 18, 2001 for PCT/US00/31740.
IPER dated Aug. 22, 2003 for PCT/US00/17266.
Written Opinion dated Jan. 31, 2003 for PCT/US00/17266.
ISR dated Sep. 21, 2001 for PCT/US00/15810.
ESR dated Oct. 4, 2005.
IPER dated Feb. 13, 2002 for PCT/US00/24819.
Written Opinion dated Aug. 13, 2001 for PCT/US00/24819.
ISR dated Dec. 7, 2000 for PCT/US00/24819.
ISR dated Jan. 18, 2001 for PCT/US00/17266.
IPER dated Sep. 8, 2001 for PCT/US00/15810.
IPER dated Jan. 2, 2002 for PCT/US00/09541.
Written Opinion dated Aug. 13, 2001 for PCT/US00/09541.
IPER dated Feb. 14, 2001 for PCT/US00/09543.
ISR dated Oct. 24, 2000 for PCT/US00/09543.
IPER dated Nov. 1, 2001 for PCT/US00/01708.
IPER dated Feb. 2, 2001 for PCT/US00/01625.
ISR dated Jul. 24, 2000 for PCT/US00/01625.
Tan, Q. et al., "A brief overview of current TV set-top box developments", Systems, Man, and Cybernetics, 1996, IEEE International Conference on: Oct. 14-17, 1996, 2127-2132.
Perry, T.S., "Consumer electronics", Spectrum, IEEE, Jan. 1997, vol. 34, No. 1, 43-48.
The Internet Protocol Journal, Dec. 1998, vol. 3, No. 1, http://www.noc.garr.it/docum/journal/ipj_dic_98.pdf.
T.P. David, "Networking requirements and solutions for a TV WWW Browser" 1997 from http://scholar.lib.vt.edu/theses/public/etd-82497-16476/materials/etd.pdf.
Atzori, L. et al., "Multimedia information broadcasting using digital TV channels", Broadcasting, IEEE Transactions on, Dec. 1997, vol. 43, No. 4, 383-392.

(56) References Cited

OTHER PUBLICATIONS

Encryption. Free On-line dictionary of computing: http://foldoc.doc.ic.ac.uk/foldoc/2003-04-12.
Encode. Free On-line dictionary of computing: http://foldoc.doc.ic.ac.uk/foldoc/1999-07-06.
The project Gutenberg entitled: "The Bible: Old and New Testaments, King James Version by Anonymous", released on Aug. 1, 1989.
"'Optical Disks' May Be Books of the Future", Steven Kosek and Dennis Lynch; Chicago Tribune, Sep. 15, 1985, p. 31.
"Transmission Control Protocol; Request for Comment 793", Sep. 1981, pp. 1-85.
Technology Update, Wordperfect Corporation Introduces Wordperfect 6.0 for DOS, http://www.nfbnet.org/files/word_processing/WP60.TXT, Mar. 24, 1993.
T.V. Raman, An Audio View of (LA)Tex Documents, Proceedings of the 1191 Annual Meeting, pp. 1001-1008.
Microsoft Press Computer Dictionary Second Edition, Microsoft Press, 1994, p. 418.
T.V. Raman, "An Audio View of (LA)Tex Documents," Proceedings of the 1191 Annual Meeting, pp. 1001-1008.
Herron T.L., " Teaching with the Internet" Internet and Higher Education, US, JAI Press, Stamford, CT, vol. 1, No. 3, 1998, pp. 217-222, XP002118719, ISSN: 1096-7516.
Azuma J., "Creating Educational Web Sites", IEEE Communications Magazine, US, IEEE Service Center, Piscataway, N.J., vol. 37, No. 3, Mar. 1999, pp. 109-113, XP000823980, ISSN: 0163-6804.
Goldberg, M.W. et al., "World Wide Web-Course tool: An environment for building WWW-based courses", Computer Networks and ISDN Systems, NL, North Holland Publishing, Amsterdam, vol. 28, No. 11, May 1, 1996, pp. 1219-1231, XP004018222, ISSN: 0169-7552.
An Interactive Lesson in the Interactive Course Series, Waite Group Press, Macmillan Computer Publishing, 'Online! 1996, XP000829591, Retrieved from the Internet: URL:http://www.waite.com/>retrieved on 1996.
Goorfin, L., "Electronic Dictionary Pronounces over 83,000 Words", Speech Technology, Man-Machine Voice Communications, US, Media Dimensions Inc., New York, vol. 4, No. 4, Apr. 1, 1989, pp. 78-79, XP000033505, ISSN: 0744-1355.
Hartley, S. et al., "Enhancing Teaching Using the Internet", SIGCSE/SIGCUE Conference on Integrating Technology into Computer Science Education, US, New York, ACM, vol. Conf. 1, Jun. 2, 1996, pp. 218-228, ISBN: 0-89791-844-4.
Seno, H. et al., "A Consideration of Data Transmission Method for Enhanced Teletext", NHK Science and Technical Research Laboratories, ITEJ Technical Report, vol. 16, No. 71, Oct. 1992, Japan, pp. 1-6.
Cerf, V. et al., "A protocol for Packet Network Intercommunication," May 1974, IEEE Transactions on Communications col. COM-22, No. 5, 637-647.
Holzmann, G., "Design and Validation of Computer Protocols," Nov. 1990, Prentice Hall, pp. 1-512.
Hearst, "Changing Network Society: New Technology in the Internet," (the original title: Interfaces for Searching the Web), Dec. 1998, Japan Nikkei Science, 1st edition, 80-85.
Shunji Ichiyama, "WWW-based Digital Library System," Jul. 1996, NEC Giho (technical journal), NEC Creative, vol. 49, 33-39.
Minoru Ashizawa, "Using Digital Libraries as a Community Hall for Worldwide Information Spiral Development," May 1998, Journal of the Institute of Electronics, Information and Communication Engineers, Japan, vol. J81-D-II, No. 5, 1014-1024.
Akira Kojima, "Navigable Digital Library System Using Video-based Walk-through Technology," Mar. 1996, Technical Research Report of the Institute of Electronics, Information and Communication Engineers, Japan, vol. 95, No. 580, 31-36.
Toshiyuki Kamiya, "Development of Electronic Library Interface with 3D Walk-through and CG Librarian," Jan. 1995, Research Report of Information Processing Society of Japan, vol. 95, No. 1, 27-35.
Mamoru Sato, "Electronic Library Search using Animation," Apr. 1989, Science and Technology Information Service, Japan, National Diet Library, No. 88, 11-17.
Mamoru Sato, "SON-GO-KU: A dream of Automated Library," Mar. 1989, Joho Kanri (Journal of Information Processing and Management), the Japan Information Center of Science and Technology, vol. 31, No. 12, 1023-1034.
English language translation of citation No. 12, JP08008851.
English language translation of citation No. 13, JP09237096.
English language translation of citation No. 14, JP10070530.
Aug. 25, 2010, U.S. Appl. No. 12/391,044.
Jul. 28, 2010, U.S. Appl. No. 12/010,045.
Jun. 4, 2010, U.S. Appl. No. 12/010,045.
Mar. 24, 2010, U.S. Appl. No. 12/010,045.
Oct. 27, 2010, U.S. Appl. No. 11/785,959.
Jan. 26, 2010, U.S. Appl. No. 11/785,959.
Oct. 6, 2010, U.S. Appl. No. 09/964,883.
Sep. 13, 2010, U.S. Appl. No. 09/722,626.
Mar. 26, 2010, U.S. Appl. No. 09/722,626.
Nov. 25, 2009, U.S. Appl. No. 09/722,626.
Aug. 26, 2010, U.S. Appl. No. 09/539,773.
Mar. 1, 2010, U.S. Appl. No. 09/539,773.
Jun. 3, 2010, U.S. Appl. No. 09/520,344.
Oct. 21, 2009, U.S. Appl. No. 09/520,344.
Jun. 4, 2010, U.S. Appl. No. 09/427,939.
Dec. 30, 2009, U.S. Appl. No. 09/427,938.
Sep. 15, 2010, U.S. Appl. No. 09/391,461.
Jan. 6, 2010, U.S. Appl. No. 09/391,461.
Jul. 27, 2010, U.S. Appl. No. 09/344,499.
Jan. 28, 2010, U.S. Appl. No. 09/344,499.
Aug. 18, 2010, U.S. Appl. No. 09/344,492.
Jan. 29, 2010, U.S. Appl. No. 09/344,492.
Nov. 2, 2009, U.S. Appl. No. 09/328,672.
Aug. 2, 2010, U.S. Appl. No. 09/289,958.
Jan. 13, 2010, U.S. Appl. No. 09/289,958.
May 13, 2010, U.S. Appl. No. 09/289,957.
Jul. 8, 2010, U.S. Appl. No. 09/289,956.
Mar. 18, 2010, U.S. Appl. No. 09/289,956.
Aug. 19, 2010, U.S. Appl. No. 09/237,827.
Jan. 21, 2010, U.S. Appl. No. 09/237,827.
Jun. 29, 2010, U.S. Appl. No. 09/237,826.
Mar. 15, 2010, U.S. Appl. No. 09/237,826.
English language translation of citation No. 85, JP10134080.
English language translation of citation No. 87, JP10275186.
English language translation of citation No. 88, JP10301946.
English language translation of citation No. 90, JP10327397.
English language translation of citation No. 92, JP11250145.
English language translation of citation No. 93, JP11084999.
Gifford, David K. et al., "The Application of Digital Broadcast Communication to Large Scale Information Systems," IEEE Journal on Selected Areas in Communications, vol. SAC-3, No. 3, May 1985, pp. 457-467.
Antelman, K et al. "Collection Development in the Electronic Library". Toward New Horizons, ACM SIGUCCS XXI, 1993, pp. 50-56.
Henry Kisor Chicago Sun Times. Videotex: Swapping Hardcovers For Software. ProQuest. Boston, Massachusetts, Jan. 23, 1983, pp. 1-3.
Japanese Office Action issued Dec. 13, 2010; Application No. 2001-525893.
Japanese Office Action issued Nov. 19, 2010; Application No. 2000-596729.
Japanese Office Action issued Nov. 22, 2012; Application No. 2011-058209.
Japanese Office Action issued Sep. 10, 2012; Application No. 2011-179434.
Shigeo Tsujii, "Cryptography and Information Security", Shokodo Co. Ltd., Mar. 29, 1990, 1st edition.

\* cited by examiner

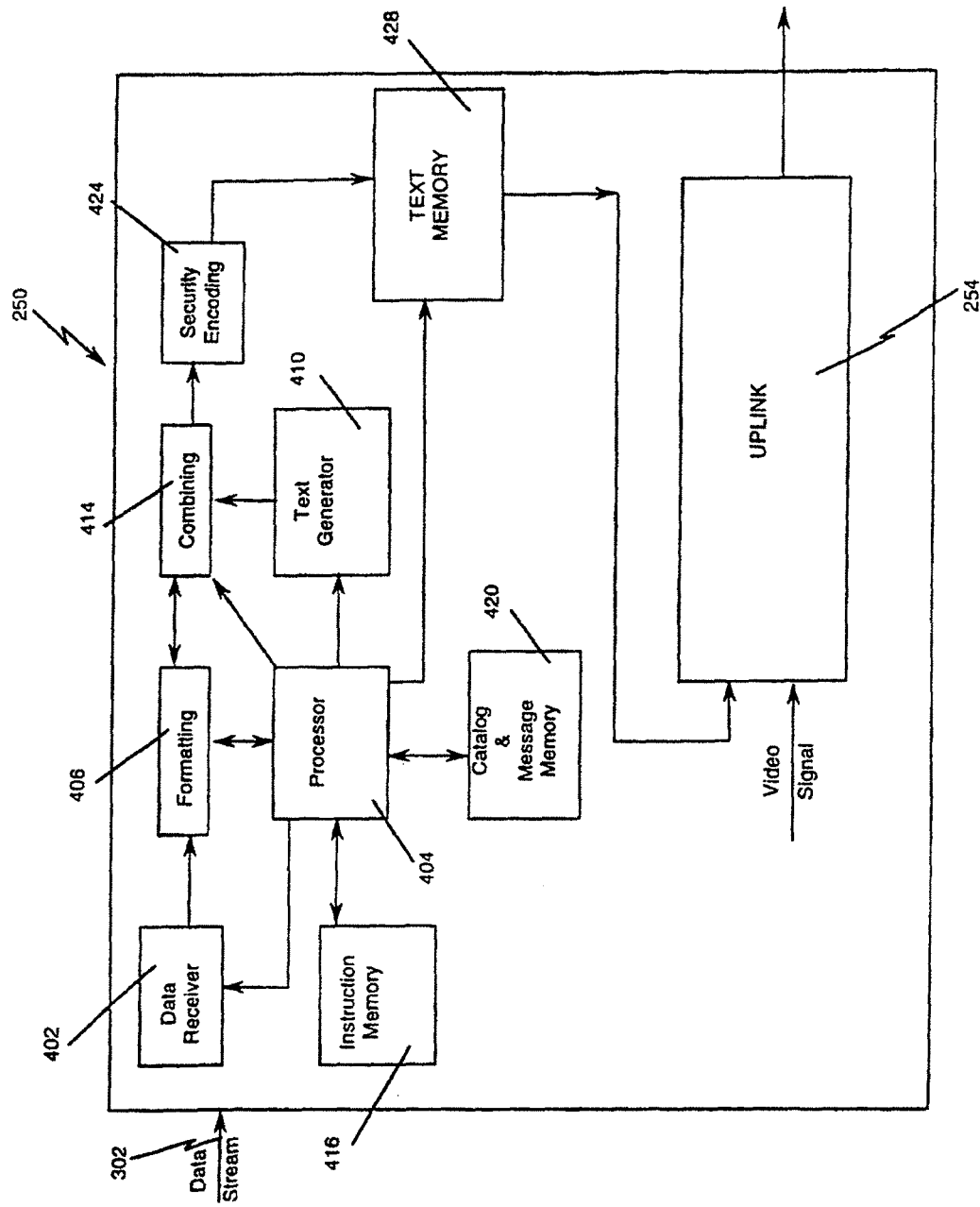

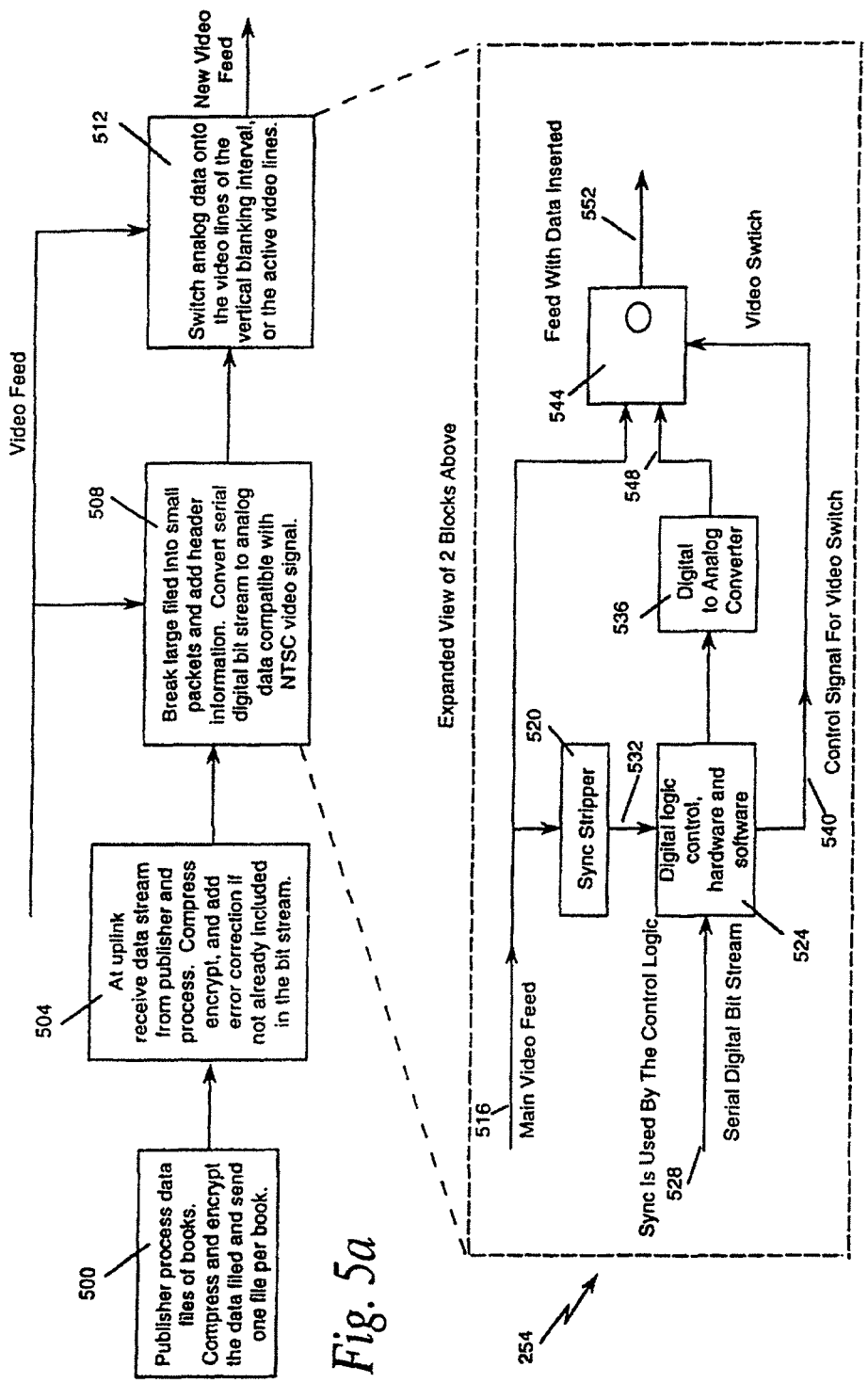

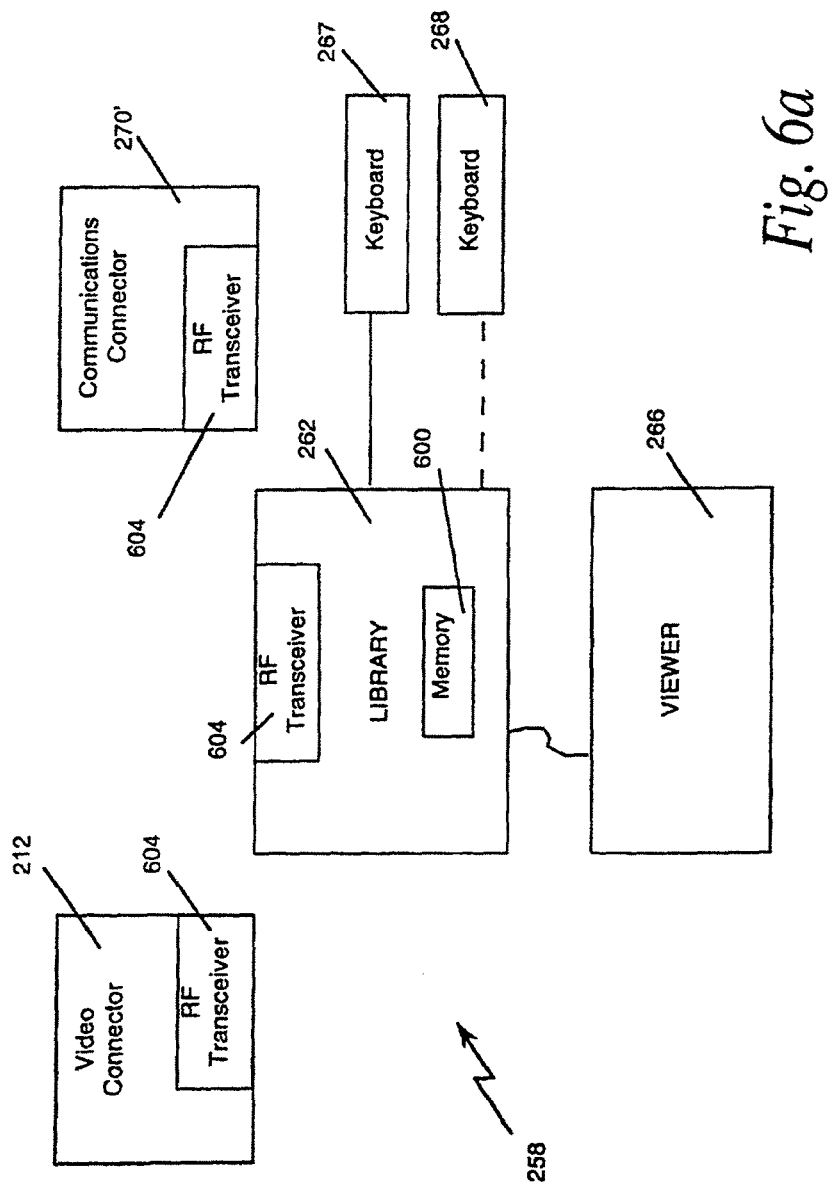

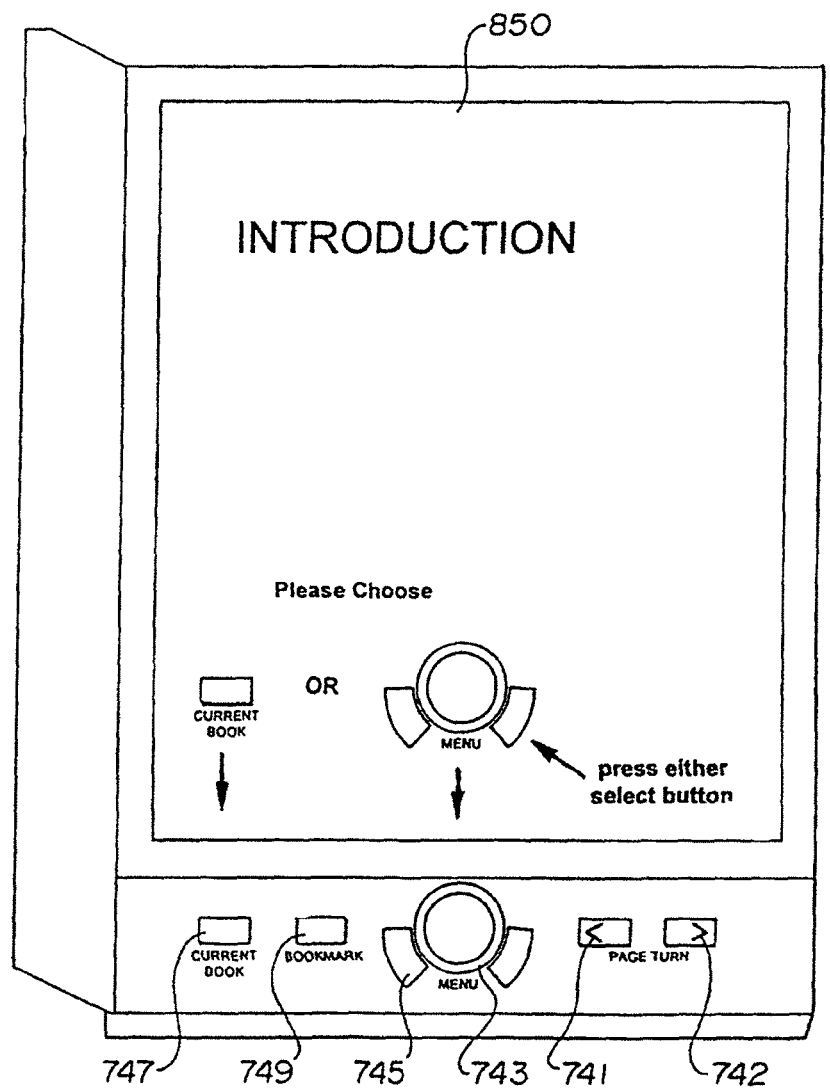

ical demands, the resignation of Gorbachev. To be sure, as part of Ukraine, Donbas was now on Leonid Kravchuk's conscience. Vorkuta and Kuzbas were coal-mining areas I had visited a number of times and to which I would certainly return. Their demands were harshly formulated at times, and they expected a great deal from me, but they supported me during the tough reforms.

We have a saying in Russia that when you chop wood, the chips fly. Although Khasbulatov tried his best to portray the miners as economic chips flying from the Gaidar team's woodcutting, their demand did not fit the picture. These miners were not against reform. Nevertheless, they did try to defend their economic interests, insisting that such hard work should be rewarded with part of the overall profits from the industry. Unfortunately, we did not have precise mechanism to turn such enterprises as coal mines into joint stock companies. There were long, hard negotiations under way constantly.

I must say that in the spring and summer of 1992, when the work *stoppage* resounded throughout the country (the work stoppage on trains with coal, the stoppage on factory floors, the stoppage of transportation), my aide Yuri Skokov very courageously conducted the negotiations with the miners.

I met Yuri Skokav when I worked at the Moscow City Executive Committee, He was director of Quannum, a large defense plant, and he had run for elections to the Soviet parliament against Vitaly Korotich, a prominent writer and journalist who at the time was editor in chief of *Ogonoyok(Little Flame)*, a pioneer of glasnost. Due to various backroom deals and party scheming (described in Against the Grain), Skokov won the election and proved himself to be a disciplined party protégé.

Skokov is an intelligent man - that is the first thing that must be said about him. And very hard and taciturn. Many people were asking what his role was in my inner circle. It was a legitimate question. Skokov was actually the "shadow" prime minister whom I had always had in mind. Both Silayev, under whom Skokov chaired the Supreme Economic Council, and Gaidar, on whose watch Skokov became chairman of the Security Council, sensed a latent threat

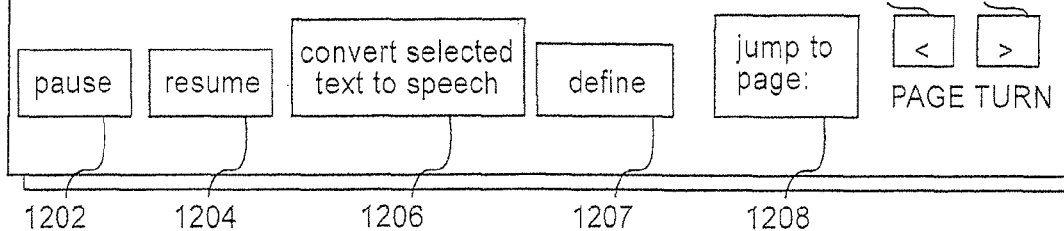

FIG.23 ical demands, the resignation of Gorbachev. To be sure, as part of Ukraine, Donbas was now on Leonid Kravchuk's conscience. Vorkuta and Kuzbas were coal-mining areas I had visited a number of times and to which I would certainly return. Their demands were harshly formulated at times, and they expected a great deal from me, but they supported me during the tough reforms.

We have a saying in Russia that when you chop wood, the chips fly. Although Khasbulatov tried his best to portray the miners as economic chips flying from the Gaidar team's woodcutting, their demand did not fit the picture. These miners were not against reform. Nevertheless, they did try to defend their economic interests, insisting that such hard work should be rewarded with part of the overall profits from the industry. Unfortunately, we did not have precise mechanism to turn such enterprises as coal mines into joint stock companies. There were long, hard negotiations under way constantly.

I must say that in the spring and summer of 1992, when the work *stoppage* resounded throughout the country (the work stoppage on trains with coal, the stoppage on factory floors, the stoppage of transportation), my aide Yuri Skokov very courageously conducted the negotiations with the miners.

I met Yuri Skokav when I worked at the Moscow City Executive Committee, He was director of Quannum, a large defense plant, and he had run for elections to the Soviet parliament against Vitaly Korotich, a prominent writer and journalist who at the time was editor in chief of *Ogonoyok(Little Flame)*, a pioneer of glasnost. Due to various backroom deals and party scheming (described in Against the Grain), Skokov won the election and proved himself to be a disciplined party protégé.

Skokov is an intelligent man - that is the first thing that must be said about him. And very hard and taciturn. Many people were asking what his role was in my inner circle. It was a legitimate question. Skokov was actually the "shadow" prime minister whom I had always had in mind. Both Silayev, under whom Skokov chaired the Supreme Economic Council, and Gaidar, on whose watch Skokov became chairman of the Security Council, sensed a latent threat

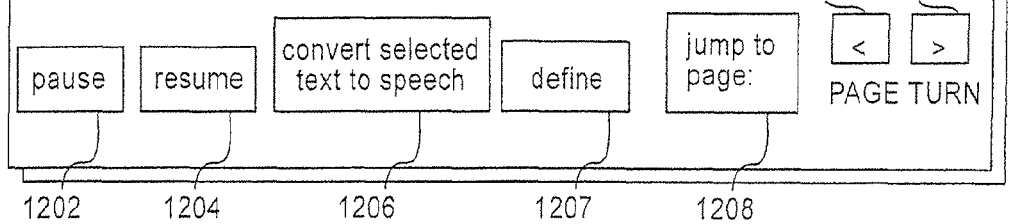

FIG.24 ical demands, the resignation of Gorbachev. To be sure, as part of Ukraine, Donbas was now on Leonid Kravchuk's conscience. Vorkuta and Kuzbas were coal-mining areas I had visited a number of times and to which I would certainly return. Their demands were harshly formulated at times, and they expected a great deal from me, but they supported me during the tough reforms.

We have a saying in Russia that when you chop wood, the chips fly. Although Khasbulatov tried his best to portray the miners as economic chips flying from the Galdar team's woodcutting, their demand did not fit the picture. These miners were not against reform. Nevertheless, they did try to defend their economic interests, insisting that such hard work should be rewarded with part of the overall profits from the industry. Unfortunately, we did not have precise mechanism to turn such enterprises as coal mines into joint stock companies. There were long, hard negotiations under way constantly.

→ Speech converted to text.

I must say that in the spring and summer of 1992, when the work *stoppage* resounded throughout the country (the work stoppage on trains with coal, the stoppage on factory floors, the stoppage of transportation), my aide Yuri Skokov very courageously conducted the negotiations with the miners.

I met Yuri Skokov when I worked at the Moscow City Executive Committee. He was director of Quannum, a large defense plant, and he had run for elections to the Soviet parliament against Vitaly Korotich, a prominent writer and journalist who at the time was editor in chief of *Ogonoyok[Little Flame]*, a pioneer of glasnost. Due to various backroom deals and party scheming (described in *Against the Grain*), Skokov won the election and proved himself to be a disciplined party protégé.

| begin dictation | end dictation | | jump to page: | < | > |
|---|---|---|---|---|---|
| | | | | PAGE TURN | |

FIG. 30a ical demands, the resignation of Gorbachev. To be sure, as part of Ukraine, Donbas was now on Leonid Kravchuk's conscience. Vorkuta and Kuzbas were coal-mining areas I had visited a number of times and to which I would certainly return. Their demands were harshly formulated at times, and they expected a great deal from me, but they supported me during the tough reforms.

We have a saying in Russia that when you chop wood, the chips fly. Although Khasbulatov tried his best to portray the miners as economic chips flying from the Galdar team's woodcutting, their demand did not fit the picture. These miners were not against reform. Nevertheless, they did try to defend their economic interests, insisting that such hard work should be rewarded with part of the overall profits from the industry. Unfortunately, we did not have precise mechanism to turn such enterprises as coal mines into joint stock companies. There were long, hard negotiations under way constantly.

speech converted to text

I must say that in the spring and summer of 1992, when the work *stoppage* resounded throughout the country (the work stoppage on trains with coal, the stoppage on factory floors, the stoppage of transportation), my aide Yuri Skokov very courageously conducted the negotiations with the miners.

I met Yuri Skokov when I worked at the Moscow City Executive Committee. He was director of Quannum, a large defense plant, and he had run for elections to the Soviet parliament against Vitaly Korotich, a prominent writer and journalist who at the time was editor in chief of *Ogonoyok [Little Flame]*, a pioneer of glasnost. Due to various backroom deals and party scheming (described in *Against the Grain*), Skokov won the election and proved himself to be a disciplined party protégé.

begin dictation | end dictation | jump to page: | < > PAGE TURN

*Fig. 30b*

ELECTRONIC BOOK WITH VOICE EMULATION FEATURES

CROSS-REFERENCE TO RELATED APPLICATION

This application is a Continuation of U.S. application Ser. No. 13/298,898, filed Nov. 11, 2011, which is a divisional of U.S. application Ser. No. 09/344,499, filed Jun. 25, 1999. These prior applications are hereby incorporated by reference herein in their entirety.

RELATED APPLICATIONS

This application is a divisional of U.S. application Ser. No. 09/344,499, filed Jun. 25, 1999, which is a continuation-in-part of U.S. application Ser. No. 08/336,247 entitled ELECTRONIC BOOK SELECTION AND DELIVERY SYSTEM, filed Nov. 7, 1994, now U.S. Pat. No. 5,986,690, which is a continuation-in-part of U.S. application Ser. No. 08/160,194 entitled ADVANCED SET-TOP TERMINAL FOR CABLE TELEVISION DELIVERY SYSTEMS, filed Dec. 2, 1993, now U.S. Pat. No. 5,990,927; and U.S. application Ser. No. 08/906,469, entitled REPROGRAMMABLE TERMINAL FOR SUGGESTING PROGRAMS OFFERED ON A TELEVISION PROGRAM DELIVERY SYSTEM, filed Aug. 5, 1997, now U.S. Pat. No. 6,408,437, which is a continuation of U.S. application Ser. No. 08/160,281, entitled TERMINAL FOR SUGGESTING PROGRAMS OFFERED ON A TELEVISION PROGRAM DELIVERY SYSTEM, filed Dec. 2, 1993, now U.S. Pat. No. 5,798,785, dated Aug. 25, 1998, which is a continuation-in-part of U.S. application Ser. No. 07/991,074, filed Dec. 9, 1992, all of which are incorporated herein by reference.

This application is related to U.S. application Ser. No. 09/237,828, filed on Jan. 27, 1999, entitled ELECTRONIC BOOK ELECTRONIC LINKS, U.S. application Ser. No. 09/289,957, filed on Apr. 13, 1999, entitled ELECTRONIC BOOK ALTERNATIVE DELIVERY SYSTEMS, and U.S. application Ser. No. 09/289,956, filed on Apr. 13, 1999, entitled ELECTRONIC BOOK ALTERNATIVE DELIVERY METHODS, all of which are incorporated herein by reference.

TECHNICAL FIELD

This invention is directed to an electronic book unit having one or more electronic books. More specifically, the invention relates to an apparatus and method for providing text-to-speech and speech recognition features for electronic books.

BACKGROUND ART

Sparked by the concept of an information superhighway, a revolution will take place in the distribution of books. Not since the introduction of Gutenberg's movable typeset printing has the world stood on the brink of such a revolution in the distribution of text material. The definition of the word "book" will change drastically in the near future. Due to reasons such as security, convenience, cost, and other technical problems, book and magazine publishers are currently only able to distribute their products in paper form. This invention solves the problems encountered by publishers.

SUMMARY OF INVENTION

Methods and apparatus consistent with the present invention include features for text-to-speech conversion and speech recognition for electronic books. In one embodiment, the methods and apparatus display a page of an electronic book on a viewer, the page including text. They receive a selection of text on the displayed page for conversion to speech and convert at least a portion the selected text into the corresponding speech. They may alternatively automatically display a next page of the electronic book and convert at least a portion of text on the next page into corresponding speech, or automatically perform the conversion upon selection of the next page by a user.

In one embodiment, a user selects a portion of displayed text and converts it into audio. The text-to-audio conversion may be performed via a header file and pre-recorded audio for each electronic book, via text-to-speech conversion, or other available means. The user may select manual or automatic text-to audio conversion. The automatic text-to-audio conversion may be performed by automatically turning the pages of the electronic book or by the user manually turning the pages. The user may also select to convert the entire electronic book, or portions of it, into audio. The user may also select an option to receive an audio definition of a particular word in the electronic book. The present invention allows a user to control the system by selecting options from a screen or by entering voice commands.

For voice or audible commands, the methods and apparatus receive an audible command relating to a function of the electronic book. They convert the audible command into a corresponding electronic signal and execute the function in response to the electronic signal.

BRIEF DESCRIPTION OF DRAWINGS

FIG. 4 is a block diagram of an operations center.

FIG. 5a is a flow diagram of the processing at the operations center and uplink.

FIG. 5b is a block diagram of the hardware configuration for an uplink site.

FIG. 6a is a block diagram of the hardware configuration for a four component home subsystem.

FIG. 14a is a schematic of an introductory menu.

FIG. 23 is a diagram of a page of an electronic book.

FIG. 24 is a diagram of a page of an electronic book illustrating selected text for conversion to speech.

FIG. 30a is a diagram of a page of an electronic book with transcribed text.

FIG. 30b is a diagram of a page of an electronic book with a section for presenting transcribed text.

DETAILED DESCRIPTION

Figure 1:
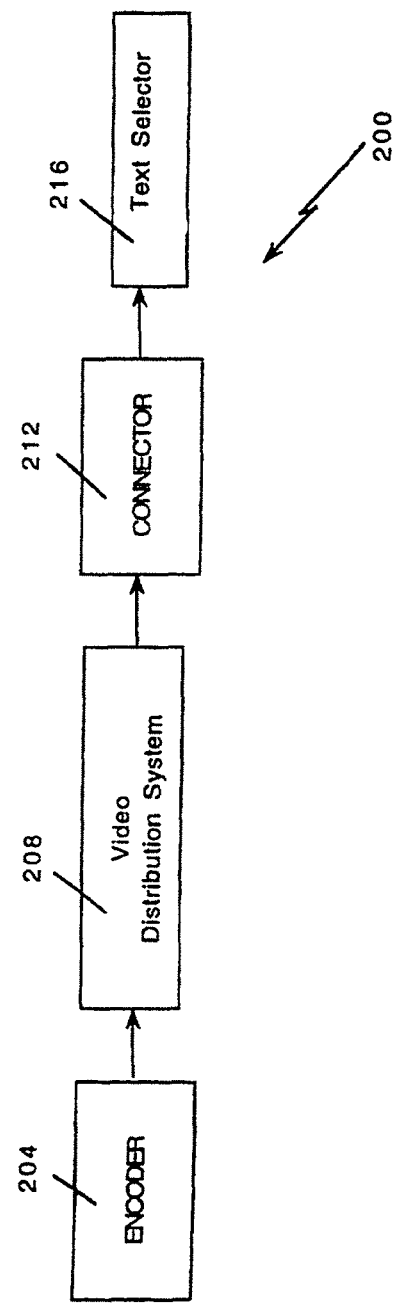
FIG. 1 is a block diagram of the primary components of the electronic book selection and delivery system.

An electronic book selection and delivery system is a new way to distribute electronic books to bookstores, public libraries, schools and consumers. The technological breakthroughs of this invention provide a secure system for both delivering selected electronic books and receiving payments. The system has an unusual combination of features that provides the consumer with an electronic book unit that has a high tech aura while being very practical, portable, and easy to use.

The clear advantage of the system is that it eliminates the distribution of any physical object such as a paper book or computer memory device from any book or text distribution system. The purchase of an electronic book may become a PAY-PER-READ™ event avoiding the overhead, "middlemen," printing costs, and time delay associated with the current book distribution system. Published material and text such as the President's speech, a new law, a court decision on abortion, or O. J. Simpson's testimony can be made immediately available to the consumer at a nominal fee.

The system is a novel combination of new technology involving the television, cable, telephone, and computer industries. It uses high bandwidth data transmissions, strong security measures, sophisticated digital switching, high resolution visual displays, novel controls, and user friendly interface software.

The primary components of the text delivery system are the subsystem for placing the text onto a signal path and the subsystem for receiving and selecting text that was placed on the signal path. A preferred embodiment of the system includes additional components and optional features that enhance the system. The system may be configured for use by bookstores, public libraries, schools and consumers.

The system for consumer use is made up of four subsystems, namely: (1) an operations center, (2) a distribution system, (3) a home subsystem including reception, selection, viewing, transacting and transmission capabilities, and (4) a billing and collection system.

The operations center performs several primary functions: manipulating text data (including receiving, formatting and storing of text data), security encoding of text, cataloging of books, providing a messaging center capability, and performing uplink functions. The system delivers the text from the operations center to consumer homes by inserting text data into an appropriate signal path. The insertion of text is generally performed with an encoder at an uplink site that is within or near the operations center. If the signal path is a video signal path, the system can use several lines of the Vertical Blanking Interval (VBI), all the lines of the analog video signal, a digital video signal or unused portions of bandwidth to transmit text data. Using the VBI delivery method, the top ten or twenty book titles may be transmitted with video during normal programming utilizing existing cable, satellite, wireless or broadcast transmission capability without disruption to the subscriber's video reception. Using the entire video signal, thousands of books may be transmitted within just one hour of air time. Nearly any analog or digital video distribution system may be used to deliver the video signal with included text.

The text data may also be transmitted over other low and high speed signal paths including a telephone network (e.g., a public switched telephone network) having a high speed connection such as an asynchronous digital subscriber line (ADSL) connection. Alternatively, other delivery systems may be used, such as those disclosed in the related applications identified above.

The home subsystem performs four primary functions: connecting to the video distribution system, selecting text, storing text, and transacting through a phone or cable communicating mechanism. The components of the home subsystem may be configured in a variety of hardware configurations. Each function may be performed by a separate component, the components may be integrated, or the capability of existing cable set top converter boxes, personal computers, and televisions may be utilized. Preferably, a connector, library unit and an electronic book unit, or viewer unit, are used. The connector portion of the home subsystem receives the analog video signal and strips or extracts the text from the video. The home library stores the text signal, provides a user friendly software interface to the system and processes the transactions at the consumer home. The viewer provides a screen for viewing text or menus and novel user friendly controls. The viewer may also incorporate all the functionality of the home subsystem.

The viewing device is preferably a portable book shaped viewer which stores one or more electronic books for viewing and provides a screen for interacting with the home library unit. A high resolution LCD display is used to both read the books and to interact with the home library software. An optional phone connector or return-path cable connection initiates the telephone calls and, with the aid of the library, transmits the necessary data to complete the ordering and billing portion of the consumer transaction. The user friendly controls include a bookmark, current book and page turn button. The billing and collection system performs transaction management, authorizations, collections and publisher payments automatically utilizing the telephone system. Alternatively, other ordering methods may be used, such as those disclosed in the related applications identified above.

In one embodiment, the primary components of the electronic book selection and delivery system 200 are an encoder 204, a video distribution system 208, a connector 212, and a text selector 216 as shown in FIG. 1. The encoder 204 places textual data on a video signal to form a composite video signal. Although the composite signal may contain only textual data, it usually carries both video and textual data. A variety of equipment and methods may be used to encode text data onto a video signal. The video distribution system 208 distributes the composite video signal from the single point of the encoder 204 to multiple locations which have connectors 212. The connector 212 receives the digital or analog video signal from the video distribution system 208 and separates, strips or extracts the text data from the composite video signal. If necessary, the extracted text data is converted into a digital bit stream. Text selector 216 works in connection with the connector 212 to select text.

Using a connector 212 and text selector 216 combination, various methods of selecting and retrieving desired text from a composite or video signal are possible. Text may be preselected, selected as received or selected after being received and stored. A preferred method is for the connector 212 to strip or extract all the text from the video signal and have the text selector 216 screen all the text as received from the connector 212. The text selector 216 only stores text in long term or permanent memory if the text passes a screening process described below.

Figure 2:
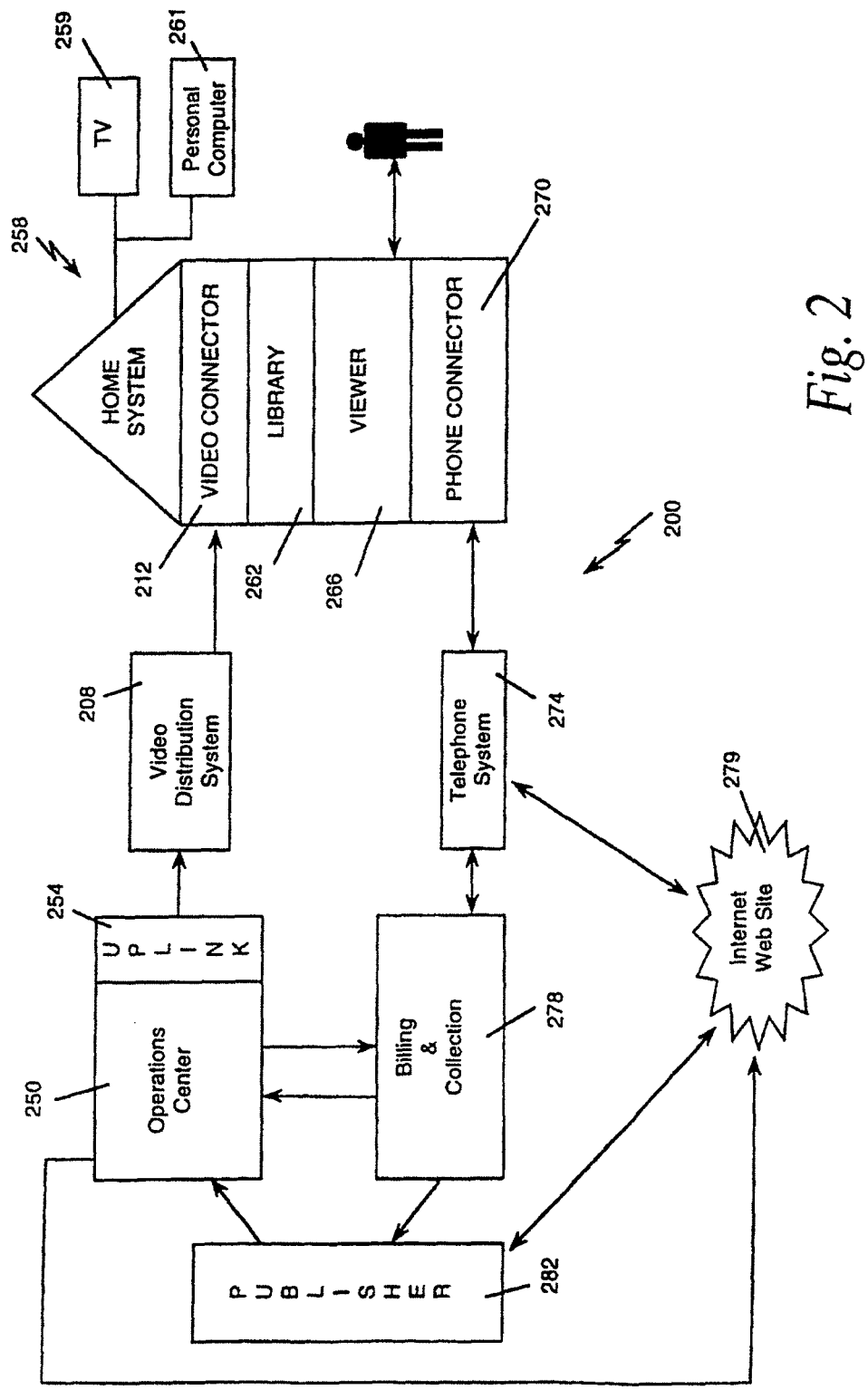
FIG. 2 is a schematic showing an overview of the electronic book selection and delivery system.

An overview of the electronic book selection and delivery system 200 is shown in FIG. 2. The delivery system 200 includes: an operations center 250 including an uplink site 254, a video distribution system 208, a home system 258 including a video connector 212, a library 262, a viewer 266, and a phone connector 270, telephone system 274, an internet web site 279 and a billing and collection system 278. Also as shown in FIG. 2, the home system 258 may include connections to a television 259 and a personal computer 261. The television 259 and the personal computer 261 may be used to display menu screens, electronic books, electronic files, or any other information associated with the delivery system 200. In addition, the television 259 and the personal computer 261 may provide control function that replicate and supplement those of the viewer 266.

The operations center 250 receives textual material from outside sources 282 such as publishers, newspapers, and on-line services. Alternately, the outside sources may maintain electronic books at the Internet web site 279. The outside sources 282 may convert textual and graphical material to digital format, or may contract with another vendor to provide this service. The operations center 250 may receive the textual and graphical material in various digital formats and may convert the textual material to a standard compressed format for storage. In so doing, the operations center 250 may create a pool of textual material that is available to be delivered to the home system 258. The textual material may be grouped by books or titles for easy access.

As used herein, "book" means textual or graphical information such as contained in any novels, encyclopedias, articles, magazines or manuals. The term "title" may represent the actual title assigned by an author to a book, or any other designation indicating a particular group, portion, or category of textual information. The title may refer to a series of related textual information, a grouping of textual information, or a portion of textual data. For example, "Latest Harlequin Romance", "Four Child Reading Books (Ages 10-12)", "Encyclopedia 'BRITANNICA'™", "President's Speech", "Instruction Manual", "Schedule of 4th of July Events", "Pet Handbooks", "Roe v. Wade", and "The Joy of Cooking" are suitable titles. Also, the title may be a graphical symbol or icon. Thus, a picture of a wrench may be a title for a repair book, a picture of a computer a title for a computer book, a graphical symbol of a telephone a title for a telephone book, a drawing of a dagger a title for a mystery book, a picture of a bat and ball a title for a sports book and a picture of ticker-tape a title for a business book. The term "electronic book" refers to the electronic counterpart to a "book."

The operations center 250 includes an uplink site 254 for placing the text onto a video signal and sending the composite video signal into a video distribution system. The uplink site 254 would generally include an encoder 204 (not shown in FIG. 2) to encode the text onto a video signal.

Many analog and digital distribution systems 208, or other telecommunications systems, can be used with the delivery system 200, such as a cable television distribution system, a broadcast television distribution system, video distributed over telephone systems, distribution from the Internet, direct satellite broadcast distribution systems, and other wired and wireless distribution systems.

The home system 258 performs five primary functions: (1) connecting with a video distribution system, (2) selecting data, (3) storing data, (4) displaying data, and (5) handling transactions. An important optional function of the home sub-system 258 is communicating using a telephone communication system 274. The home system 258 is made up of primarily four parts: a video connector 212 or similar type of connector for connecting with the video distribution system 208, a library unit 262 for storing and processing, an electronic book, or viewer unit, 266 for viewing menus and text and a telephone connector 270 for connecting with a telephone communications system 274. In an alternate arrangement, the viewer 266 may include all the functionality of the home system 258.

The billing and collection system 278 may be co-located with the operations center 250 or located remote from the operations center 250. In one embodiment, the billing and collection system 278 is in communication with the home system 258 via telephone-type communication systems (for example 274). Any of a number of telephone type communication systems, such as, a cellular system, will operate with the billing and collection system 278. The billing and collection system 278 records the electronic books or portions of text that are selected or ordered by the subscriber. The collection system will charge a subscriber's credit account or bill the subscriber. In addition, the billing and collection system 278 will monitor that amount due to publishers or other outside sources 282 who have provided textual data or other services such as air time to enable the text delivery system 200 to operate.

When electronic books are provided via the Internet web site 279, the billing and collecting functions may be incorporated into the Internet web site 279. For example, a subscriber may pay for an electronic book selection by entering a credit card number into a data field of a page of the Internet web site 279. In this configuration, a separate billing and collection system may not be required.

Figure 3A:
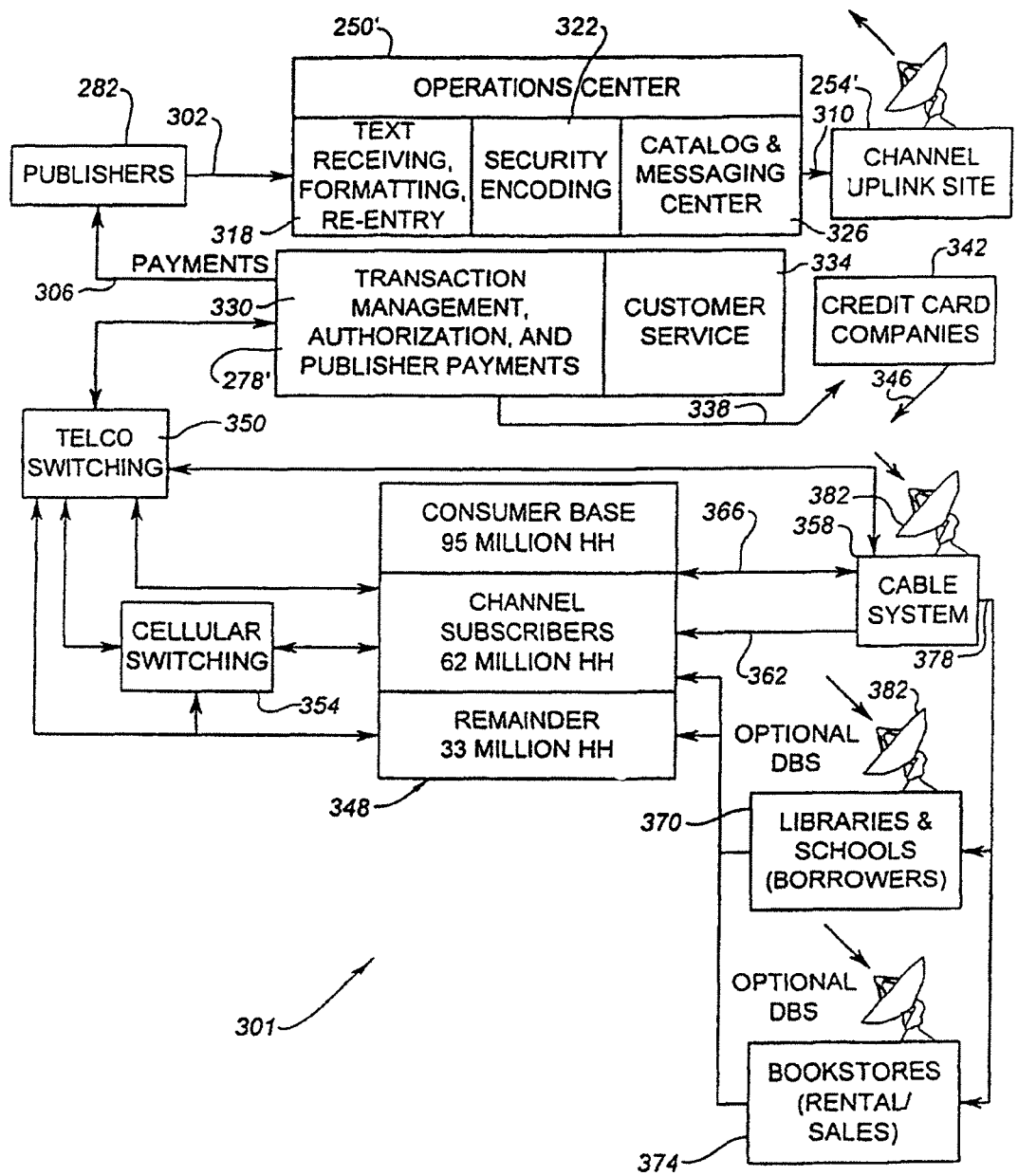
FIG. 3a is a schematic of the delivery plan for the electronic book selection and delivery system.

FIG. 3a is an expanded overview of a delivery plan 301 for the delivery system 200. The delivery plan 301 supports various types of subscribers and various billing systems. FIG. 3a shows that publishers 282 will provide text transfer 302 to the operations center 250' and receive payments 306 from the billing and collection system 278'. A separate channel uplink site 254' is shown in this configuration receiving data 310 from the operations center 250'. The operations center 250' has three separate sections (318, 322, 326) one for text receiving, formatting and re-entry 318, a second for security encoding 322 and a third section for catalog and messaging center functions 326.

The billing and collection system 278' shown has two sections (330, 334) one for transaction management, authorizations and publisher payments 330, and the other for customer service 334. The customer service section 334 provides for data entry and access to customer account information. Transaction accounting information 338 is supplied to credit card companies 342 by the transaction management section 330 of the billing and collection system 278'. The credit card companies 342 provide billing 346 to customers either electronically or by mail.

Three methods for communicating between the subscriber base 348 and the billing and collection system 278' are shown: by telephone switching 350 alone, cellular switching 354 and telephone switching 350 combined, and by use of the cable system 358 and the telephone switching 350. The system shown supports both one-way 362 and two-way cable communication 366 with subscribers. Public libraries and schools 370 as well as bookstores 374 may use the delivery system 301.

Public libraries and schools 370 would have a modified system to allow the viewer 266 to be checked-out or borrowed while bookstores 374 would rent or sell the viewer 266 and sell the electronic books. The bookstores 374 as well as the public libraries and schools 370 may be serviced by cable 378. Optional direct broadcast systems (DBS) 382 can also be used with the delivery system 200. The DBS 382 may provide the electronic books using digital satellite technology, with the electronic books being received via a backyard satellite antenna, for example.

Figure 3B:
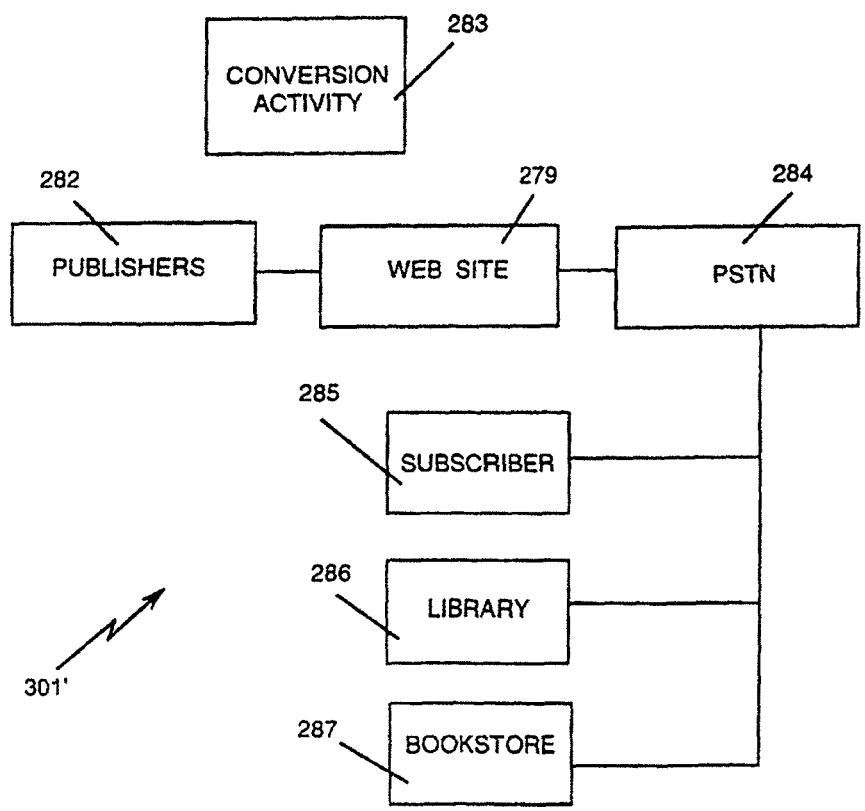
FIG. 3b is a schematic of an alternate delivery plan.

FIG. 3b is an alternate delivery plan 301' that provides for electronic book selection and delivery using the Internet. In FIG. 3b, the publishers 282 provide the electronic books to be posted at the Internet web site 279. The publishers may convert the text and graphical data to digital format, compress the digital data, and upload the compressed digital data to the Internet web site 279. Alternately, the publishers 282 may arrange for an outside conversion activity 283 to convert the text and graphical data to digital format. The conversion activity 283 may then provide the digital data to the Internet web site 279. For example, a large on-line bookstore could gather publications in electronic form from a variety of publishers, or could convert hard-copy books to electronic form, and post the electronic books on the Internet such as at the Internet web site 279.

The electronic books may then be transferred via a public switched telephone network (PSTN), for example, direct to a subscriber 285, a library 286 and a bookstore 287. The library 286 and the bookstore 287 may also provide electronic books to the subscriber 285.

I. The Operations Center

FIG. 4 is a schematic of an operations center 250 which includes an uplink 254. The operations center 250 gathers text or books by receiving, formatting, storing, and encoding. A data stream 302 containing text is received at the operations center 250 by a data receiver 402. The data receiver 402 is under the control of a processor 404. After reception, the data stream is formatted using digital logic for formatting 406 which is also under the control of the processor 404. If any additional text is being generated at the operation center 250 locally for insertion into the distributed signal, the text generation is handled through text generator hardware 410 which may include a data receiver and a keyboard (not shown). Following processing by the text generator 410, the additional text can be added to the text received by the combining hardware 414 that includes digital logic circuitry (not shown).

The processing at the operations center 250 is controlled by a processor 404 which uses an instruction memory 416. The processor 404 and instruction memory 416 may be supplied by a personal computer or mini-computer. To perform the catalog and messaging functions, the operations center 250 uses a catalog and message memory 420 and the text generator 410 if necessary.

The data stream of text, catalog and messages is preferably encoded by security module encoding 424 prior to being sent to the uplink module 254. Various encoding techniques may be used by the security encoding module 424 such as the commercial derivative of NSA's encryption algorithm (Data Encryption System (DES)) and General Instrument's DigiCipher II. Following encoding, the encoded text may be stored in text memory 428 prior to being sent to the uplink 254. A first-in-first-out text memory arrangement may be used under the control of the processor 404. Various types of memory may be used for the text memory 428 including RAM. The operations center 250 may use file server technology for the text memory 428 to catalog and spool electronic books for transmission as is described below.

To transmit textual data (i.e., electronic books), the delivery system 208 uses high bandwidth transmission techniques such as those defined by the North American Broadcast Teletext Standard (NABTS) and the World System Teletext (WST) standard. Using the WST format (where each line of the Vertical Blanking Interval contains 266 data bits), a four hundred page book, for example, may be transmitted during programming using four lines of the Vertical Blanking Interval at a rate of approximately one book every 1.6 minutes (63,840 bits per second). Alternatively, electronic books may be transmitted over a dedicated channel, which interrupts programming so that 246 lines of video can be used to transmit approximately 2,250 books every hour (3.9 Mbits per second). A teletext type format is the simplest but possibly the slowest text format to use with the delivery system 200. In either event, an encoder 204 is utilized at an uplink site 254 to insert textual data into the analog video signal. In many other respects, the delivery of the textual information is completed using existing cable television plant and equipment.

FIG. 5a is a flowchart of the steps involved in processing text from the publisher or provider 282 that occurs at the operations center 250. As shown in block 500, the publisher 282 processes data files of text for books, compresses, encrypts and sends the data files to the operations center 250 or uplink 254. Text files for books are preferably sent one book at a time. As shown in block 504, the uplink 254 or operations center 250 receives and processes the data stream from the publisher 282. Generally, part of this processing includes encryption and error correction.

As shown in block 508, files are broken into smaller packets of information. Header information is added to the packets. The bit stream is converted from a serial digital bit stream to an analog bit stream that is compatible with an NTSC video signal. Block 512 shows the switching of analog data into the video lines of a video signal. The analog data is generally placed either in the VBI or the active video lines. In some instances, it may be preferable to utilize unused portions of bandwidth (such as 5-40 MHZ, 70-75 MHZ, 100-109 MHZ or other guard bands) instead of the video lines.

FIG. 5b is an example of a hardware configuration to perform some of the functions for blocks 508 and 512. A video feed 516 is received and processed through a sync stripper 520. The stripped sync signal 532 is used by the digital logic control 524. The digital logic control 524 receives the sync signal 532 and a serial digital bit stream 528 for processing. The digital logic control 524 passes the serial digital bit stream to the Digital to Analog converter 536 and outputs a control signal 540 for the video switch 544. The video switch 544 integrates the video feed 516 and analog data stream 548 into a video feed with analog data signal inserted 552.

As an alternative to cable, satellite, broadcast, or other television delivery methods, the public telephone system may be used to transmit books to the subscribers. An average electronic book would take about 7 minutes to transmit over the public telephone system. Using the telephone system, it is not necessary to combine video and text into a composite signal. In most other respects, the operation center would remain similar whether text delivery was by telephone or cable. File server technology (such as that described in U.S. Pat. No. 5,262,875, entitled AUDIO/VIDEO FILE SERVER INCLUDING DECOMPRESSION/PLAYBACK MEANS, issued to Mincer, et al., and, U.S. Pat. No. 5,218,695, entitled FILE SERVER SYSTEM HAVING HIGH-SPEED WRITE EXECUTION, issued to Noveck, et al., incorporated herein by reference) may be used at the operation center with a telephone system text delivery method.

As another alternative to cable, television, and telephone system delivery, the public telephone system may be used to provide access to the Internet, where the Internet web site 279 may be accessed. Electronic books may be ordered, paid for, and delivered directly from the Internet web site 279 over the telephone system.

In any delivery system using the telephone system, individual subscribers may increase the electronic book deliver rate by incorporating high speed modems or other communication devices such as an Integrated Services Digital Network (ISDN) connector, or by use of an Asymmetric Digital Subscriber Line (ADSL)

II. The Home System

Figure 6B:
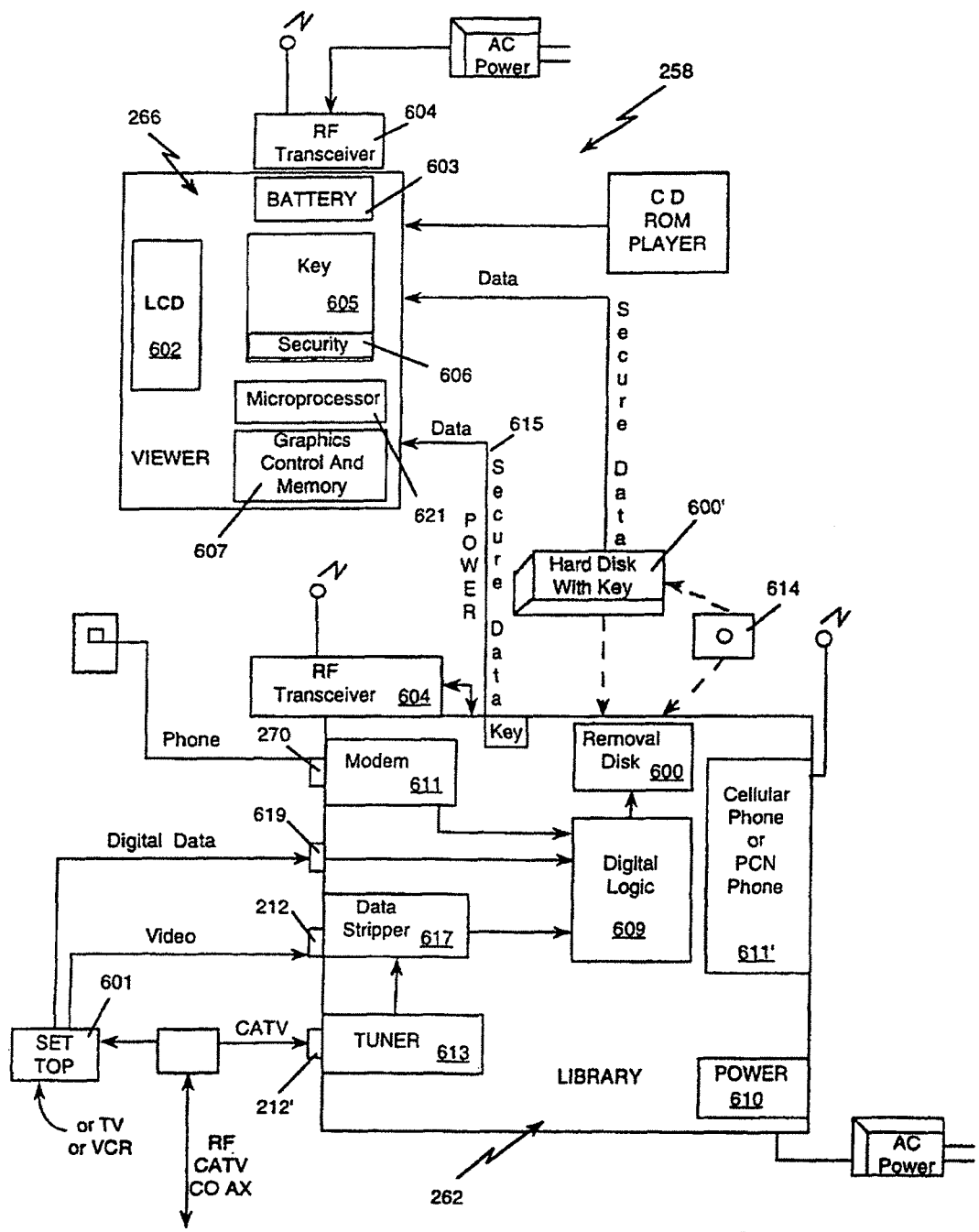
FIG. 6b is a schematic of a two unit home subsystem.

The hardware configuration for a four component home system 258 is shown in FIG. 6a. FIG. 6b shows a hardware configuration for a two component home system. The hardware components may also be incorporated into a single unit that communicates with a terminal in a television delivery system or with a telephone system by use of a modem, for example. The home system 258 performs several functions, such as receiving data and video transmissions, stripping (or extracting) the data from the video signal, screening and storing the data, providing user friendly interface controls and software, displaying menus and text, processing transactions, initiating telephone calls and transmitting billing data. Various hardware configurations may be utilized to achieve the desired functions of the home system 258. For example, as shown in FIG. 6b, the home system 258 can be configured to utilize the reception and channel tuning capability of the current installed subscriber base of cable converter boxes and televisions 601. The home system 258 can also be designed as an advanced set top terminal converter box with menu generation capability, electronic memory and a telephone modem as described in section V below.

The electronic components which make up the home system 258 can be arranged in a variety of ways. In the four unit system of FIG. 6a the viewer 266 and library unit 262 are wired together while the remaining components communicate through RF transceivers 604. In a simple version of the home system 258 there are only two units, the library unit 262 and a viewer 266. FIG. 6b shows a two unit home system 258 with certain optional features. Finally, all the functionality of the home system 258 may be incorporated into one electronic book unit, or viewer.

The viewer 266 is generally equipped with a high resolution viewing area 602, digital logic (including a key 605, security 606, and a microprocessor 621), video graphics control and memory 607, power supply circuitry 602 (not shown), an optional battery 603 and an optional RF transceiver 604. In a two unit arrangement, the library unit 262 contains the connector function to the video distribution system 208, connector function to a public telephone communications system, and memory 600 (which may be removable and portable 600'). More specifically, the library unit 262 would include data stripping functions 617, digital logic 609, memory storage 600, power circuitry 610, optional telephone connections 611 (including cellular or PCN 611'), optional battery (not shown), optional tuner module 613 and an optional RF transceiver 604. The video connector 212 and the public telephone system connection 270, as well as the removable portable memory unit 600 of the library unit 262 may be broken out into separate components. (FIG. 6b shows a removable portable hard disk memory 600' with removable cartridges 614.) Finally, the home system 258 may include an attached keyboard 267 or a wireless keyboard 268. Both the attached keyboard 267 and the wireless keyboard 268 may be used to communicate with the viewer 266 (not shown) or the library unit 262.

The wireless keyboard 268 may communicate via radio frequency (RF) signaling, for example. Therefore, the home system 258 may have as many as six separate components which communicate with each other. The two, three, four, five or six separate components which make up the home system 258 can communicate with each other in a variety of ways, including hardwired connection 615, RF transceiver 604, and other wireless methods.

RF communications are preferred in the home because they allow separate components to be located throughout the home without restriction. The data communicated between the units is preferably secure data. In addition, the library unit 262 may provide power to the viewer 266 through the hardwired connection 615.

Alternatively, a single unit may perform all of the home system 258 functions. The single unit should use light-weight materials, including a light-weight battery. A single unit eliminates the need to communicate (externally) between units. The single unit is less expensive and eliminates duplicative processing, memory storage and power circuitry.

To receive and strip the data from the video signal at the consumer's home, either a cable interface device or cable connector 212 is used. The cable connector device includes a tuner 613, while the cable interface device makes use of existing tuning equipment in the home. In either configuration, data is stripped from the video signal and stored at the subscriber's location in the library unit 262. The phone connector 270, and modem 611 initiate telephone calls and transmit ordering and billing information to the operations center 250 or billing and collection system 278. Alternatively, the phone connecter 270 and the modem 611 may be used to provide access to the Internet to order and receive electronic books from an Internet web site. A digital connector 619 is provided to communicate digital information with the set top 601. The library unit 262 is the intelligent component of the home system, incorporating the hardware and software necessary to store the text data, generate menus and effect the purchase transactions. In addition to an RF transceiver 604, the library unit 262 also includes the necessary jacks and connections to allow the delivery system 200 to be connected to the viewer 266. As shown in FIG. 6b, the library 262 communicates the text data (electronic book) to the viewer 266 in a secure format which requires a key 605 for decryption. The text is generally only decrypted page by page just before viewing.

a. The Video Connector

Figure 7:
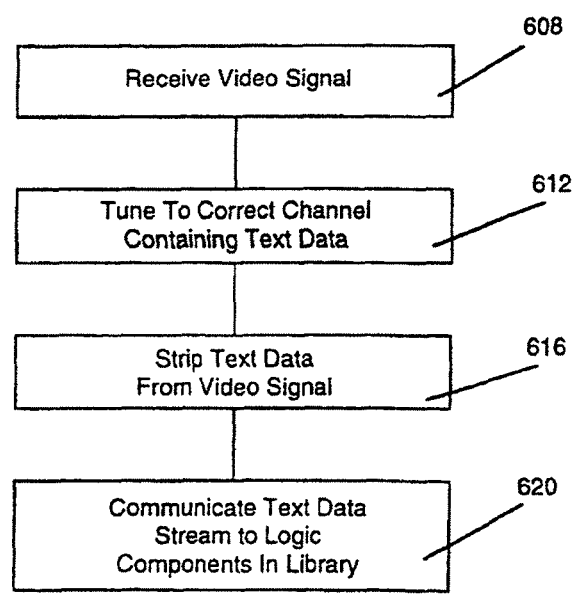
FIG. 7 is a flow diagram of the processes performed by the video connector.

FIG. 7 shows the flow of the processes performed by the video connector 212. The video connector receives the video signal 608, tunes to the channel containing the text data 612, strips the text data from the video signal 616, and communicates the text data stream to logic components in the library 620.

The connection to the video distribution system is preferably a cable connector to a cable television delivery system, as shown in FIG. 6b. The cable connector includes a data stripper circuit 617, which accepts video input from either a set top converter, TV or VCR 601, or an optional tuner block 613 that receives the CATV signal through the cable connector 212'. The data stripper circuit 617 strips data out of the video, and outputs a digital bit stream to the digital logic portion 609 of the library unit 262. The data is embedded in the video signal either in the vertical blanking interval or the active video portion in an encrypted and compressed format. The data stripper circuit 617 can be placed inside the set top converter box 601, TV, or in the library unit. The data stripper circuit 617 outputs the digital bit stream to be used by the library digital logic 609.

The video connector 212 may also contain a channel tuner module 613 that can tune to the video channel and provide access to the video that contains the data to be stripped. Using the optional tuner module 613, a set top converter, VCR, or TV tuner is not needed in the home system. The optional tuner module 613 would instead receive the CATV signal directly through the cable connector 212.

b. Library

Figure 8:
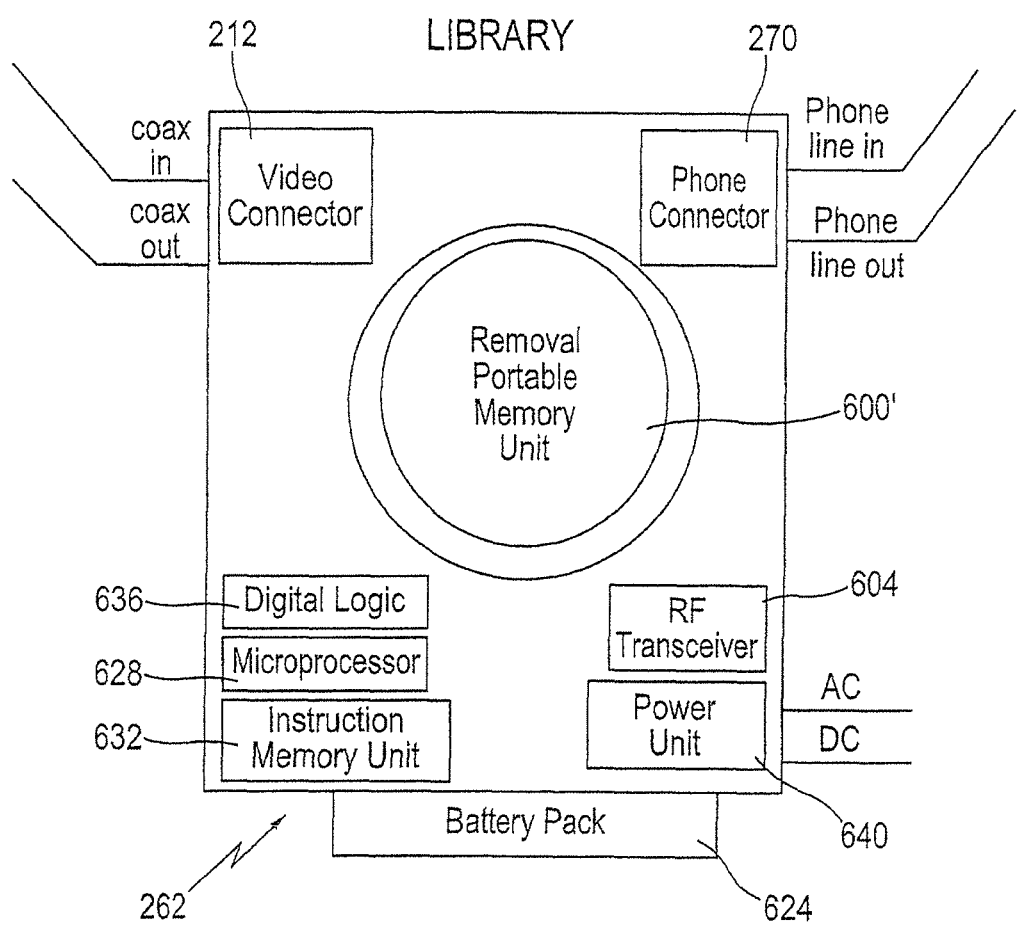
FIG. 8 is a block diagram for an example of a library unit.

An embodiment of the library unit 262 for a two unit home system 258 is shown in both FIG. 6b and FIG. 8. The embodiment shown includes the following optional parts: the video connector 212, phone connector 270, RF transceiver 604, and battery pack 624 in addition to a removal portable memory 600', microprocessor 628, instruction memory unit 632, digital logic 636, and power unit 640.

The library unit 262 contains a digital logic section 609 (not shown in FIG. 8) which includes the microprocessor 628, the digital logic 636 and the instruction memory unit 632. The microprocessor 628 is preferably a secure microprocessor such as the Mot SC21 device sold by Motorola. The digital logic section 609 will receive the serial digital bit stream from the data stripper circuit 617 and process the data. Error correction will also be performed by the digital logic section 609 and the data will be checked for proper address. If the address of the data is correct and the library unit 262 is authorized to receive the data, the data will be transferred to the memory storage unit 600, 600'. Authorization to receive the data is provided by the cable headend or another distribution point. An authorization code may be sent in the serial digital bit stream. The digital logic section 609 will send appropriate text and graphical data to the memory storage unit 600, 600'. It transfers this data in a compressed and encrypted format and the data remains stored in a compressed and encrypted format.

i. Memory Storage Unit

The memory storage unit of the library may be a removable portable memory unit 600' (as shown in FIGS. 6a, 6b and 8). A variety of options are available for memory storage: a hard disk drive, a hard disk with removable platters, and a CD ROM or memory stick. Referring to FIG. 6b, a hard disk drive unit 600' which contains removable platters may also be used. This would provide virtually unlimited library storage capacity. Data (i.e., electronic book files) may be stored in the memory storage unit in a compressed and encrypted format. As is also shown in FIG. 6b, the data may also contain a key or unique ID number that matches the ID or key of the viewer 266. This matching of a unique key or ID number prevents unauthorized transfer of text data from the memory storage unit to an unauthorized viewer. Small memory devices such as smart cards, electronic memory cards or PCMCIA cards or memory sticks (personal computer memory card industry association) may also be used to store the data.

ii. Power Circuitry

As shown in FIGS. 6b and 8, the library unit 262 may accept power from either AC wall power 610, DC power 640, or optional battery power 624. The power circuitry 610, 640 may provide all the voltage necessary from either the battery 624 or AC unit for the various circuitry in the library. The power circuitry 610, 640 may also provide power to the viewer 266 through a single data cable when connected to the viewer. The power circuitry 610, 640 will recharge the battery using AC power when in operation. With the optional battery unit 624 installed, the library unit 262 becomes a portable unit and can still provide power to the viewer 266. In order to extend battery life, power conservation measures may be utilized, such as shutting down the memory system when not in use. When the viewer 266 is being utilized and the library circuitry is not being utilized, virtually all power may be shut down to the library unit 262.

iii. Connection to the Public Telephone System

The connection to the telephone system may be provided by a modem 611. Various available modems may be used to perform this function. As shown in FIG. 6b, cellular phone or PCN phone connections 611' may also be provided. When the home system 258 is first initialized, the modem may be used to transfer the name and credit card information of the consumer to the billing and collection system 278. The telephone connection 270 may be utilized each time an electronic book is purchased by a consumer to complete and record the transaction. The telephone connection 270 may also be used as a means for receiving the electronic books from the operations center 250 or from an Internet web site, by-passing the video distribution system 208. The phone connection 270 may be a separate unit as shown in FIG. 6b.

iv. Library Processing

Figure 9:
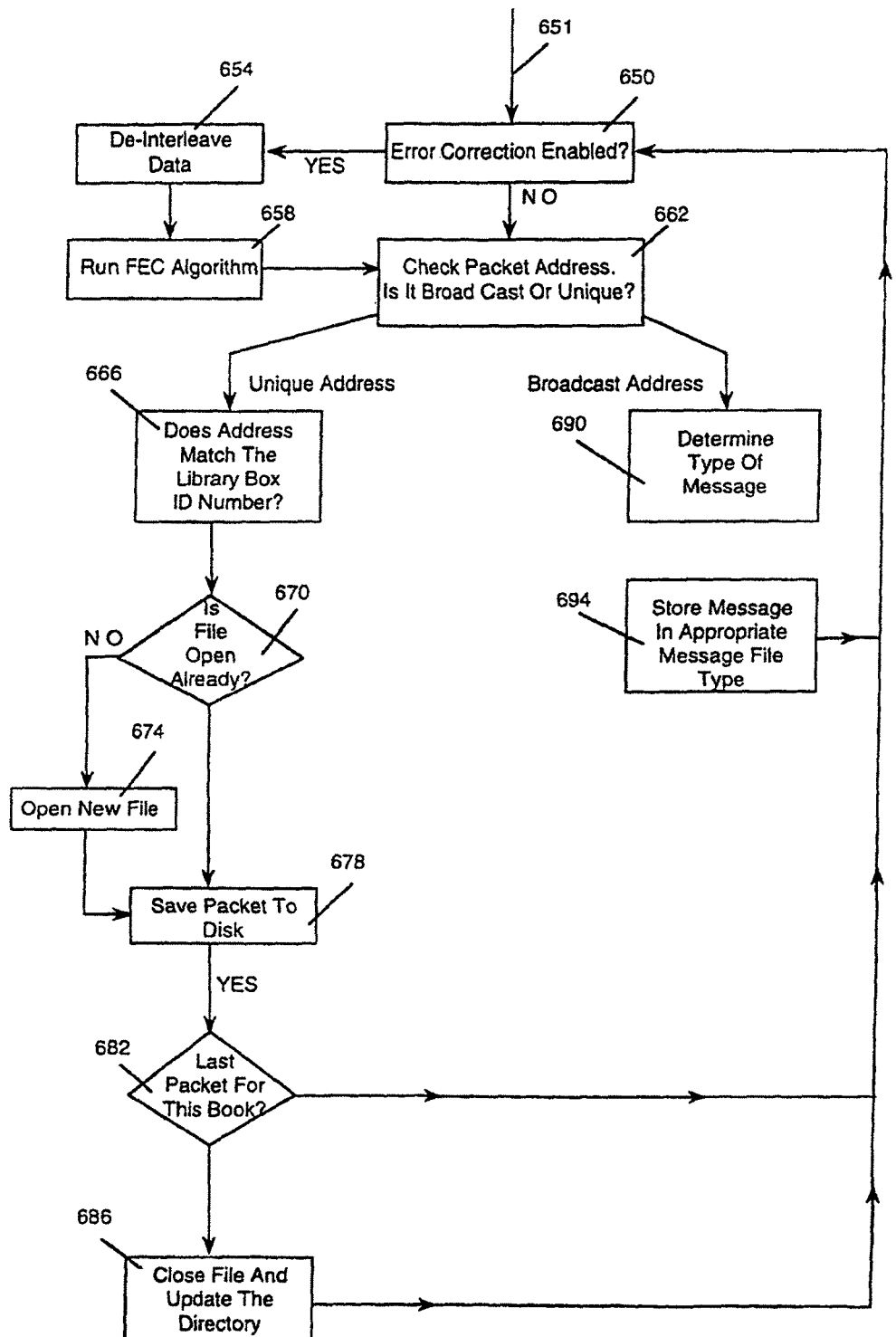
FIG. 9 is a flow diagram of some of the processes performed by the library on the received data stream.

FIG. 9 shows an example of some basic processing performed by the library unit 262 on the data stream 651 received from the video connector 212 or stripper circuit 617. First the data stream 651 is checked for error correction by block 650. If an error is detected, block 654 de-interleaves the data followed by block 658 running a FEC (Forward Error Correcting) algorithm. The combination of block 650, 654 and 658 perform the error correction needed on the data stream. If no error correction is necessary the data proceeds to block 662 where packets are individually checked for packet address.

If the address is a unique address, block 666 checks whether the address of the packet matches the library box ID number. The library box ID number is a unique number associated with that library unit 262 which is used to ensure security of the data. Block 670 determines whether an electronic file has already been opened into which the data packet can be saved. If no data file has been opened then block 674 opens a new data file for that packet. If an electronic file has been opened, then the packet is saved in that electronic file on disk, block 678. Next, the process checks to see if this is the last packet for a particular book for a particular textual data block being received 682. If it is the last packet of information, then the electronic file is closed and the directory of available electronic files is updated 686. Following either block 682 or 686, the process returns to receive another data packet from the data stream received from the data stripper block.

If the packet address is checked and the address is determined to be a broadcast address, the process determines the type of message that is being sent 690. The message may be an index of book titles, menu (and menu graphics) information, announcements, special offerings, discounts, promotions, previews etc. The message is then stored in appropriate electronic message file 694 and the process is returned to block 650 to receive another data packet and perform another error check.

Using the process of FIG. 9, the library unit 262 is able to receive, store and update directories related to the textual data and graphical data (that can be used to depict pictures in a given book or to generate menus). Variations of the processes are possible depending on the format of the data and operating system of the library unit 262.

Figure 10:
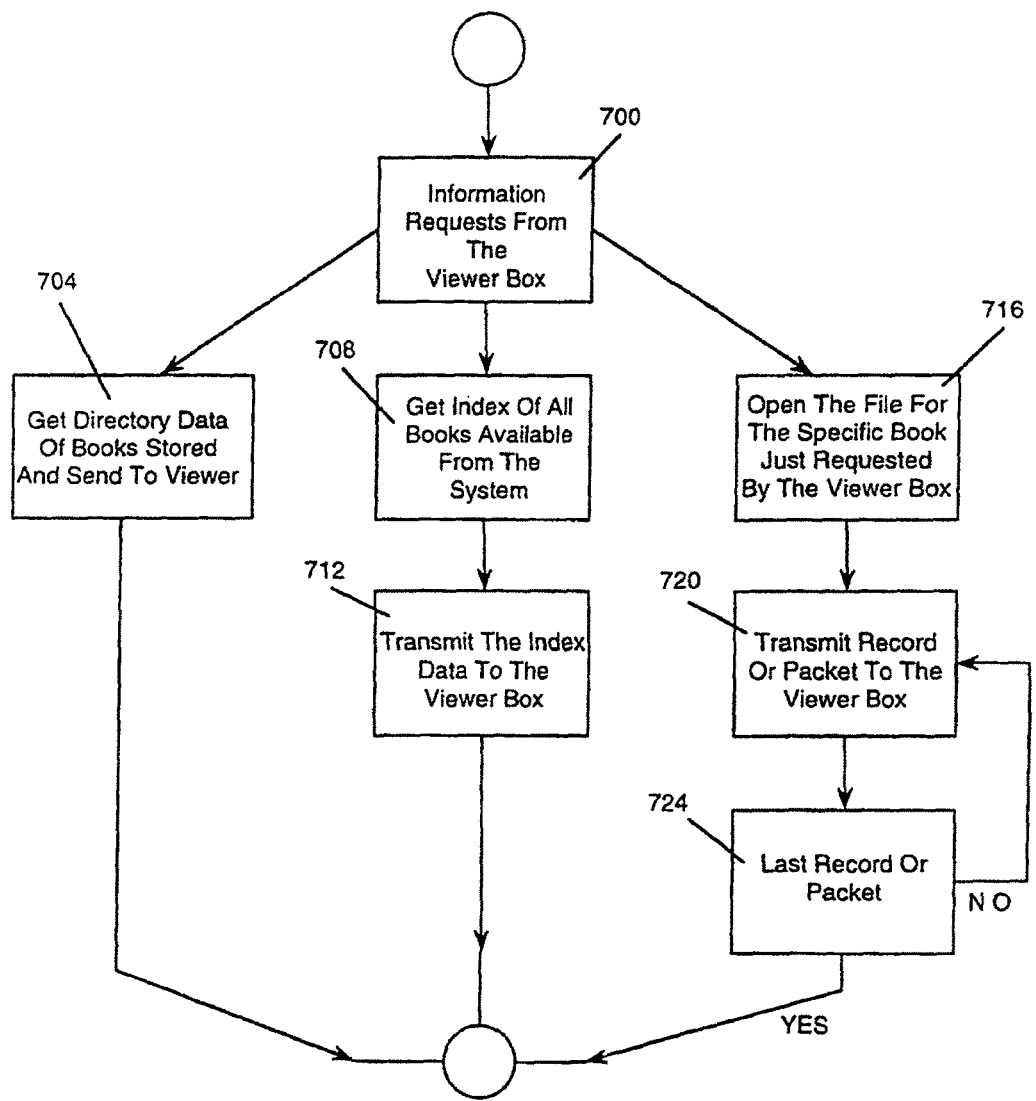
FIG. 10 is a flow diagram of the processes performed by the library unit on information requests from the viewer.

FIG. 10 shows an example of the processing of information requests from the viewer 266 at the library unit 262. Information requests from the viewer 266 are received either through the cable connecting the viewer 266 to the library unit 262 or through wireless transmissions such as RF. It is possible in some embodiments for subscribers' requests to come from a set top converter box 602 (see Section V).

Information requests received from the viewer 266 generally fall into three categories: (1) directory data of electronic books stored in the library unit 262, (2) index of all available electronic books on the system, and (3) requests for a specific electronic book (Block 700). A get directory process 704 answers a request from the viewer 266 for a directory of data showing the electronic books stored at the viewer 266. The directory of data is sent to the viewer 266 so that it may be displayed to the subscriber. A get index process 708 handles requests from the viewer 266 for an index of all available electronic books on the home system 258. The library unit 262 will obtain an index of all the available books on the system and transmit that index, process 712, with menu information to the viewer 266. An open file process 716 replies to a request from the viewer 266 for a specific electronic book. The library unit 262 opens an electronic file for the specific electronic book requested by the viewer 266 and transmits the record or transmits the information 720 on a packet-by-packet basis to the viewer 266. This process of transmitting the specific electronic book, record, or packets to the viewer 266 continues until the last record or packet has been sent, 724.

In addition to the processes shown on FIG. 10 in handling a request for a specific electronic book, the library unit 262 also orders and receives specific electronic books from the operations center 250 using the process as described in the open file process 716. Following a request for a specific electronic book which is not stored at the library unit 262, the library unit 262 will proceed to determine the next available time the electronic book will be on the video distribution system 208 and ensure reception and storage of that electronic book (process not shown). In performing this process the library unit 262 will transmit to the viewer 266 information on when it will obtain the text data for the electronic book so that the subscriber may view the electronic book. In addition to timing information, price and other ordering information may also be passed by the library unit 262 to the subscriber.

c. The Viewer

Figure 11:
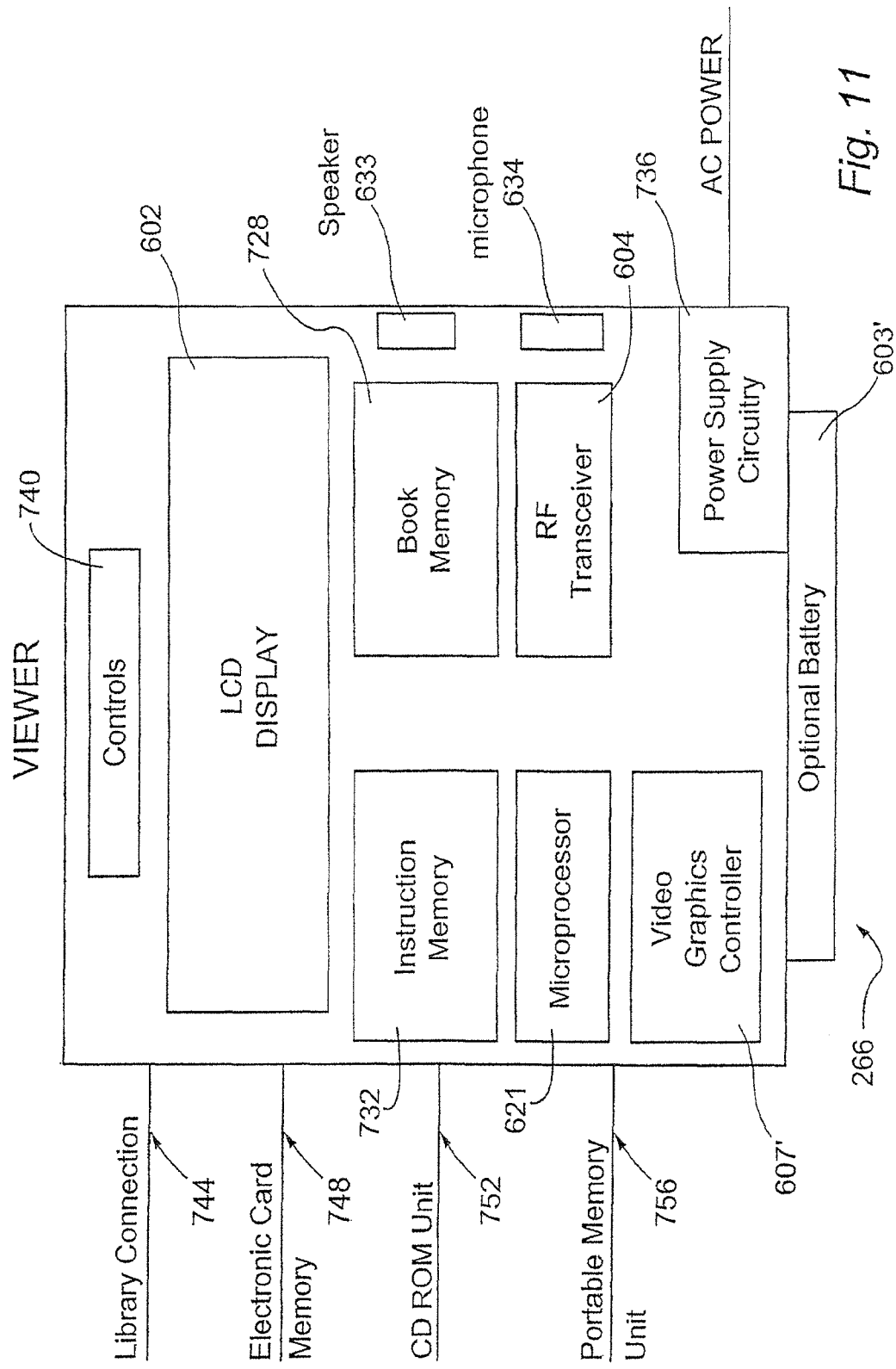
FIG. 11 is a block diagram showing the components for an example of a viewer.

FIG. 11 is a block diagram of the viewer 266 showing its internal components. The viewer 266 of FIG. 11 is similar to the viewer 266 depicted in FIG. 6*b*. The viewer 266 is designed to physically resemble a bound book. The viewer 266 is made up of several primary components and several optional components: (1) LCD display 602, (2) digital circuitry (not shown), (3) video graphics controller 607', (4) controls 740, (5) book memory 728, (6) optional power supply circuitry 736, (7) optional battery 603', (8) optional RF transceiver 604, (9) optional cellular or mobile communicator (608), (10) optional keyboards 267 and 268, (11) a speaker 633, and (12) a microphone 634.

(1) A high resolution LCD screen 602, preferably of VGA quality, is used by the viewer 266 to display text and graphic images. The screen is preferably the size of one page of a book. A two page screen or two screens may also be used with the viewer 266.

(2) Digital circuitry that includes a secure microprocessor 621, instruction memory 732, and digital logic. Data is transferred to the viewer 266 in compressed and encrypted format. The secure microprocessor 621 compares the ID number of the viewer 266 with the incoming data stream and only stores the text data if the ID number of the viewer 266 matches that within the incoming data stream. It is preferred that the viewer 266 not output text data or other data and that the data is decompressed and decrypted only at the moment of viewing and only for the current page being viewed. These measures are preferred because they provide additional security against unauthorized access to data.

(3) A video graphics controller 607' that is capable of assisting and displaying VGA quality text and graphic images is included in the viewer 266. The graphics controller 607' is controlled by the digital circuitry described above. Text may be displayed in multiple font sizes.

(4) The viewer 266 of FIG. 11 has touch panel controls 740. These unique and novel controls 740 allow the consumer to select stored electronic books and electronic books from catalogues, move a cursor, and turn pages in a book. Typically, preferred controls 740 include forward and reverse page buttons 742, 741, a ball (or trackball) 743 for cursor movement, one or more selection buttons 745, a current book button 747 and a bookmark button 749 (see FIG. 14*a*).

The controls 740 should be easy to use and conveniently located. Referring to FIG. 14*a*, the controls for the viewer 266 may be located below the screen 602 at the bottom portion of the viewer 266. The next page turn button 742 is the most used button 740 and may be located towards the right edge of the page. The subscriber is likely to use right hand thumb movements to work the controls particularly the page turn buttons 741, 742. Therefore, it is preferred that the buttons be arranged in such a manner that the buttons are easily controlled by a subscriber's right thumb. Generally, this can be accommodated either on the lower portion of the viewer 266 (as shown) or along the right hand margin of the viewer 266 (not shown). The current book button 747 and bookmark button 749 are usually the least used of the controls 740. Therefore, in the example shown those buttons 747, 749 are located on the inside portion towards the binder of the viewer 266.

Locating the ball 743 or other cursor movement device (such as four pointer arrows—not shown) in the bottom center of the viewer 266 is both easier for the subscriber to use and easier in manufacturing the viewer 266. The selection buttons for the cursor 745 are preferably located below the middle diameter of the cursor ball 743 on the right and left sides of the ball as shown. If pointer arrows are used for cursor movement, a selection button 745 may be located in the center of the four arrow buttons (not shown). Again, the most used controls should be located where a subscriber's right hand thumb would normally rest.

(5) Book memory 728 for at least one electronic book or more of text is included in the viewer 266. The memory 728 stores text and any graphics which represent pictures in a book. The memory 728 can also store menu graphics data. Two different memory 728 devices may be used in the viewer 266, one for the instructions for the microprocessor 621 in the digital circuitry and a second type of memory may be used for the book memory 728 (and graphics). Various memory devices available on the market may be used such as, ROM, RAM or a small hard disk. Since an electronic book requires approximately 0.6 megabytes of storage, a small hard disk providing approximately 60 MBytes of storage provides memory to store approximately 100 electronic books. The large hard disk drives currently available allow for storage of thousands of electronic books.

Text for books may be displayed in various font sizes. To accommodate various fonts for display, a variety of fonts are stored in instruction 732 or book memory 728. Thus larger or smaller fonts may be recalled from memory 621, 728 to create displays desired by the subscriber.

(6) Power supply circuitry 736 in the viewer 266 will accept power from either an AC power source or from an optional battery 603', or the library unit 262. The power supply circuitry 736 provides the necessary voltages to accommodate the various systems within the viewer 266.

(7) An optional battery 603' is provided in a preferred embodiment. The battery 603' is automatically recharged when AC power is available.

(8) An optional RF transceiver 604 which provided two-way data link between the viewer 266 and other components of the home system can also be included in the viewer 266.

(9) Also, the viewer 266 may include a cellular transceiver for mobile communications.

(10) The optional wired (attached) keyboard 267 and wireless (e.g., RF) keyboard 268 (see FIG. 6a) may be used with the viewer 266 to provide communications between the subscriber and the viewer 266.

(11) and (12) The speaker 633 and the microphone 634 allow the viewer 266 to provide audio signals to the subscriber, and allow the subscriber to provide an audio input. The speaker 633 and the microphone 634 may be used in conjunction with the cellular transceiver 608 or other telecommunications equipment to provide for reception and transmission of telephony and data.

The viewer 266 of FIG. 11 has parts available for providing connections to: a library 744, electronic card memory 748, CD ROM units 752, and a portable memory unit 756 (such as that shown in FIG. 6b 600'). Various electronic memory cards such as PCMCIA can be used with this viewer 266.

Security, low power consumption and excellent display technology are desired features of the viewer 266 design. The viewer 266 should be lightweight and portable. The viewer 266 contains a software operating system that allows electronic books to be stored, read and erased and includes the capability to order electronic books and retain them in memory 728 for a predefined period of time determined by the system operator. The software can be configured to allow the electronic book to be read during a period of time (i.e., two weeks) and then automatically erased, read once and erased, or held in memory permanently. Each viewer 266 has a unique key 605. All of the data storage is encrypted with the key 605 for an individual viewer 266 to prevent more than one viewer 266 accessing the text file or electronic book file.

Figure 12:
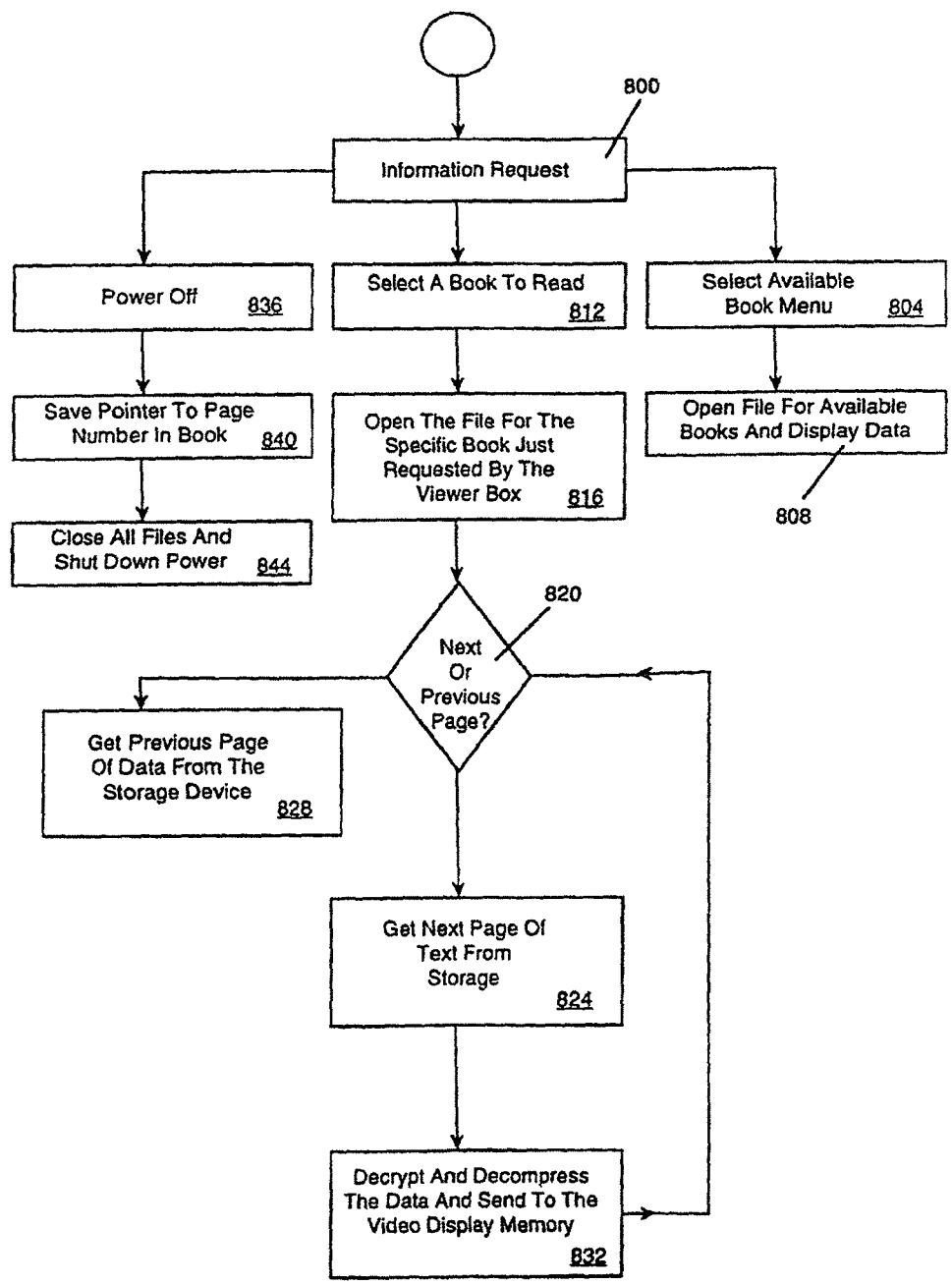
FIG. 12 is a flow diagram of some of the processes performed by the viewer on an information request from a subscriber.

FIG. 12 is a flow diagram of some of the processes executed by the viewer 266. Generally, the viewer 266 receives inputs from the subscriber through touch panel controls 740. Alternately, the viewer 266 receives inputs from a touchscreen display, the attached keyboard 267, or the remote keyboard 268. The subscriber's information requests are then processed through an information request process 800 by the viewer 266.

If the subscriber requests a menu of available electronic books, a select available book process 804 will select a book menu. An open file process 808 will open the electronic files which list the electronic books that are available (related to the category of topic of the menu) and display the menu with the names of the available electronic books.

If the subscriber selects a particular electronic book to read, then a select a book process 812 will process the selection and determine the electronic file that contains the specific electronic book. An open file process 816 will open the file for that specific book and normally access the first page. (If a pointer has already been set in that electronic book's file, the process may default to that page.) A decision process 820 will then determine which page needs to be displayed. The decision process 820 will determine whether a next page, previous page or a book marked page needs to be displayed. If the pointer for the electronic file is not in the correct location then a get previous page process 828 will move the pointer and obtain the previous page of data from the stored file. Otherwise, a get next page process 824 will normally obtain the next page of text from the stored electronic file. A decrypt and decompress process 832 will decrypt and decompress the text data and send the data to the video display. The video display will generally have a video display memory associated with it and the decrypt and decompress process 832 will send the data directly to that video display memory. The circuitry for the display then completes the process of displaying the page of text.

If the subscriber, through the controls 740, requests (from the information request process 800) that the power be turned off, then a process, 836, of turning the power off will be initiated. A save pointer process 840 saves the pointer in memory to the page number in the book that the viewer 266 is currently reading. A close files process 844 closes all the electronic files and signals the power circuitry to shut down the power to the various circuits in the viewer 266. The subscriber may also use the controls 740 to access other electronic files using electronic links embedded in a particular electronic file. An electronic link system will be described later in detail.

With these examples of basic processes the viewer 266 is able to display book selections and display text from those books.

d. Menu System

Figure 13:
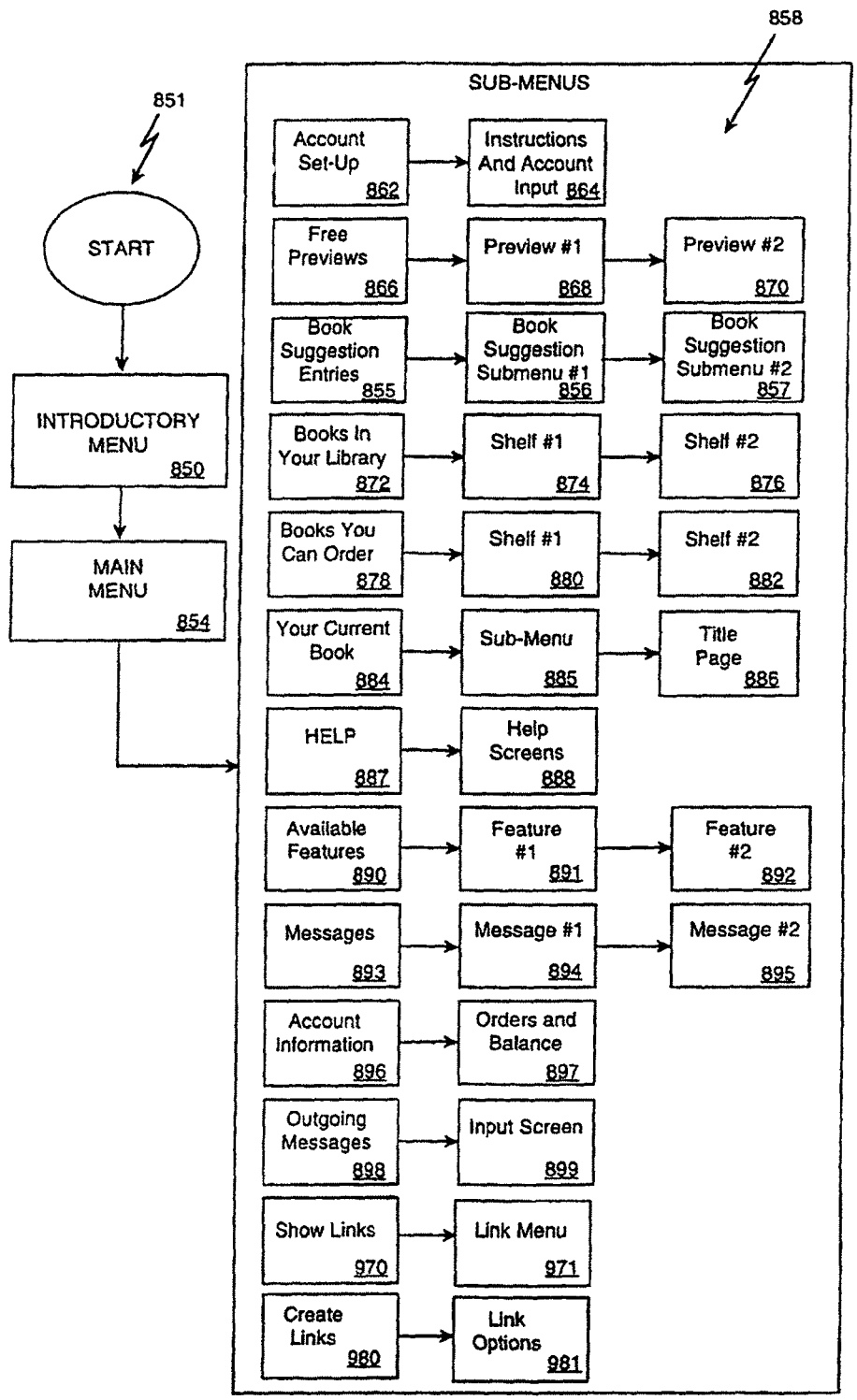
FIG. 13 is a chart depicting the menu structure and sequencing of menus in the menu system.

Referring generally to FIG. 13, the delivery system 200 may have a menu system 851 for selecting features and electronic books from the delivery system 200. The operating software and memory required for the menu system 851 may be located at the viewer 266 (e.g., the instruction memory 732 and/or book memory 728). However, it may also be located at the library unit 262 (e.g., the instruction memory 632) or the library unit 262 and the viewer 266 can share the software and memory needed to operate the menu system 851. Since the menus are usually displayed on the viewer 266 and it is preferred that the viewer 266 be capable of operating in the absence of the library unit 262, the basic software and memory to create the menus is more conveniently located at the viewer 266.

The menu system 851 allows sequencing between menus and provides menu graphics for graphical displays such as on the LCD display 602 of the viewer 266. In a system which uses a set top converter these menus may also be displayed on a television screen. In the simplest embodiment, the menus provide basic text information from which the subscriber makes choices. In more sophisticated embodiments, the menus provide visual displays with graphics and icons to assist the subscriber.

FIG. 13 depicts a menu system 851 with sequencing. The primary menus in the system are an introductory menu 850, a main menu 854 and various submenus 858. In the embodiment shown, there are three levels of submenus 858. In certain instances one or two submenus 858 is sufficient to easily direct the subscriber to the selection or information requested. However, there are features in which three or more submenus 858 make the user interface more friendly for the subscriber. Each level of submenus 858 may consist of multiple possible menus for display. The particular menu displayed depends on the selection by the subscriber on the previous shown menu. An example of this tree sequence of one to many menus are the help submenus 887, 888. Depending upon the specific help requested, a different level two help menu is displayed to the subscriber.

Figure 14B:
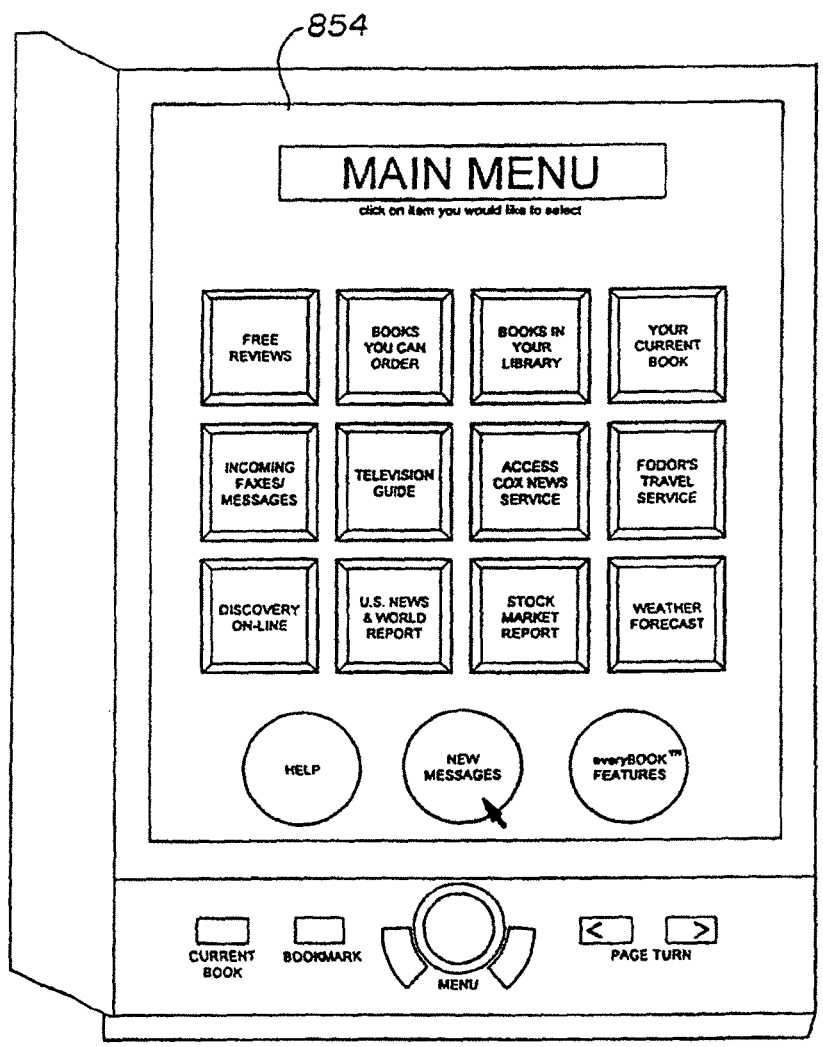
FIG. 14b is a schematic showing an example of a main menu.

An example of an introductory menu 850 is shown on FIG. 14a. Generally the introductory menu 850 introduces the viewer 266 to the system and provides initial guidance, announcements and instruction. The introductory menu 850 is followed by a main menu 854, an example of which is shown in FIG. 14b. The main menu provides the viewer 266 with the basic selection or features available in the system. FIG. 14b is an example of a main menu 854 offering many additional features and submenus 858 to the subscriber. For example, FIG. 14b shows that the viewer 266 is able to choose by a point and click method, many options including: (1) free previews, (2) books you can order, (3) books in your library, (4) your current book, (5) help, (6) on-line services and (6) other system features. Following a selection on the main menu 854, a corresponding submenu 858 is shown.

Figure 14C:
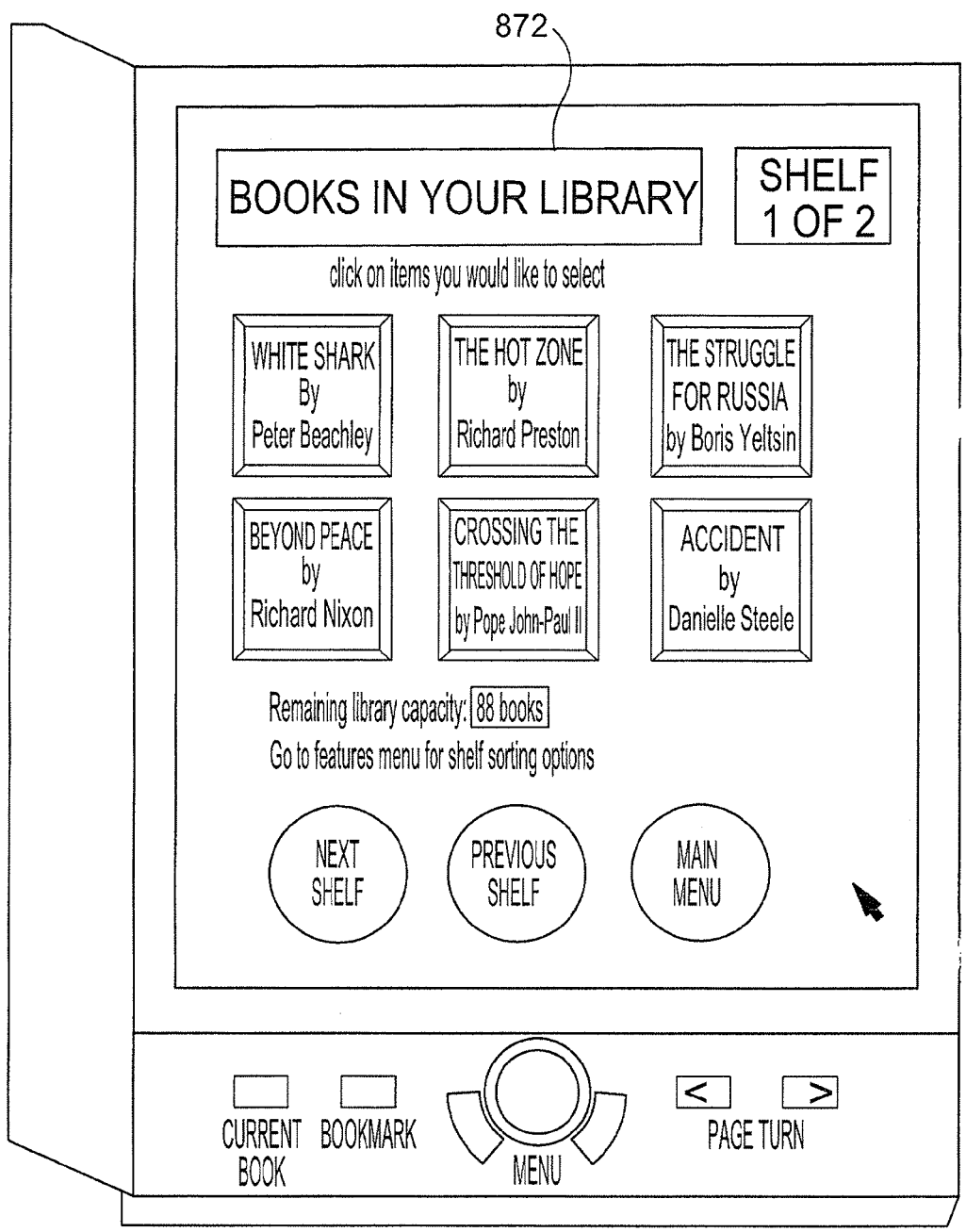
FIGS. 14c, 14d, 14e, 14f, 14g, 14h, 14i and 14j are schematics showing examples of submenus.
Figure 14D:
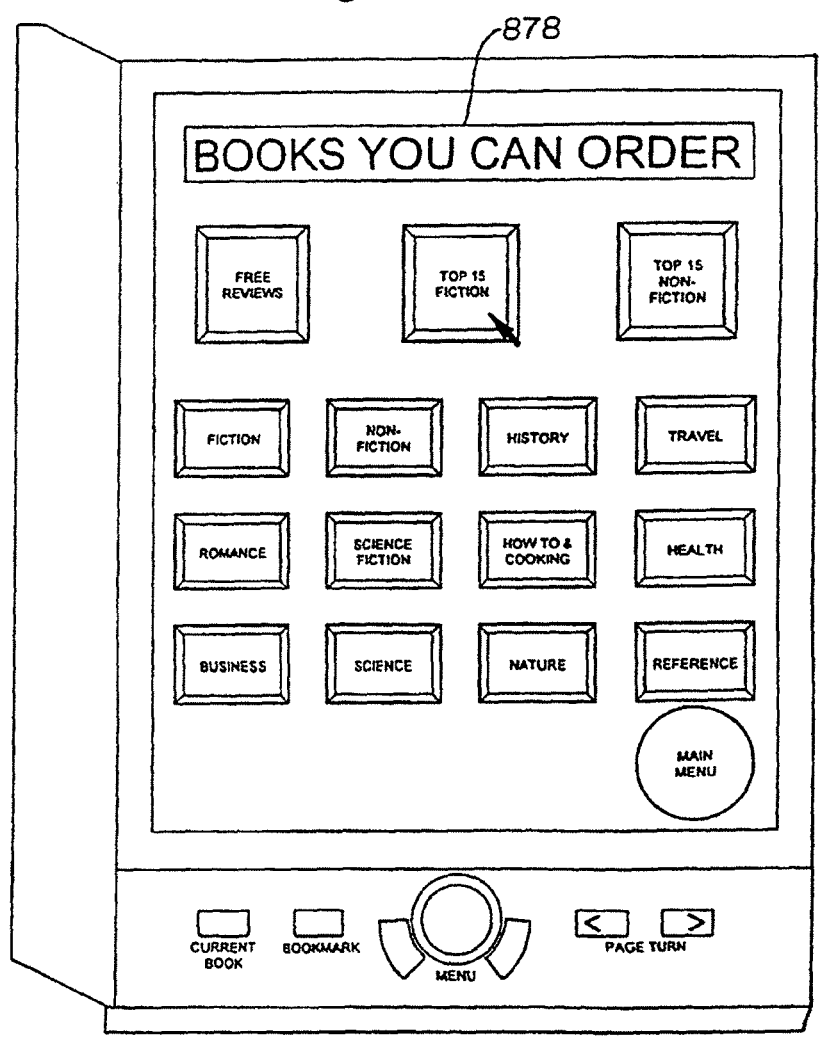
Figure 14E:
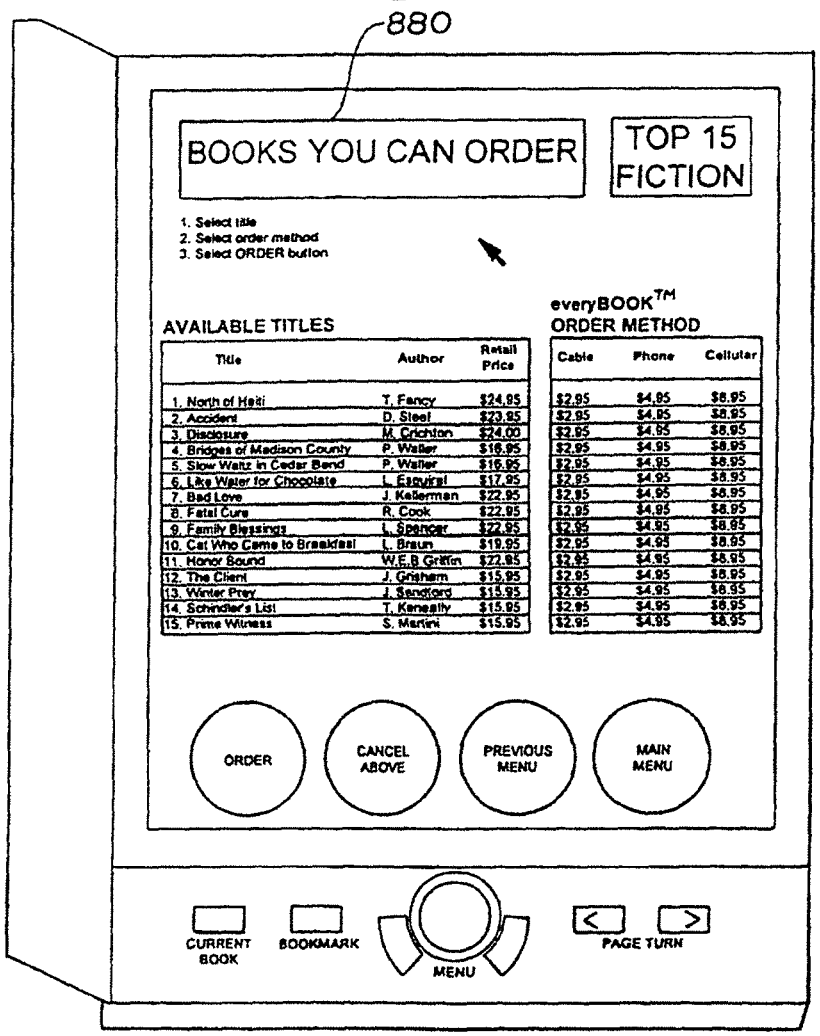

FIG. 13 shows thirteen available primary or first level submenus. They are (1) account set up 862, (2) free previews 866, (3) book suggestion entries 855, (4) books in your library 872, (5) books you can order 878, (6) your current book 884, (7) help 887, (8) available features 890, (9) messages 893, (10) account information 896, (11) outgoing message submenu 898, (12) show links 970, and (13) create links 980. FIG. 14c is an example of a first level submenu for electronic books in your library 872. This "Book In Your Library" example submenu 872 shows six available electronic books by title and author and provides the subscriber with the ability to check a different shelf of books 874 or return to the main menu 854. FIGS. 14d and 14e show example submenus 858 for electronic books that may be ordered using the "Books You Can Order" submenu 878.

Figure 14F:
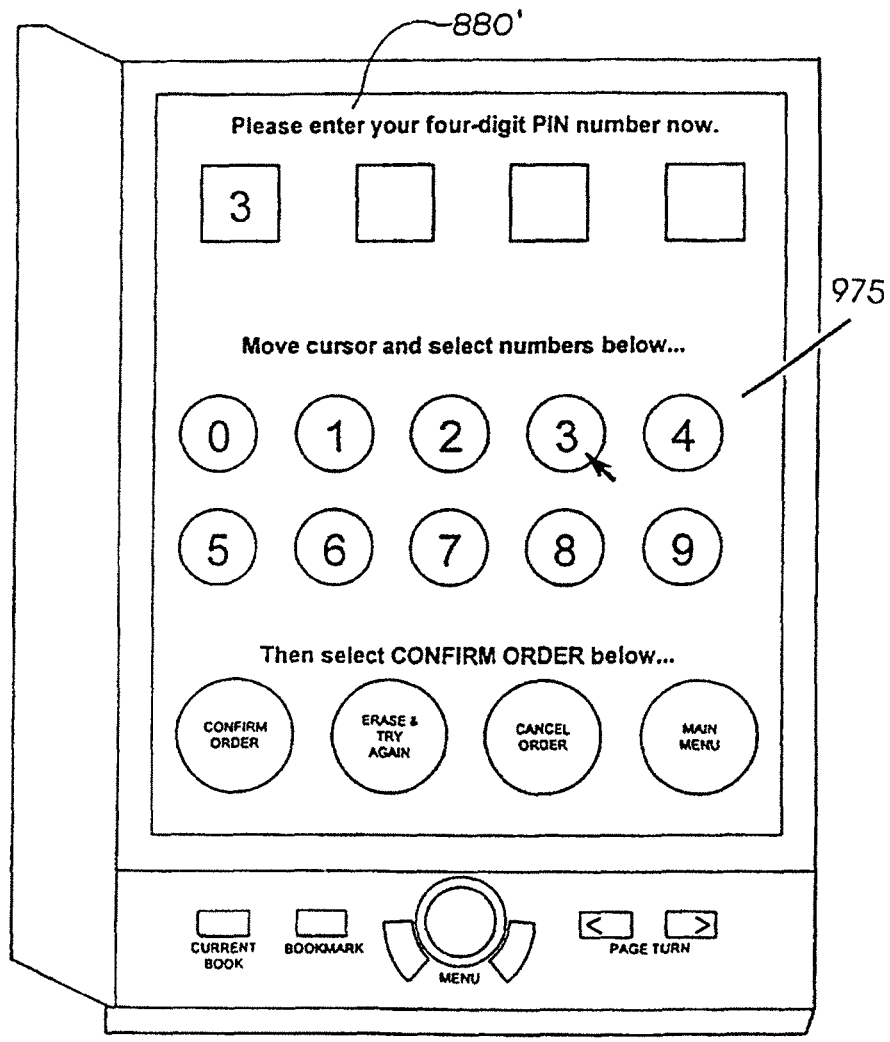

FIG. 14f is an example of an order selection and confirmation menu 880', which provides a "soft keyboard" 975 for the subscriber to use in placing an electronic book order and which confirms the subscriber's order. In this particular example, the subscriber is required to enter a PIN number to complete the subscriber's order. The "soft keyboard" 975 could be configured as a full alpha-numeric keyboard, and may be used by the subscriber to add additional information related to a book order. An alpha-numeric or similar password may be used to ensure the subscriber is an authorized subscriber. In an embodiment, the subscriber confirms an order with a PIN or password and then receives a final confirmation screen. The final confirmation screen is primarily text and may state: Your book order is now being processed via CABLE.

Your book will be delivered overnight and your VISA account will be charged $2.95.

Your book will be available for reading at 6:00 AM EST tomorrow. Make sure that:
1. your Library Unit and Cable Connection Unit are plugged in with aerials up tonight; and
2. you tune your cable converter to THE BOOK Channel. The TV set does not have to remain on.

or similar language.

Figure 14G:
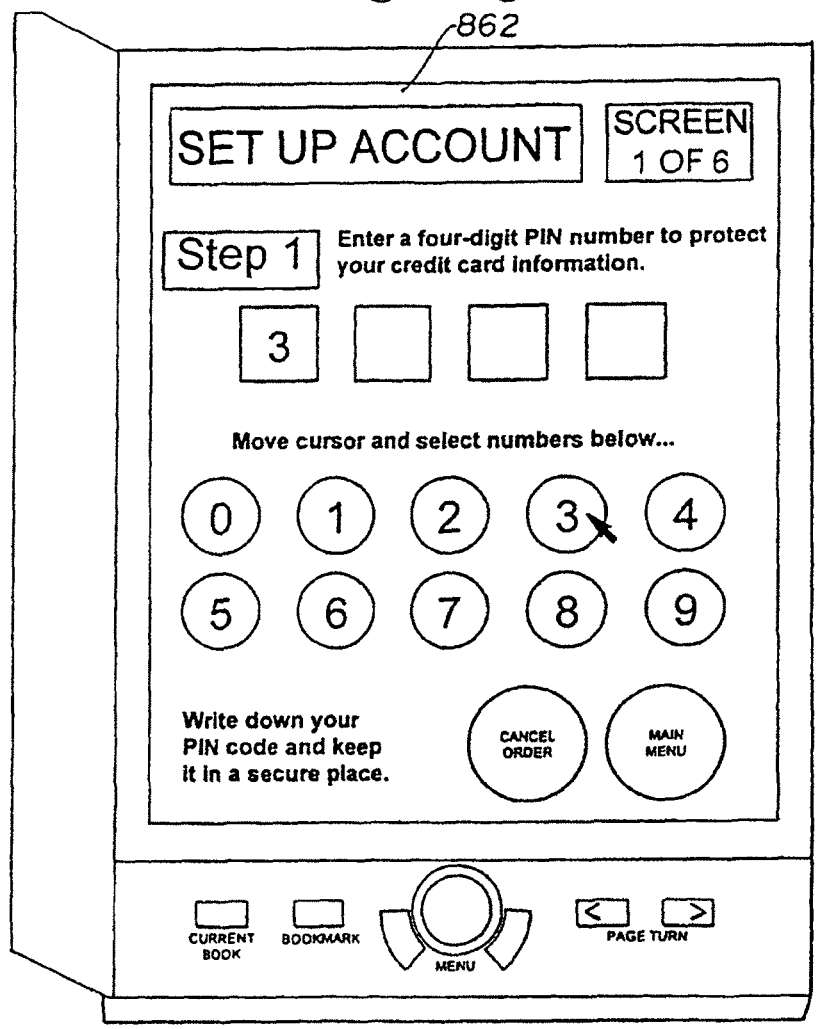
Figure 14H:
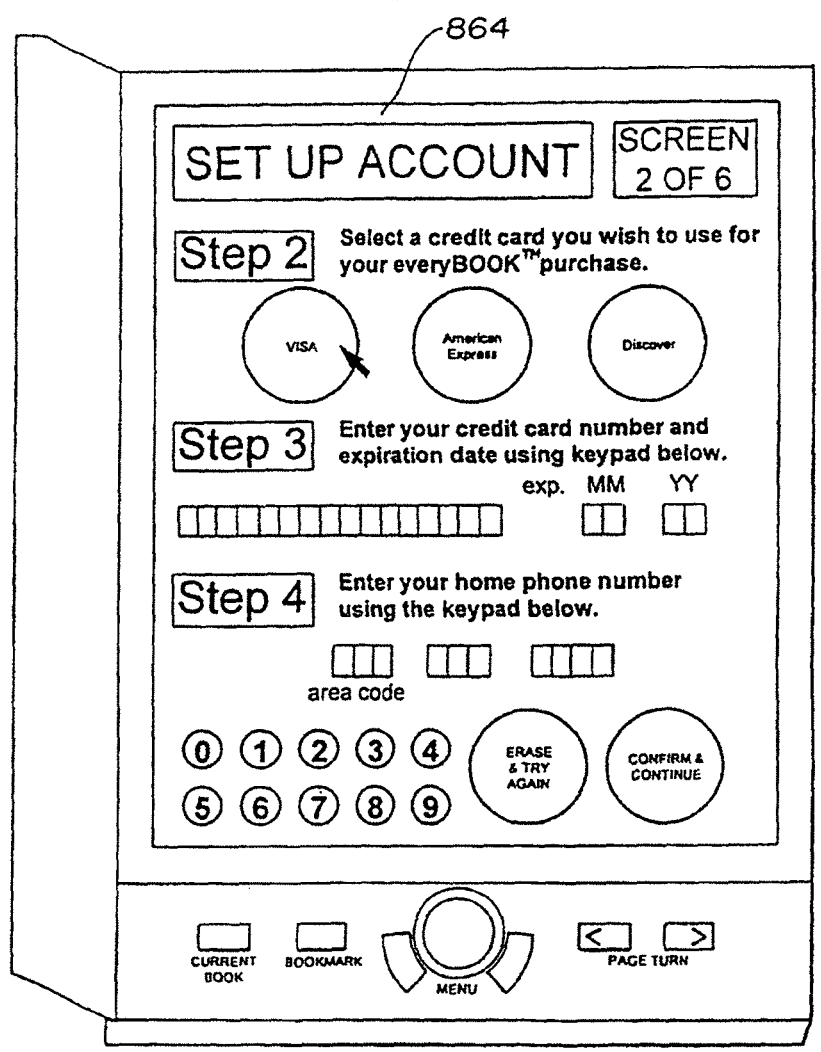

Examples of the "Account Set Up Menu" 862 and further submenus 858 related to account set up (which provide instructions and account input 864) are shown in FIG. 14g and FIG. 14h. These submenus 858 allow initialization of an account at the operations center 250 and orders to be charged to credit cards. The submenus 858 include the ability to enter data related to your desired PIN number or password, credit cards, phone numbers, etc. It is preferred that the account set up be performed using the telephone system. A confirmation menu verifies that the account has been properly set up with the desired PIN or password and credit card.

Figure 14I:
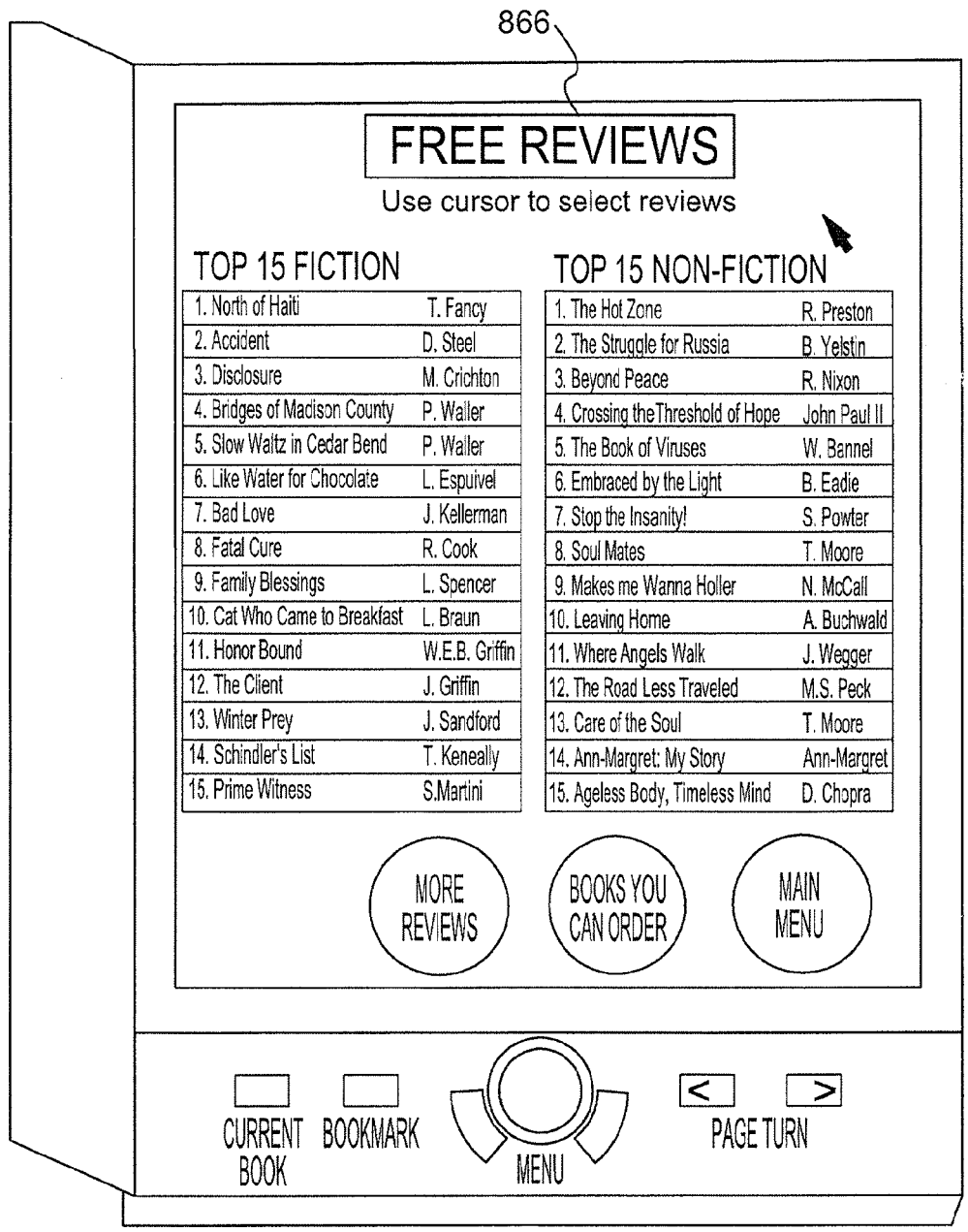
Figure 14J:
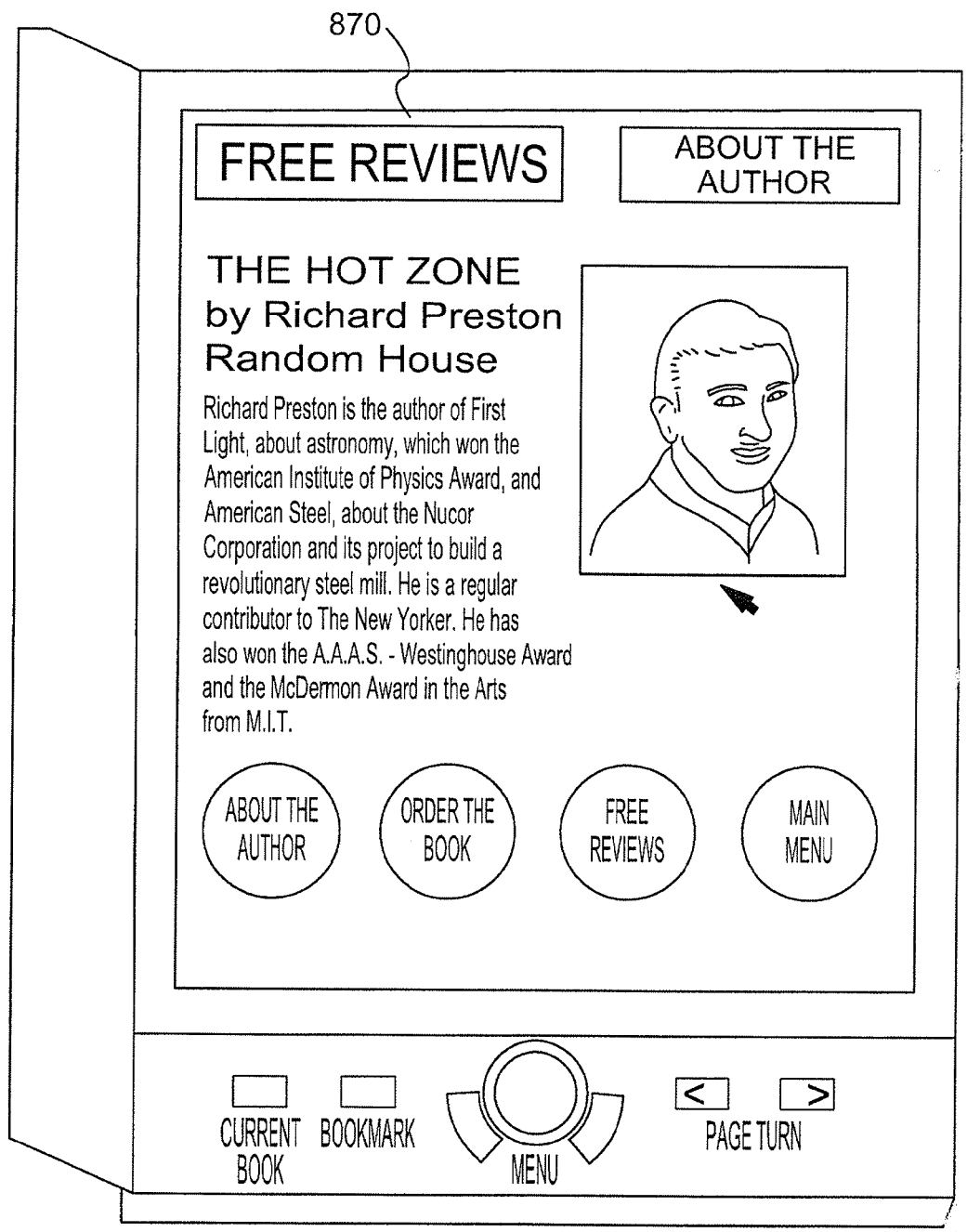

Free previews for books 866 are also provided by submenus (868, 870). Examples of the free preview menus are shown in FIG. 14i and FIG. 14j. FIG. 14i shows a menu depicting various electronic books for which previews are available for viewing. Following an electronic book selection, a screen submenu showing an excerpt of the selected electronic book cover's description is provided along with an excerpt from a critic's review of the selected electronic book. In a preferred embodiment, this preview screen for a particular electronic book also allows the subscriber to select a submenu which provides information about the author. The book preview submenu may also include a still video picture or graphics portraying a book cover or a scene from the electronic book. An example of such a still video picture or graphics is shown in FIG. 14j which depicts a preview screen 870 about the author. The video may also be provided according to MPEG standards as a short moving video clip. Such a clip could be an interview with the author, for example. The author's preview screen 870 shows a picture of the author, provides a short biography, and may allow the subscriber to order the author's books. The price for ordering the authors various electronic books may also be shown on the menu. Alternatively, the previews may be provided through an electronic link system, which will be described in detail later.

In addition to free previews, in more sophisticated embodiments, the delivery system 200 provides the subscriber with an electronic book suggestion feature (see 855). This is accomplished using the menu system 851 and the processor with associated memory located at the viewer 266, library unit 262 or at the distribution point (1020 or 250). When necessary, information for the program suggestion feature is sent in the text data of the composite or video signal to the home system 258. With this feature, books or authors are suggested to a subscriber based upon historical data of the subscriber's previous orders, demographics or mood of the subscriber, other indicators, and/or by text word searches.

In a book suggestion embodiment, text word searches of preview information (such as book cover descriptions, critics reviews and biographies about the author) and/or text of books or other titles are performed by the library unit 262 using databases stored in the library memory 600. Personalized book or author suggestions are made to the subscriber by obtaining information from the subscriber indicative of general subscriber interests. Subscriber entries are solicited from the subscriber preferably using the electronic book suggestion entries submenu 855. The system uses these subscriber entries either directly or indirectly to search for books or authors to suggest to the subscriber.

Generally, the book suggestion methods may be categorized into two categories, either responsive methods (which respond to a series of subscriber menu entries), or intelligent methods (which analyze data to suggest an electronic book). Using a responsive or intelligent method, the delivery system 200 determines a list of suggested titles or authors and creates a second or third level submenu 856, 857 to suggest the titles for subscriber selection.

Responsive methods of suggesting titles include, for example, the use of mood questions, searching for authors, and keyword searching. Using the instruction memory 732 and menu generation hardware (e.g., 607) of the viewer 266, a series of mood questions can be presented on menus to determine a subscribers interest at a particular time. For this methodology, the operations center's 250 processor 404 and instruction memory 416 assign each title mood indicators (and subindicators) from a group such as light, serious, violent, short, long, dull, exciting, complex, easy-read, young theme, old theme, adventure, romance, drama, fiction, science-fiction, etc. These indicators are sent to the home system 258 with the text data and are stored in library memory 600. Based upon the subscriber entries, the processor 404 associates a set of indicators with the subscriber's request and a set of electronic books with matching indicators are located for suggesting to the subscriber.

Responsive searches for authors or keywords (a search word provided by the subscriber) are generally performed by the library processor 628 and instruction memory 632 on data stored in the library memory 600. For example, a keyword given by the subscriber may be searched for a match in library memory 600 storing the book reviews, critics and previews databases. Thus, if a subscriber provided an entry of the word "submarine" on an appropriate submenu, the title "Hunt For Red October" may be located by the library processor 628 using instruction from a routine in the instruction memory 632.

Intelligent methods of suggesting programs include analyzing personal profile data on the subscriber and/or historical data about the subscriber such as past books ordered by the subscriber (or buy data). This method is preferred in a book on demand system and can be performed at the distribution point or operations center 250 by the on-site processor 404 using subscriber databases stored in memory 428. The home system 258 receives the text data including program suggestion information from the distribution point or operations center 250 and generates the program suggestion submenus 855, 856, 857 using the same text data receiving 212 and viewer menu generation hardware (e.g., 607, 621) described above. Software routines and algorithms stored in instruction memories (e.g. 632, 732) are used to analyze historical data and book ordered data to determine a line of books to suggest to the subscriber.

The algorithms for this powerful feature of suggesting books or authors to subscribers are disclosed in great detail in U.S. Pat. No. 5,559,549, entitled REPROGRAMMABLE TERMINAL FOR SUGGESTING PROGRAMS OFFERED ON A TELEVISION PROGRAM DELIVERY SYSTEM, issued Sep. 24, 1996, and are incorporated herein by reference.

Referring to FIG. 13, submenus 858 are shown on the "Books In Your Library" submenu 872 and are preferably broken into shelf numbers with submenus for each shelf 874, 876. The submenus 858 for the "Books You Can Order" submenu 878 is similarly broken out into submenus by shelves 880, 882. These shelves may each be a category or genre of books. Electronic books may be grouped into categories such as best sellers, novels, fiction, romance, etc. See FIG. 14*d*.

Referring to FIG. 13, the submenu 858 for "Your Current Book" 884 allows a subscriber to select a current book 884 and then determine what page to view. This selection is confirmed with a level two submenu 885. The help submenu 887 provides the subscriber with additional help screens 888. The submenus 858 for available features 890 are preferably broken out into a sequence of separate submenus for each feature 891, 892.

Referring to FIG. 13, messages can also be sent with the delivery system 200. A level one message screen provides the subscriber with the ability to select from various messages the subscriber has pending 893. Each message is then shown on a separate submenu screen 894, 895. The message may contain text and graphics.

Referring to FIG. 13, account information is shown on a level one submenu 896 and then follow-on submenus 858 show the recent orders and your account balance 897. There is also a level one submenu for outgoing messages 898 which has a follow-on submenu used as an input screen 899.

In addition to the specific features and submenus described in FIG. 13 and FIG. 14*a* through FIG. 14*j*, many other variations and features are possible. When a book is finally selected for viewing the title page 886 will appear on the screen followed by a page of text.

III. The Billing and Collection System

The billing and collection system 278 (shown in FIGS. 2 and 3) utilizes the latest technology in electronic transaction and telephone switching to track orders, authorize deliveries, bill consumers, and credit publishers automatically. The telephone calls initiated by the phone connector 270 are received by the billing and collection system 278 which responds immediately without human intervention by placing the order and charging the consumers credit card account. Data is compiled periodically and publishers 282 are credited for sales of their books or other text. The billing and collection system 278 may also connect with subscribers through two-way cable connections, cellular, or other communication means.

It is preferred that the billing and collection system 278 communicate with the operations center 250 to track changes in available books and to provide statistical data to the operations center 250.

IV. Public Library, School, and Bookstore System

Figure 15:
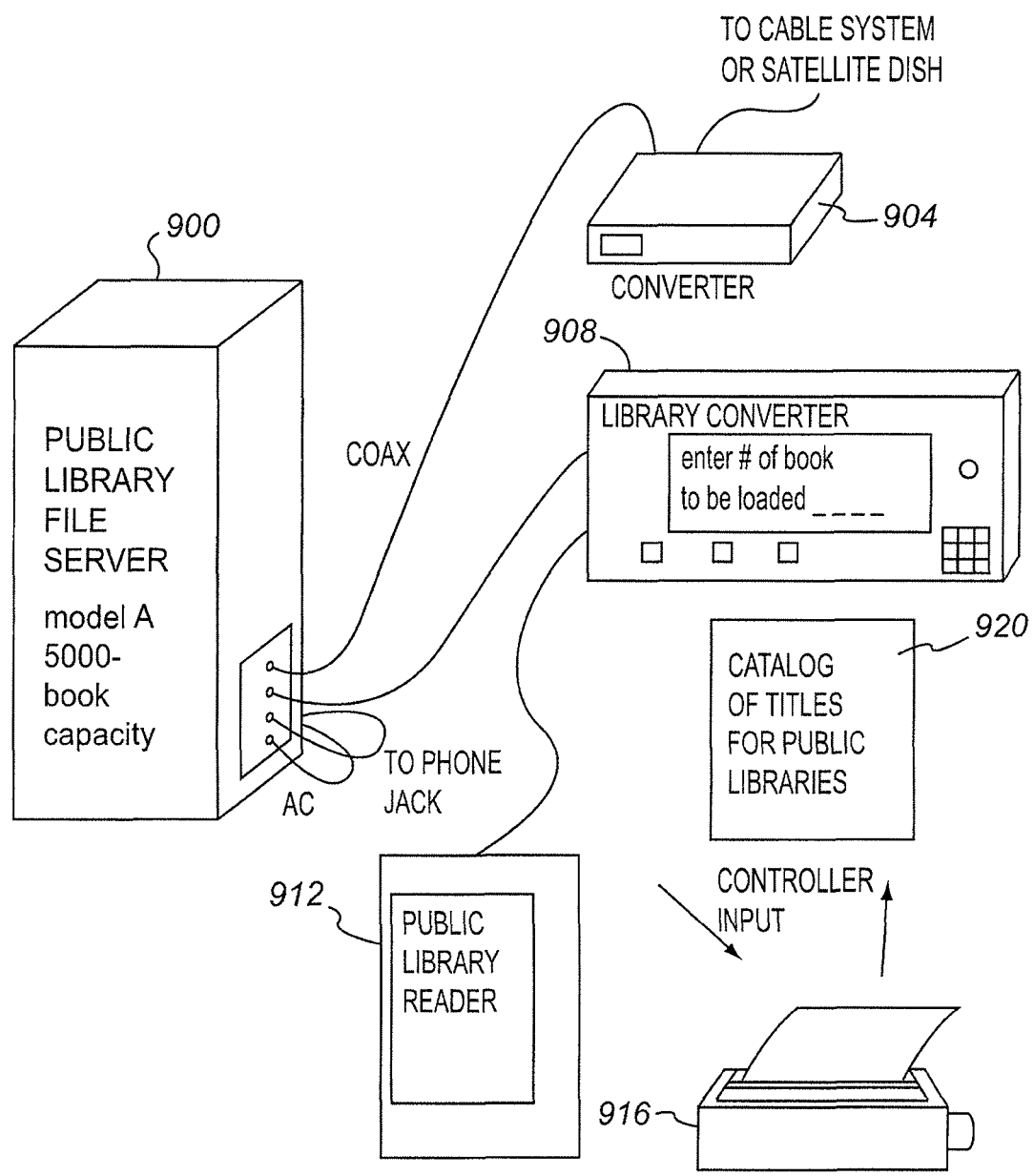
FIG. 15 is a schematic diagram of an electronic book system for a bookstore or public library.

The electronic book system can be modified to be used at public libraries, schools and bookstores. FIG. 15 shows one possible arrangement of components for a public library, school or bookstore location. The main unit at a public library, school or bookstore is the file server 900. The file server 900 is a large electronic memory unit that can store thousands of electronic books. Various electronic storage means may be used in the file servers, such as hard disks, read-write CD ROMs and read-only CD ROMs. The system comprises five components; the file server 900, a converter or video connector 904, a controller 908, a viewer 912, and a catalog printer 916. The software for controlling the system is primarily located in the controller 908. The converter or video connector 904 is similar to those described above. In this configuration the controller unit 908 monitors the data being transferred to the file server 900 by the converter 904. The controller 908 is preferably provided with a viewing screen and several control buttons. When it is necessary to have a larger screen to perform more sophisticated controlling of the system a viewer 266 may be connected to the controller 908 and the viewer screen and controls 740 may be used.

The controller 908 is only able to download books to public viewers 912 which are authorized to receive books from the particular file server 900. For security reasons it is not desirable that the public viewer 912 have access to more than one file server 900. In this way, security can be maintained over the text data for books. It is preferred that the public viewer 912 be limited to receiving one or two electronic books at a time from the controller 908. When the subscriber of the public viewer 912 needs a new or additional electronic book, the subscriber returns the viewer 912 to the school or public library where the subscriber receives a new electronic book from the controller 908.

In order to track the electronic books that are available on the file server 900, the titles of the available books may be printed on a catalog printer 916. The catalog printer 916 is connected to the library controller 908 and the titles of the electronic books are downloaded to the catalog printer 916. None of the coded text for any of the electronic books can be printed using the controller 908 and catalog printer 916 of this system. In order to maintain security over the data, none of the electronic book data is allowed to be downloaded to the printer 916. Once a complete printout of available electronic book titles, magazines, or other textual material is complete, a hard copy of the catalog 920 can be maintained at the file server 900.

The system shown may also be used at bookstores. The bookstores can rent the public viewer 912 to customers with the text for one or two electronic books loaded onto the public viewer 912. The public viewer 912 may be provided with an automatic timeout sequence. The timeout sequence would erase the textual data for the books after a certain period of time, for example, two weeks. It is expected that after a period of time (perhaps within two weeks) the renter would return the public viewer 912 to the bookstore and receive additional electronic books for viewing. Using this arrangement, it is also possible for the bookstore to (permanently) sell a viewer 912 to a regular customer. The customer then returns to the bookstore from time to time to receive textual data for an electronic book which the customer can then store permanently on the customer's own viewer 912. Various other configurations are possible for bookstores, schools and public libraries using the file server 900 and public viewer 912 described.

V. Use of a Set Top Converter

Existing set top converters such as those made by Scientific Atlanta or General Instruments are presently unequipped to handle the delivery system 200 of the present invention. Although set top converters may be built which include the library functions, hardware modifications are necessary in order to use the delivery system 200 with existing set top converter technology.

Figure 16A:
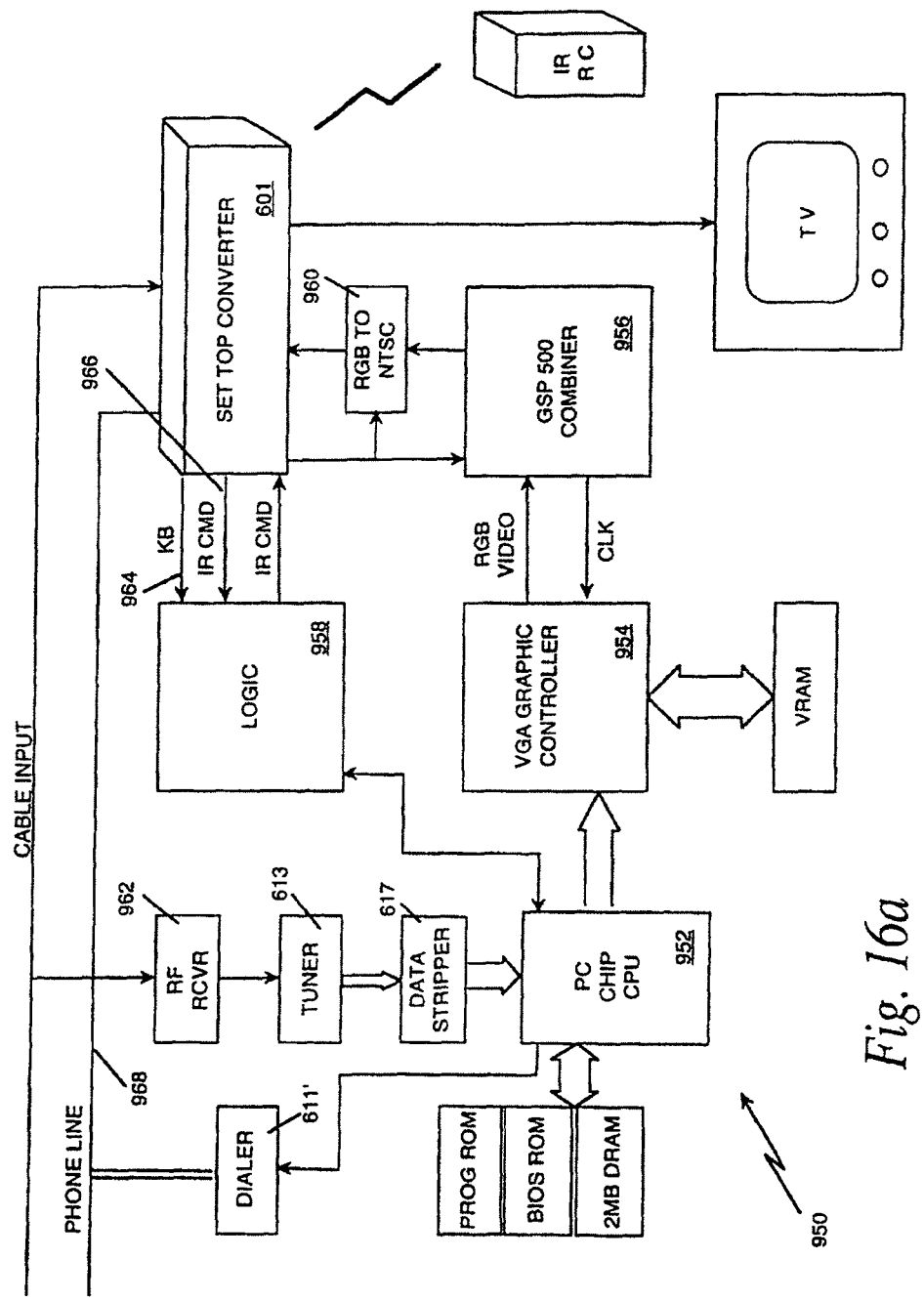
FIG. 16a and FIG. 16b are schematics of hardware modifications or upgrades to a set top converter.
Figure 16B:
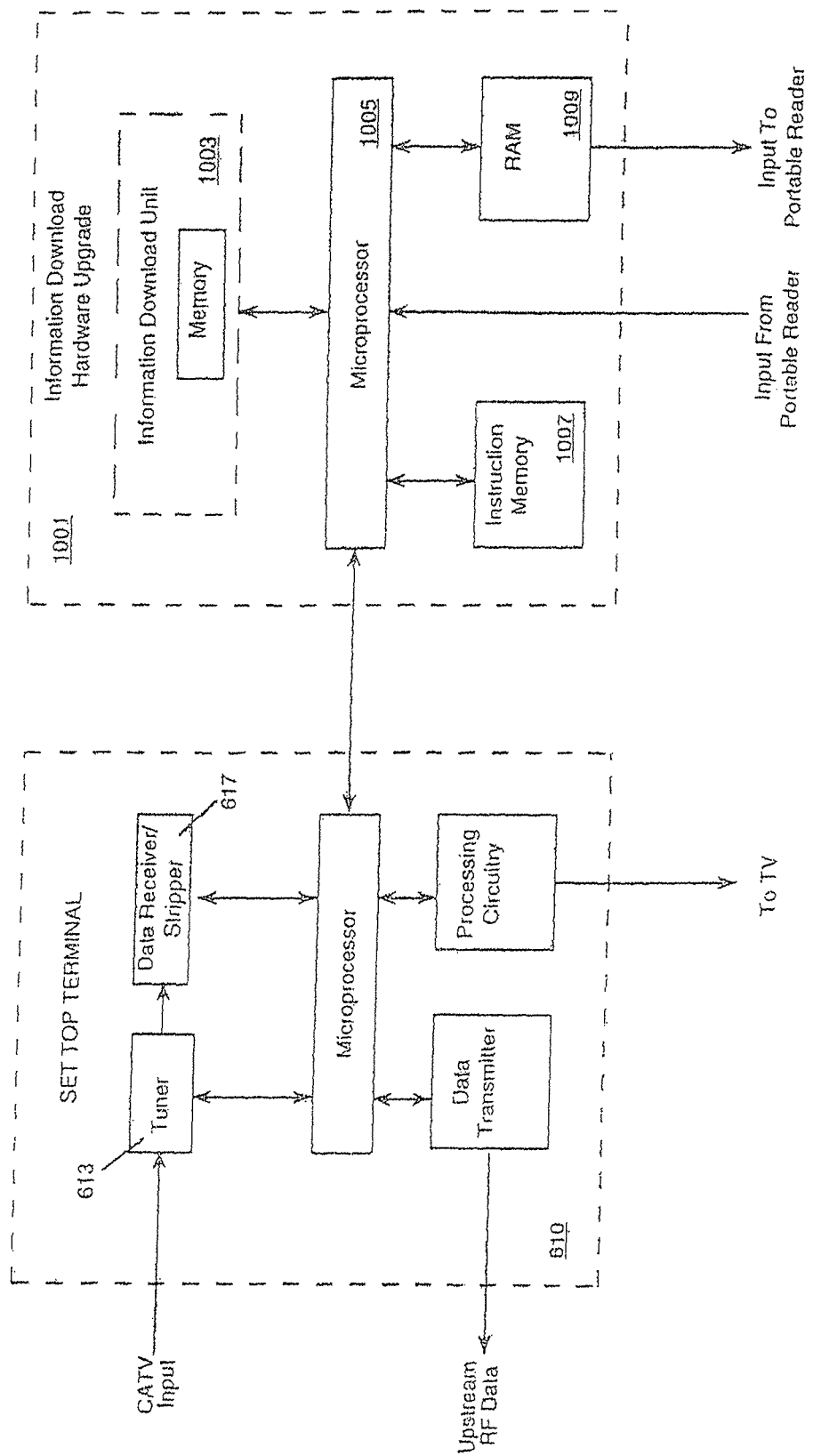

FIGS. 16*a* and 16*b* are examples of hardware modifications or upgrades. A port is used to attach hardware upgrades described below to a set top terminal. Two upgrades are possible to set top converters 601 to assist in receiving and selecting electronic books. A menu generation card upgrade (FIG. 16*a*) and an information download unit (FIG. 16*b*). Each of these upgrades may be connected to the set top terminal unit through an upgrade port. A four wire cable, ribbon cable, IEEE 1394 firewire interface, USB interface, or the like may be used to connect the upgrade to the set top converter 601.

A card addition 950 to a set top converter 601 is depicted in FIG. 16*a*. The card 950 shown provides the additional functionality needed to utilize the book selection system with existing set top converter 601 technology. The card 950 may be configured to slip inside the frame of a set top terminal and become part of the set top terminal, an advanced set top terminal. The primary functions the card 950 adds to the set top converter 601 are the interpreting of data signals, generating of menus, sequencing of menus, and, ultimately, the ability of the subscriber to select an electronic book using either the television or a viewer 266. The card 950 also provides a method for a remote location, such as the cable headend, to receive information on electronic books ordered. The electronic books ordered information and control commands may be passed from the cable headend to the card 950 using telephone lines.

The primary components of the card 950 are a PC chip CPU 952, a VGA graphic controller 954, a video combiner 956, logic circuitry 958, NTSC encoder 960, a receiver 962, demodulator (not shown), and a dialer 611'. The card 950 operates by receiving the data text signal from the cable headend through the coaxial cable. The logic circuitry 958 of the card 950 receives data 964, infrared commands 966, and synchronization signals (not shown) from the set top converter 601. Menu selections made by the viewer 266 on the remote control are received by the set top converter's 601 IR equipment and passed through to the card 950. The card 950 interprets the IR signal and determines the electronic book (or menu) the subscriber has selected. The card 950 modifies the IR command to send the information to the set top converter 601. The modified IR command contains the channel information needed by the set top converter 601. Using the phone line 968 and dialer 611', the card 950 is able to transmit electronic books ordered information to the cable headend. It is also possible to receive the electronic books over the telephone lines and by-pass the video distribution system. In this embodiment, the telephone system may be used to provide access to an Internet web site to order and receive electronic books.

These commands are passed through the interface linking the set top terminal's microprocessor with the microprocessor of the hardware upgrades. In this way, subscriber inputs, entered through the set top terminal keypad or remote control, can be transferred to any of the hardware upgrades for processing and responses generated therein can then be sent back to the set top terminal for display. In a preferred embodiment the IR commands 966 are transferred from set top terminal 601 to hardware upgrade.

Hardware upgrades may include a microprocessor, interactive software, processing circuitry, bubble memory, and a long-term memory device. In addition to these basic components, the hardware upgrade may make use of an additional telephone modem or CD-ROM device.

The information download hardware upgrade 1001 (shown in FIG. 16*b*) allows the subscriber to download large volumes of information from the operations center 250 or cable headend using the set top converter 601. The hardware upgrade 1001 will enable subscribers to download data, such as electronic books and magazines, to local storage. Primarily, the hardware upgrade 1001 is an additional local storage unit 1003 (e.g., hard disk, floppy, optical disk or magnetic cartridge and may include a microprocessor 1005, instruction memory 1007, and a random access memory 1009, as shown in FIG. 16*b*). Preferably, a small portable viewer 266 is also provided with the upgrade 1001 to enable downloaded text to be read without the use of a TV.

The downloadable information may be text or graphics supplied by the operations center 250 or cable headend. With this upgrade, electronic books may be downloaded and read anywhere with the portable viewer 266. Using this upgrade, books may be downloaded and stored in compressed form for later decompression. The electronic books would be decompressed only at the time of viewing. Important text that the public desires immediate access may made available through this system. Text such as the President's speech, a new law, or a recent abortion decision rendered by the Supreme Court may be made immediately available.

In one embodiment, electronic book ordering information is stored at each set top terminal until it is polled by the cable headend using a polling request message format. An example of a polling request message format consists of six fields, namely: (1) a leading flag at the beginning of the message, (2) an address field, (3) a subscriber region designation, (4) a set top terminal identifier that includes a polling command/response (or P/F) bit, (5) an information field, and (6) a trailing flag at the end of the message. A similar response frame format for information communicated by the set top terminal to the cable headend in response to the polling request may be used.

Figure 17:
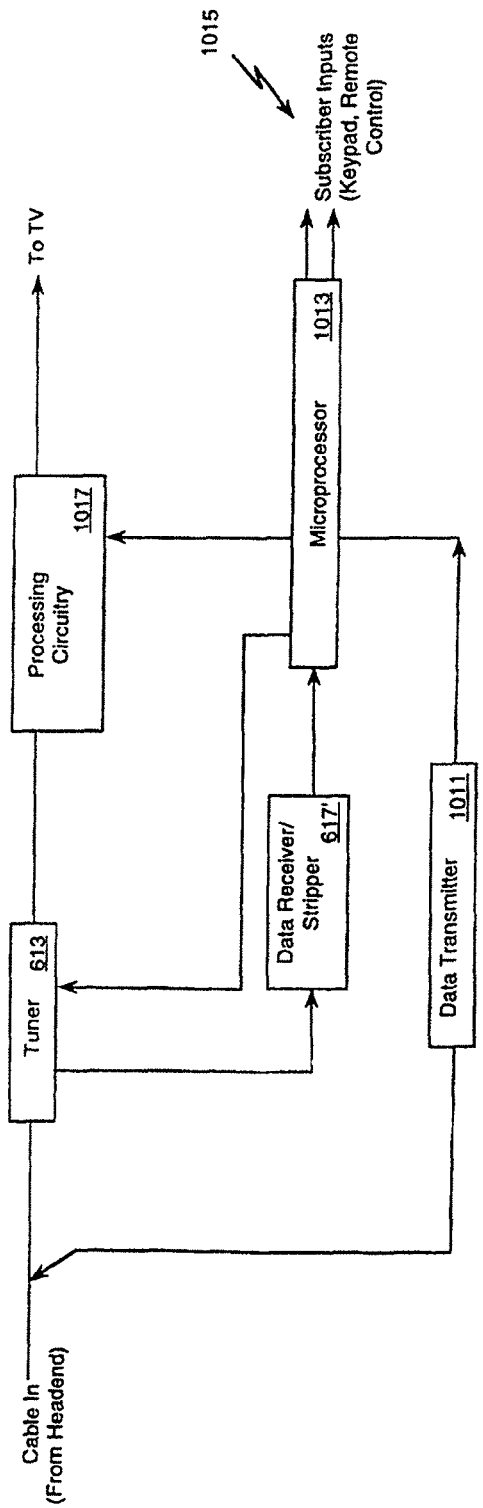
FIG. 17 is a schematic showing a set top terminal that includes a data receiver and data transmitter.

FIG. 17 shows a preferred set top converter that includes a data receiver 617' and a data transmitter 1011. The data transmitter provides upstream data communications capability between the set top converter 601 and the cable headend. Upstream data transmissions are accomplished using the polling system described and, using a data transmitter 1011. Both receiver 617' and transmitter 1011 may be built into the set top converter 601 itself or added through an upgrade module. Regardless of the specific hardware configuration, the set top terminal's data transmission capabilities may be accomplished using the hardware shown in FIG. 17.

FIG. 17 shows RF signals, depicted as being received by a data receiver 617' and tuner 613 working in unison. Both of these devices are interfaced with the microprocessor 1013, which receives inputs 1015, from the subscriber, either through a set top converter's keypad, a remote control unit or the viewer 266. All cable signals intended for reception on the subscriber's TV are accessed by the tuner 613 and subsequently processed by the processing circuitry 1017. This processing circuitry 1017 typically includes additional components (not shown) for descrambling, demodulation, volume control and remodulation on a Channel 3 or 4 TV carrier.

Data targeted to individual set top converters is received by the data receiver 617' according to each set top converter's specific address or ID. In this way, each addressable set top converter only receives its own data. The data receiver 617' may receive set top converter 601 specific data in the information field of the signal frame described or on a separate data carrier located at a convenient frequency in the incoming spectrum.

The received data includes information regarding electronic books and menus available for selection. The subscriber may enter a series of commands 1015 using a keypad or remote control in order to choose an electronic book or menu. Upon receipt of such commands, the microprocessor 1013 instructs the tuner to tune to the proper frequency of the channel carrying data and subsequently instructs the processing circuitry 1017 to begin descrambling of this data. Upon selection of the electronic book, the microprocessor 1013 stores any selection information in local memory (not shown) for later data transmission back to the cable headend, The microprocessor 1013 coordinates all CATV signal reception and also interacts with various upstream data transmission components. Typically, the data transmitter 1011 operates in the return frequency band between 5 and 30 MHZ. In an alternative embodiment, the frequency band of 10 to 15 MHZ may be used. Regardless, however, of the frequency band used, the data transmitter 1011 sends information to the cable headend in the information field of the response frame described. Those skilled in the art will recognize that a number of variations and combinations of the above-described set top terminal hardware components may be used to accomplish upstream data transmissions.

VI. Books-on-Demand System

Figure 18A:
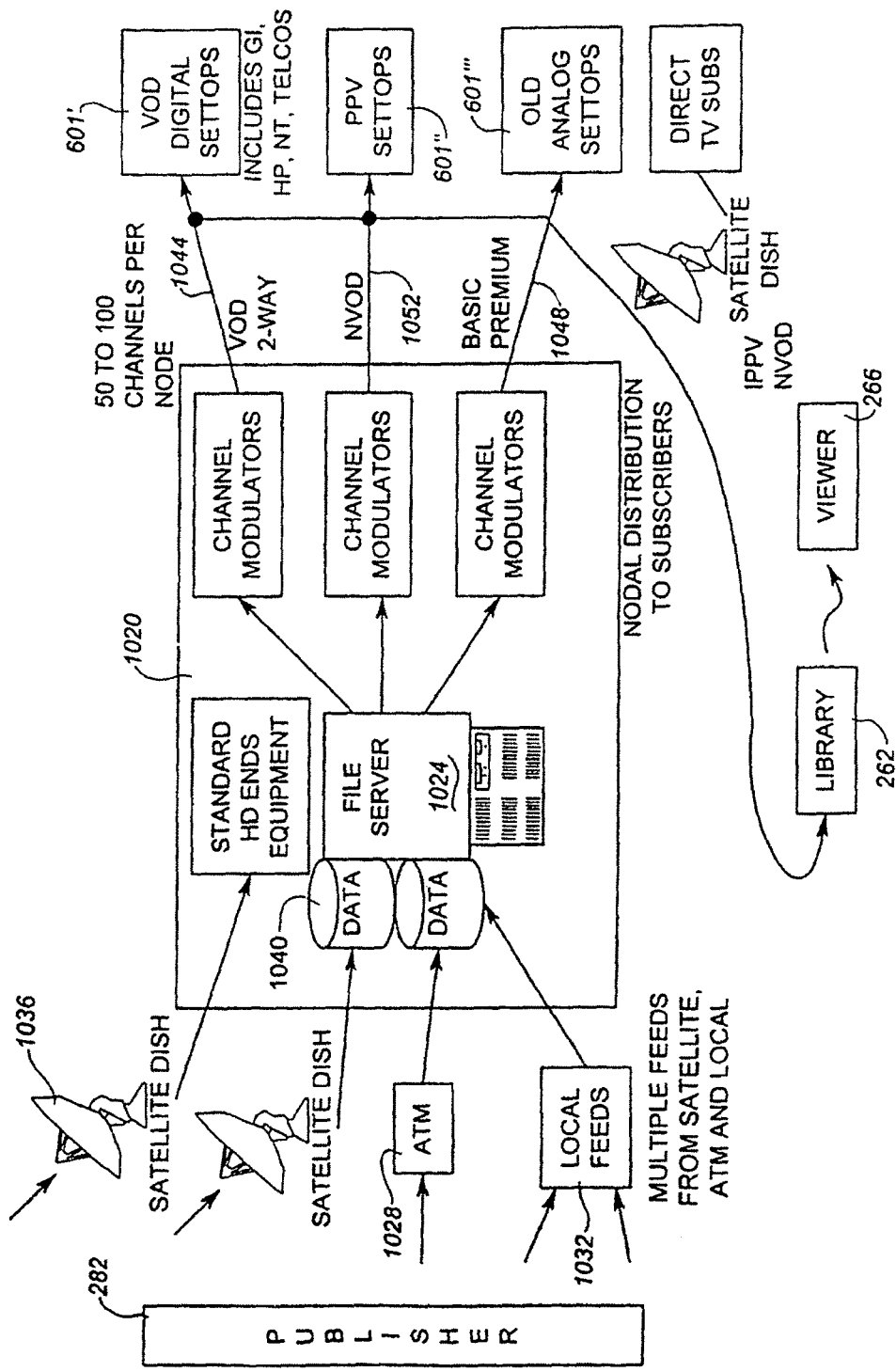
FIG. 18a is a schematic of a book-on-demand system.

The electronic book system 200 described may also be configured in a book-on-demand style. FIG. 18a shows one example of a configuration for a books-on-demand system. A books-on-demand system requires more powerful two-way communications between the consumer's home, bookstore, school or public library and either the operations center 250 or a distribution site 1020 such as the cable headend. This type of two-way communication can be provided by the hardware shown in FIG. 17 and described above.

Referring to FIG. 18a, in a books-on-demand system, the subscriber selects the electronic book to be download from an available menu of electronic books (see for example FIGS. 14d and 14e). The data for menus of available books is usually sent to the subscriber location by the distribution site 1020. After the subscriber's menu selection, information about the subscriber selection (or request) is then communicated to either a distribution point 1020 (such as a cable headend or an Internet web site) or the operations center 250. Upon receipt of this request, the needed textual and graphical information for the book is spooled and sent to the subscriber. In this manner, books are only sent when requested by the subscriber and are sent immediately upon demand for the book (or text).

In order to support such a books-on-demand system, the text delivery and distribution must be conducted on a strong nodal architectured distribution system, such as, a video-on-demand cable or telephone television system, an Internet web site, or through use of individual telephone access on the public telephone system.

The books-on-demand system allows for a greater selection of electronic books to the subscriber and limits the amount of communicated book data that is unnecessary or unneeded. It also provides the electronic book to the subscriber in a much timelier fashion.

In addition to a stronger distribution system, a books-on-demand system requires a distribution point 1020 to have more sophisticated equipment to access and "spool out" the textual information. This can be accomplished using file server technology 1024 for storing the electronic books and ATM 1028 or telephone-type switching (not shown) to distribute the textual information. The file server 1024 and distribution technology that can be used in configuring such a books-on-demand system is described in U.S. Pat. No. 5,262,875 and U.S. Pat. No. 5,218,695, cited above.

FIG. 18a shows an embodiment for a books-on-demand system that utilizes file server technology. In addition to electronic books, the embodiment of FIG. 18a will support distribution of nearly any digital data. Electronic books or textual files are received from publishers 282 and other sources through local feeds 1032, ATM 1028, or by satellite dish 1036. The data is then stored in memory 1040 at the file server 1024. The distribution point 1020 may be a cable headend that receives requests from subscribers and delivers text to subscribers over a two-way communication system (such as a video-on-demand system (VOD) 1044). Alternately, an Internet web site may serve as the distribution point 1020.

The library unit 262 can be connected to either a basic premium-type service cable system 1048, a near video-on-demand type cable system (or pay-per-view (PPV) 1052) or a video-on-demand cable system 1044. In connecting with either of these three systems the library unit 262 may access the cable directly or may access the system through a set top terminal 601', 601", or 601'''.

Using the two-way video-on-demand system 1044, a subscriber is able to request a specific electronic book title and receive that text immediately following its request. To accomplish this, the distribution point 1020 transmits a list of available electronic books through the cable delivery system to the library unit 262. The library unit 262 displays the list of available electronic books on a menu or similar format. As described earlier, it is preferred that the library unit 262 use menus which list categories of available electronic books to form its request from the distribution point 1020. After selecting an electronic book, the library unit 262 sends a request signal on the two-way communication system 1044 back to the distribution point 1020. This request signal can be handled in two ways. The library unit 262 either initiates the request or the distribution point 1020 polls the various libraries on to the two-way system 1044. Upon receiving the request for the electronic book title, the text associated with that book title is transmitted to the library unit 262 using the two-way cable system 1044.

Figure 18B:
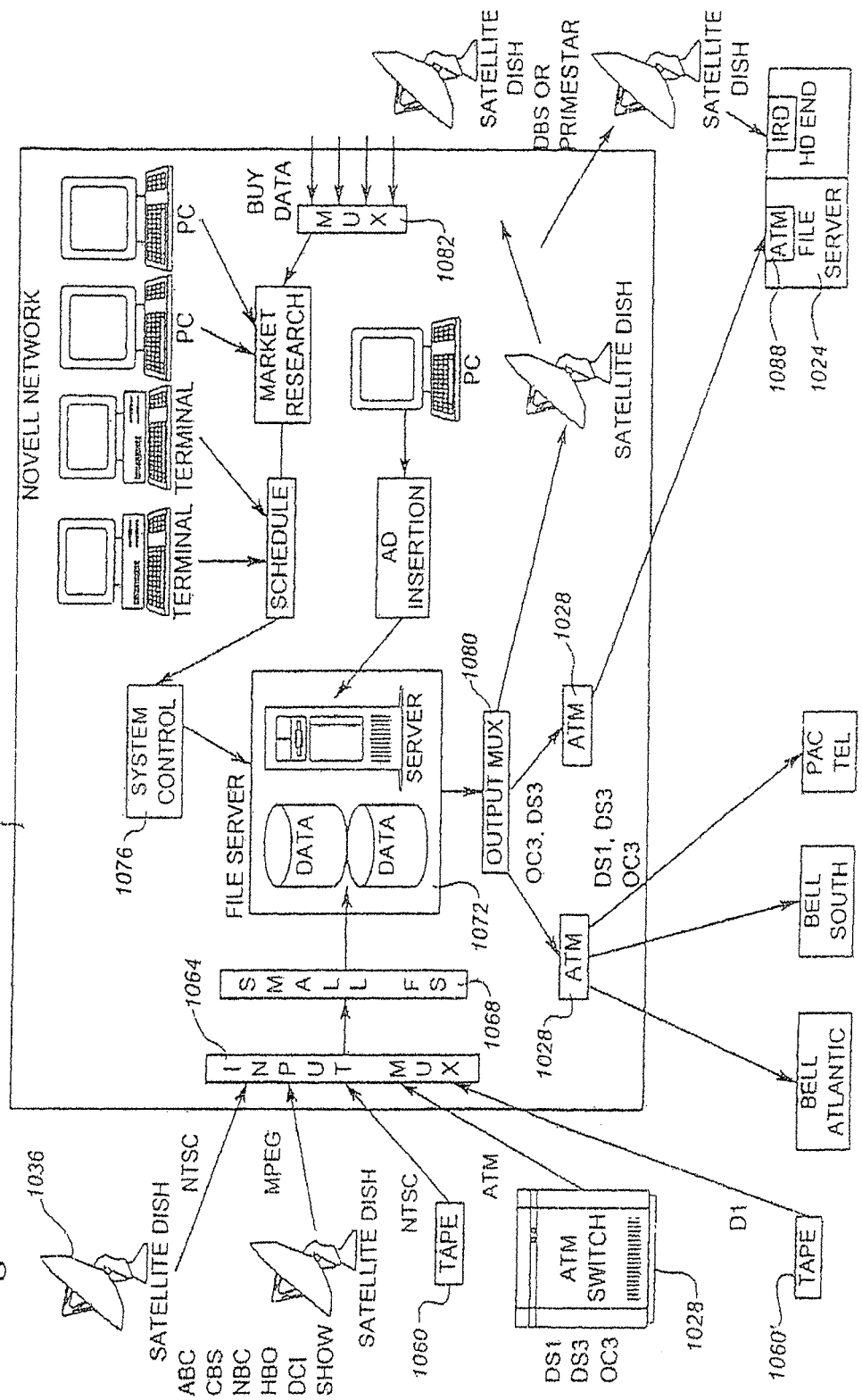
FIG. 18b is a schematic of an operations center supporting a book-on-demand system.

FIG. 18b is an expanded view of a preferred operations center 250 that supports a regional or national books-on-demand system. In fact, the operations center 250 shown supports distribution of nearly any digital data. The operations center 250 supports multiple feeds to receive digital information by tape 1060, 1060', ATM 1028, or satellite 1036. The information is processed through an input MUX 1064 and a small file server 1068 before reaching the master file server 1072. Digital data such as electronic books received from publishers 282 is then stored on the master file server 1072. It is preferred that the digital data is stored compressed in a standard format such as MPEG2.

A system controller 1076 provides control over the regional or national books-on-demand system. Electronic books may be packaged into groups to provide feeds to various cable headends. In addition, scheduling and marketing research are conducted at the operations center 250. In order to handle the scheduling and market research, electronic book buy data is received at the operations center 250 through a multiplexer 1082. Electronic book buy information can be provided by the operation center 250 to the billing and collection system 278.

The operations center 250 is also equipped to insert messages or advertisements into the file server. These messages or advertisements will eventually be received by the subscribers.

The master file server 1072 uses an output multiplexer 1080 and ATM 1028 as well as satellite connections to distribute digital data. In a preferred embodiment, cable headends receive text data on electronic books from the master file server 1080 through the output multiplexer 1028 and an ATM system 1028. After receiving the electronic book data, the cable headends store the books in a local file server 1024. FIG. 18a's distribution point 1020 is an example of a cable headend which may receive data from the operations center 250 of FIG. 18b through an ATM hookup 1088 or satellite hookup.

VII. Voice Emulation Features for Electronic Books

Figure 19:
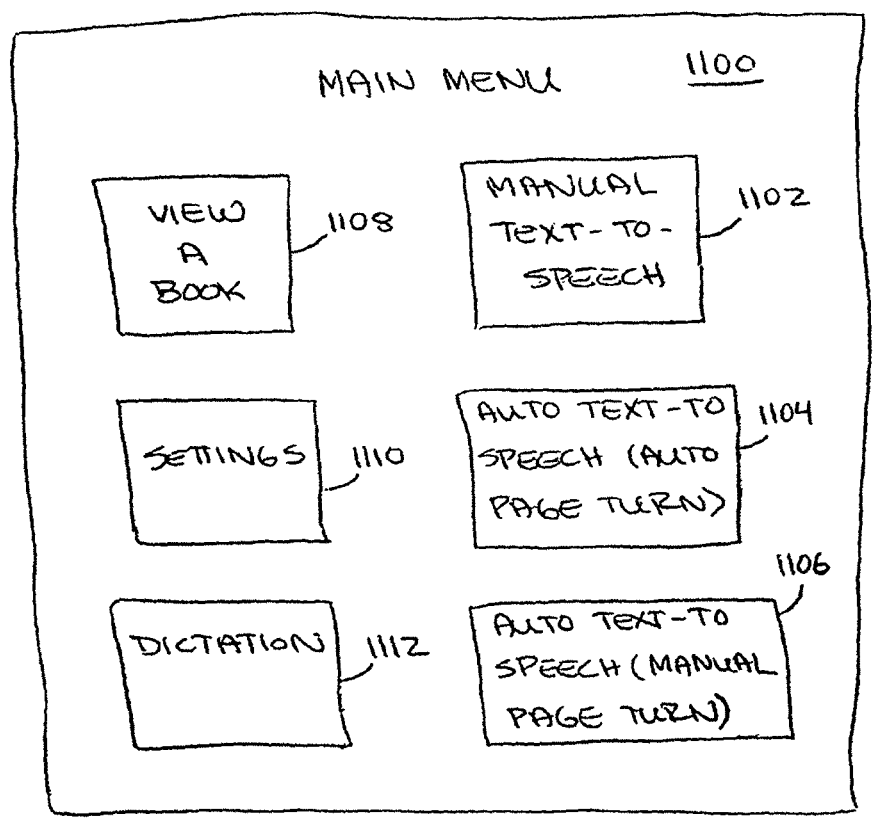
FIG. 19 is a diagram of a main menu screen for presenting on a viewer voice emulation options for electronic books.

FIG. 19 is a diagram of a main menu screen 1100 for presenting on the viewer 266 voice emulation options for electronic books. Main menu 1100 may be displayed on the viewer 266 for permitting a user to select various options relating to voice emulation in electronic books. Main menu 1100 has a number of sections for permitting the user to select the options by selecting an appropriate section. The term section refers to a definable portion of the screen, and the act of selecting a section may involve, for example, positioning the cursor or a pointer over the section using trackball 743 and depressing selection button 745 to "click on" the section; other cursor-control devices, including peripheral devices, may be used to select a section either by positioning the cursor or by entering a particular command. The sections in main menu 1100, and other described screens, may alternatively have different shapes and may be displayed in a different configuration than that shown. In addition, the screens may have more or fewer sections depending upon, for example, desired functions or displayed information. Also, main menu 1100 and the other described screens may be generated for display on the viewer 266, or retrieved from memory for display, by library processor 628 operating under control of software modules residing within the instruction memory unit 632 or by viewer processor 621 operating under control of software residing within the instruction memory 732, or by hardware modules, or a combination of hardware and software modules. A keyboard may be used with the viewer and key strokes may be used for commands. Alternatively, a soft keyboard may be displayed on the viewer 266 and may be used to enter commands.

A manual text-to-speech section 1102 permits the user to select an option to convert text within a displayed electronic book to corresponding speech. The phrase text-to-speech refers to conversion of text in electronic form to corresponding speech. An auto text-to-speech section 1104 with auto page turn permits a user to select an option to have the viewer continuously convert text to speech from page to page within an electronic book. An auto text-to-speech section 1106 with manual page turn permits a user to select an option to have the viewer 266 automatically convert an entire page of displayed text to speech. For the various text-to-speech conversion features, the viewer 266 may use speaker/microphone 608' to convert text in electronic form to corresponding speech.

A view book section 1108 permits a user to select an option to view an electronic book. A settings section 1110 permits a user to select an option to view a settings menu and enter various parameters relating to the voice emulation features. Settings are various parameters relating to controls of an electronic book and associated functions. A dictation section 1112 permits a user to select an option to perform dictation into an electronic book. The term dictation refers to conversion of speech to corresponding text in electronic form capable of display on a viewer or other display device.

Figure 20:
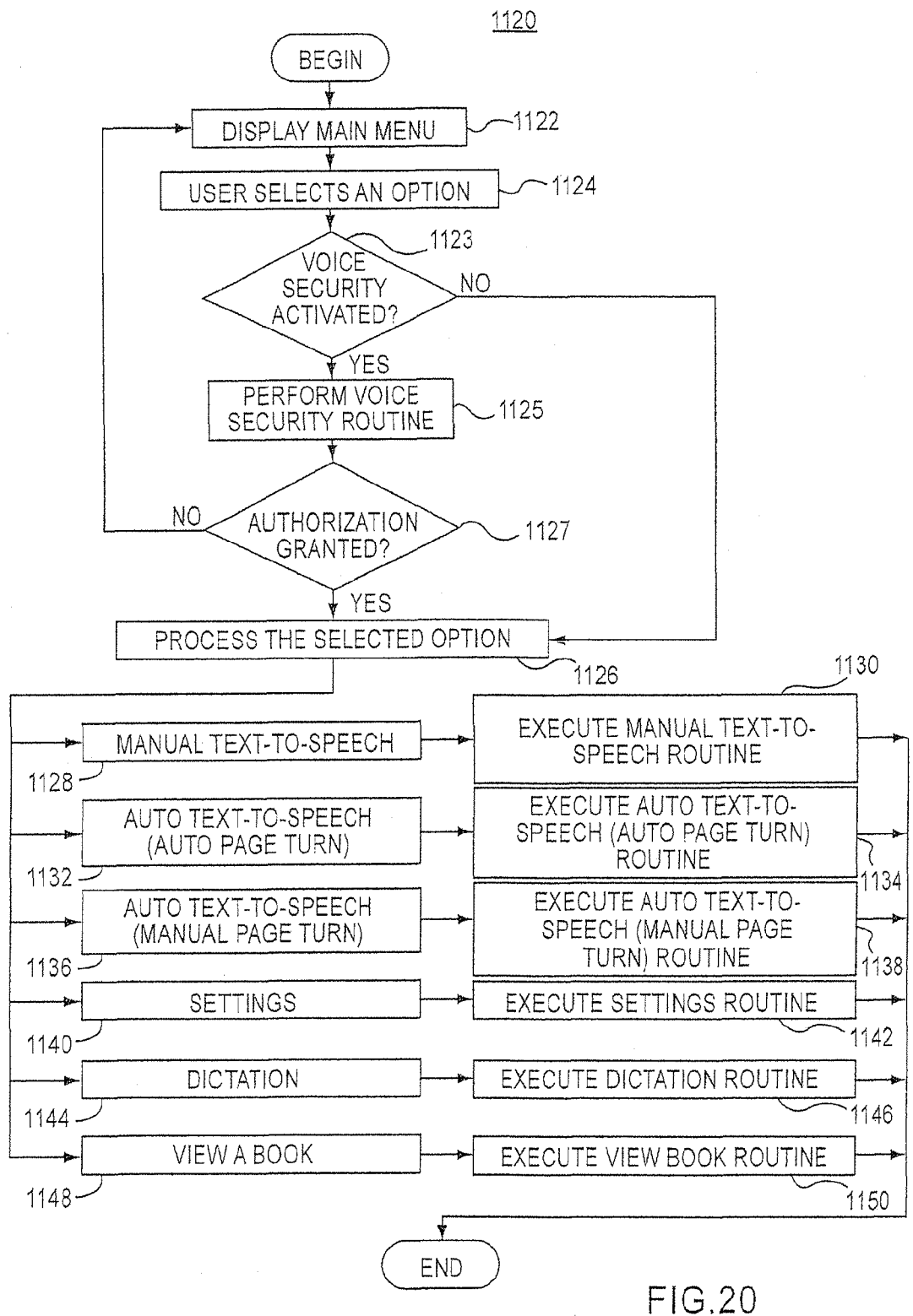
FIG. 20 is a flow chart of a main menu routine.

FIG. 20 is a flow chart of a main menu process 1120 for processing options selected by a user in main menu 1100. Main menu process 1120 may be implemented within the viewer 266, the library 262, or a combination; for example, it may be implemented by software modules residing within the instruction memory unit 632 for execution by the library processor 628 or within the instruction memory 732 for execution by the viewer processor 621, or by hardware modules, or a combination of hardware and software modules. A display process 1122 displays main menu 1100 on the viewer 266, and a select process 1124 receives a user's selected option within main menu 1100. A decision process 1123 determines if a voice security function has been activated and, if so, main menu process executes a voice security routine 1125, further explained below. Voice security is a feature permitting only users with a particular voice pattern or characteristic to have access to content of the viewer 266 or electronic books stored within the viewer 266 or library 262. As a result of voice security routine 1125, an authorization routine 1127 determines if the user has authorization for the requested function.

If the user has authorization, an option process 1126 executes processing for the selected option. In particular, depending upon which option the user selected, various routines are performed. If the user selected manual text-tospeech section 1102, a speech process 1128 executes a manual text-to-speech routine 1130. If the user selected auto text-to-speech section 1104, a speech process 1132 executes an auto text-to-speech (auto page turn) routine 1134. If the user selected auto text-to-speech section 1106, a speech process 1136 executes an auto text-to-speech (manual page turn) routine 1138. If the user selected setting section 1110, a settings process 1140 executes a settings routine 1142. If the user selected dictation section 1112, a dictation process 1144 executes a dictation routine 1146. If the user selected view book section 1108, a view book process 1148 executes a view book routine 1150.

Figure 21:
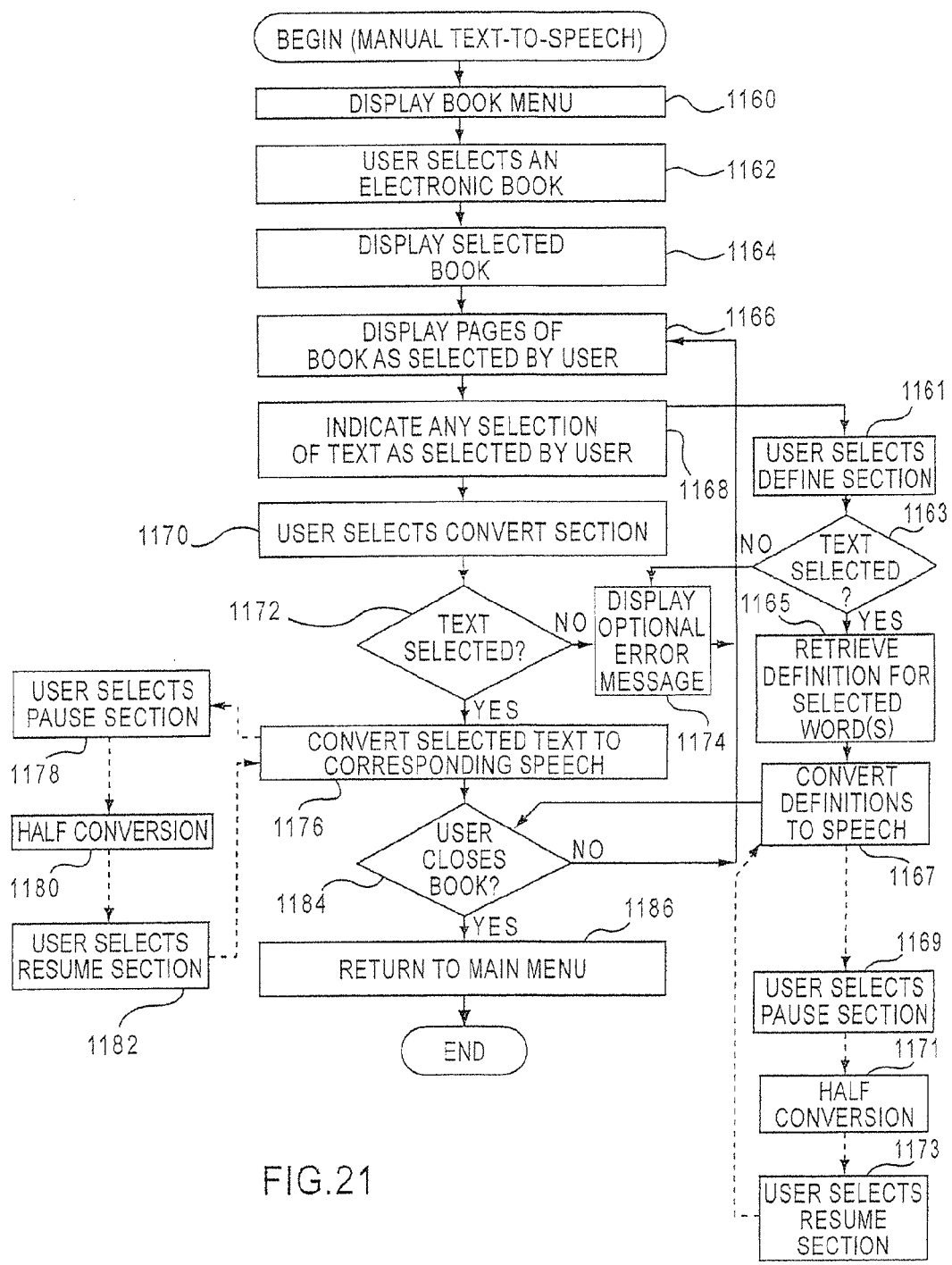
FIG. 21 is a flow chart of a manual text-to-speech routine.
Figure 22:
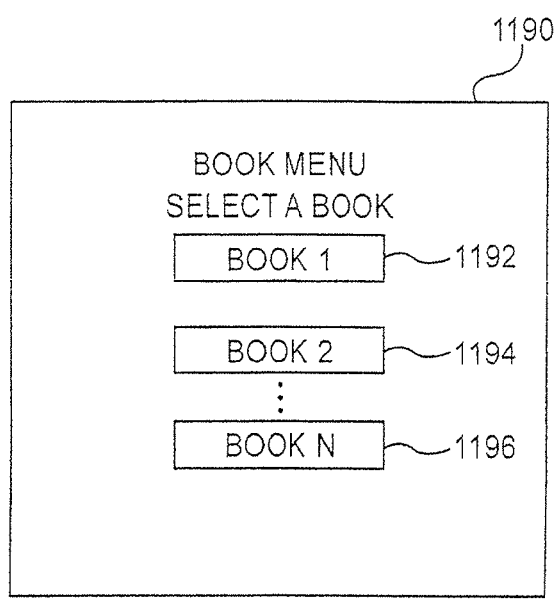
FIG. 22 is a diagram of a book menu screen.

FIG. 21 is a flow chart of manual text-to-speech routine 1130. Manual text-to-speech routine 1130 may be implemented within the viewer 266, the library 262, or a combination; for example, it may be implemented by software modules residing within the instruction memory unit 632 for execution by the library processor 628 or within the instruction memory 732 for execution by the viewer processor 621, or by hardware modules, or a combination of hardware and software modules. In routine 1130, a display process 1160 displays a book menu. FIG. 22 illustrates a book menu screen 1190 for display on the viewer 266 and for displaying a book menu on the viewer 266. Book menu screen 1190 includes sections 1192, 1194, and 1196 identifying stored electronic books. A selection process 1162 receives a user's selected electronic book from book menu screen 1190, and a display process 1164 displays the selected electronic book on the viewer 266. A user may select an electronic book by positioning the cursor on a section identifying the electronic book and selecting the section or by entering a particular command. In using a voice commands mode, a user may speak the title of a particular electronic book, or other identifying information, in order to select it.

FIG. 23 illustrates a text screen 1200 for display on the viewer 266 and for displaying a page of an electronic book. The text screen 1200 also includes various sections for a user to enter commands. In particular, a user may select a page section 1208 and enter a page number into the section in order to jump to another page of the displayed electronic book. The user may select page turn sections 1210 and 1212 to page backward and forward, respectively, in the displayed electronic book. The user may select a convert section 1206 to convert selected text to speech and select a pause section 1202 and a resume section 1204 to pause and resume, respectively, the text-to-speech with manual page turn conversion. A define section 1207 permits the user to receive definitions, in speech form, of words selected in the text.

A display pages process 1166 displays pages of the electronic book as selected by the user by selecting, for example, a page section 1208 and page turn sections 1210 and 1212. An indication process 1168 indicates any text selected by a user. FIG. 24 illustrates an example of selected text 1214 in the text screen 1200. Although selected text is shown as shaded in the text screen 1200, selected text may be indicated in other ways such as by showing it underlined, in a different color than surrounding text, in reverse video, in a different font than surrounding text, in bold, or in another manner that distinguishes the selected text from surrounding text or information. A selection process 1170 receives the user's selection of convert section 1206 and, in response, a decision process 1172 determines if the user has selected text. If no text is selected, a display process 1174 may optionally display an error message indicating that text must be selected for conversion to speech in this mode. If text is selected, a conversion process 1176 converts the selected text to speech using, for example, a text-to-speech conversion program. Text-to-speech conversion programs are known in the art and examples include those programs disclosed in the following U.S. patents, which are incorporated herein by reference: U.S. Pat. No. 5,848,390, entitled SPEECH SYNTHESIS SYSTEM AND ITS METHOD; U.S. Pat. No. 5,774,854, entitled TEXT TO SPEECH SYSTEM; U.S. Pat. No. 5,682,501, entitled SPEECH SYNTHESIS SYSTEM; U.S. Pat. No. 5,220,629, entitled SPEECH SYNTHESIS APPARATUS AND METHOD; and U.S. Pat. No. 5,113,449, entitled METHOD AND APPARATUS FOR ALTERING VOICE CHARACTERISTICS OF SYNTHESIZED SPEECH. Other examples include products developed by the AT&T Advanced Speech Products Group. The Advanced Speech Products Group can be accessed at www.research.att.com/projects/watson/index.html.

Alternatively, underlying pointers tied to text can correspond to pointers in a pre-recorded and stored audio version of the text, avoiding the need for real-time text-to-speech conversion. In that example, an electronic book file may contain both the text and corresponding audio files or links to them. The audio files or links to them may be stored within a header file for each electronic book. The information contained in the header file is used to identify and categorize each electronic book for display and other purposes, such as searching. As new electronic books are loaded on the viewer 266 or library unit 262, this header information is extracted from the header file and stored in a database resident on the viewer 266 or library unit 262, such as in memory 600 or 600'.

The header information associated with each electronic book typically includes the information shown in Table 1 and can be stored, for example, in records or other database structures. The header file may contain a field for storing an audio file corresponding to text in the electronic book, and may alternatively contain a field identifying a link to such an audio file. The audio files may contain an audio version of the entire text of the electronic book or a portion of it. In addition, multiple audio files may be used for discrete elements or portions of text in the electronic book, and may potentially be linked together based upon text selected by a user for conversion to corresponding speech or audio.

TABLE 1

Title:
Authors:
    Primary Author:
    Author 2:
    Author 3:
    Author 4:
    Author 5:
ISBN #:
Library of Congress # (LC#)
Dewey Decimal Classification # (DDC#)
Publisher:
Edition Number:
Date of Publishing:
Related Categories:

| | |
|---|---|
| Category 1 | Category 6 |
| Category 2 | Category 7 |
| Category 3 | Category 8 |
| Category 4 | Category 9 |
| Category 5 | Category 10 |

Related Keywords:

| | |
|---|---|
| Keyword 1 | Keyword 6 |
| Keyword 2 | Keyword 7 |
| Keyword 3 | Keyword 8 |
| Keyword 4 | Keyword 9 |
| Keyword 5 | Keyword 10 |

User Defined Criteria 1:
User Defined Criteria 2:
User Defined Criteria 3:
User Defined Criteria 4:

TABLE 1-continued

User Defined Criteria 5:
Book Summary/Description:
User Entered Notes:
Audio file:
Link to audio file:

During the conversion, a selection process 1178 detects if the user has selected pause section 1202. In response, a halt process 1180 stops the text-to-speech conversion of the selected text. When the user selects a resume section 1204, as detected by a selection process 1182, the conversion process 1176 resumes the text-to-speech conversion of the selected text at a point where it was stopped. A decision process 1184 determines if the user has closed the displayed electronic book and, if so, a return process 1186 returns to the main menu to the display screen 1100. A user may close a displayed electronic book by selecting an icon displayed on the screen, for example, or by entering via a keyboard or other device a particular command.

In addition, a user may request and receive a definition, in speech form, of a word selected in the text. After selecting a word or words in the selection process 1168, a user selection process 1161 receives a user's selection of a define section 1207. In response, a decision process 1163 determines if text is selected; if not, display process 1174 displays the optional error message. If text is selected, a retrieve process 1165 retrieves a definition for the selected word or words from an electronic dictionary, and a conversion process 1167 converts the definitions from an electronic dictionary to speech form. Electronic dictionaries are known in the art and an example includes the system disclosed in U.S. Pat. No. 4,831,654, entitled APPARATUS FOR MAKING AND EDITING DICTIONARY ENTRIES IN A TEXT TO SPEECH CONVERSION SYSTEM, which is incorporated herein by reference. During the conversion, a user may select the pause section 1202, as detected by the selection process 1169, and in response a halt process 1171 stops the speech-four definition. When a user selects the resume section 1204, as detected by a selection process 1173, the conversion process 1167 continues to provide the speech-form definition of the selected word or words at a point where it was stopped.

Figure 25:
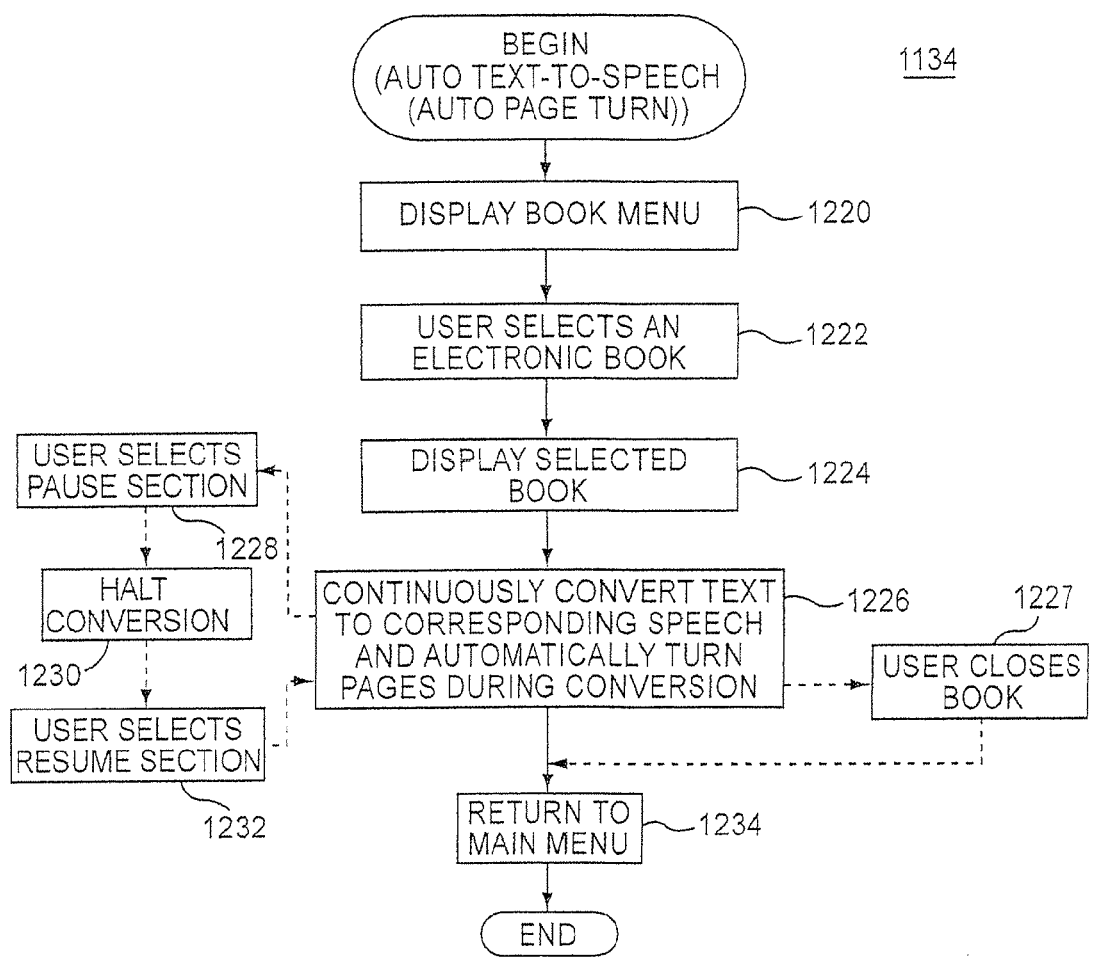
FIG. 25 is a flow chart of an automatic text-to-speech routine with an automatic page turn feature.

FIG. 25 is a flow chart of auto text-to-speech routine 1134 with an auto page turn feature. Auto text-to-speech routine 1134 may be implemented within the viewer 266, the library 262, or a combination; for example, it may be implemented by software modules residing within the instruction memory unit 632 for execution by the library processor 628 or within the instruction memory 732 for execution by the viewer processor 621 using software modules, or by hardware modules, or a combination of hardware and software modules. In the auto text-to-speech routine 1134, a display process 1220 displays a book menu, such as the book menu screen 1190. A selection process 1222 receives a user's selected book from the book menu, and in response a display process 1224 displays the selected electronic book such as in the text screen 1200 shown.

A conversion process 1226 continuously converts text to speech in the displayed book from page to page using, for example, a text-to-speech conversion program. In addition, the conversion process 1226 automatically turns the pages to display a current page for which text-to-speech conversion occurs. Text-to-speech conversion programs are known in the art and examples include those programs disclosed in the text-to-speech conversion program patents identified above and the products developed by the AT&T Advanced Speech Products Group. Alternatively, the header file for the electronic book may contain an audio file of the text of the electronic book, or a link to such a file, for presentation of the text in speech form. During the conversion, a user may select the pause section 1202, as detected by a selection process 1228, and in response a halt process 1230 stops the text-to-speech conversion. If a user selects the resume section 1204, as detected by a selection process 1232, the conversion process 1226 resumes the text-to-speech conversion at a point where it was stopped. Once the entire electronic book has been converted, or the user closes the electronic book as determined by a close book process 1227, a return process 1234 returns to the main menu to display the main menu screen 1100 (shown in FIG. 9).

Figure 26:
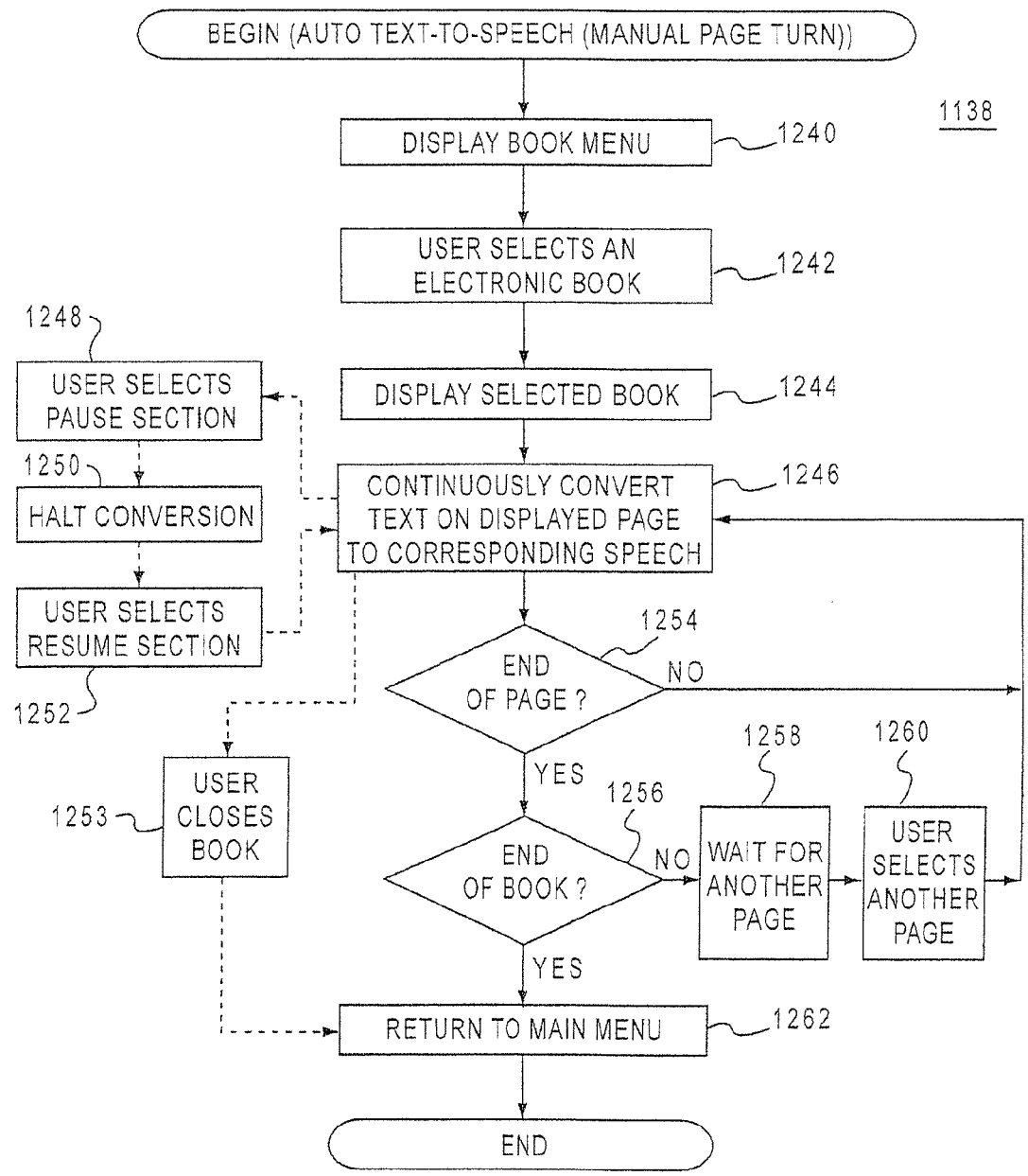
FIG. 26 is a flow chart of an automatic text-to-speech routine with a manual page turn feature.

FIG. 26 is a flow chart of auto text-to-speech routine 1138 with a manual page turn feature. Auto text-to-speech routine 1138 may be implemented within the viewer 266, the library 262, or a combination; for example, it may be implemented by software Modules residing within the instruction memory unit 632 for execution by the library processor 628 or within the instruction memory 732 for execution by the viewer processor 621, or by hardware modules, or a combination of hardware and software modules. In the auto text-to-speech routine 1138, a display process 1240 displays a book menu, such as book menu screen 1190. A selection process 1242 receives a user's selected book from the book menu, and in response a display process 1244 displays the selected electronic book such as in the text screen 1200.

A conversion process 1246 continuously converts text to speech in the displayed book from the displayed page using, for example, a text-to-speech conversion program. Text-to-speech conversion programs are known in the art and examples include those programs disclosed in the text-to-speech conversion program patents identified above and the products developed by the AT&T Advanced Speech Products Group. Alternatively, the header file for the electronic book may contain a separate audio file of the text of each page of the electronic book, or links to such files, for presentation of the text in speech form for the pages as selected by a user. In particular, when a user selects a particular page, the conversion process 1246 may retrieve the corresponding audio file to present the text on that page in speech form. A decision process 1254 determines if the text-to-speech conversion has reached the end of the displayed page and, if not, the conversion continues for the displayed page. During the conversion, the user may select pause section 1202, as detected by a selection process 1248, and in response a halt process 1250 stops the text-to-speech conversion. If a user selects the resume section 1204, as detected by a selection process 1252, the conversion process 1246 resumes the text-to-speech conversion at a point where it was stopped.

Once the textual content of the current page of the displayed electronic book has been converted, as determined by decision process 1254, a decision process 1256 determines if the end of the book is displayed. If the electronic book has more pages for display, a wait process 1258 waits for the user to select another page. A selection process 1260 receives the user's next selected page and in response returns to conversion process 1246 to perform text-to-speech conversion for the next displayed page using, for example, a text-to-speech program, as are known in the art, or using corresponding audio files. If the end of the book is displayed, as determined by decision process 1256, or if the user closes the book as determined by a close book process 1253, a return process 1262 returns to the main menu to display the main menu screen 1100.

Figure 27:
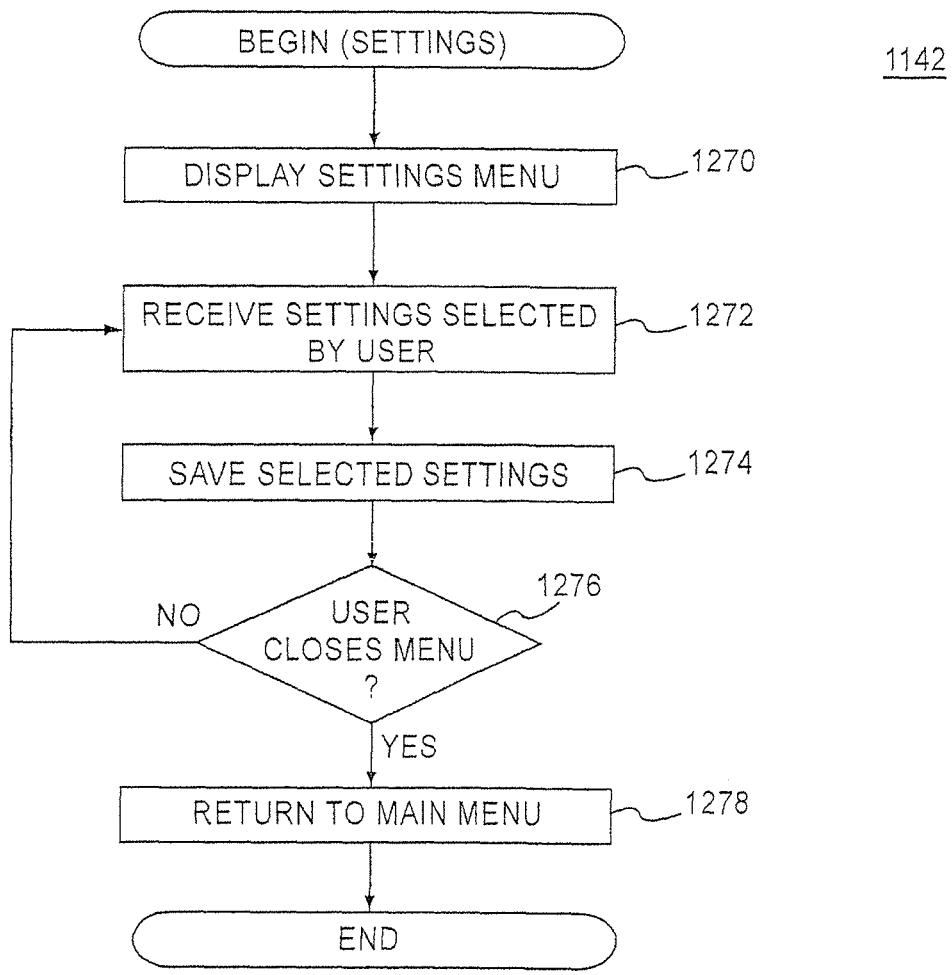
FIG. 27 is a flow chart of a settings routine.

FIG. 27 is a flow chart of a settings routine 1142. The settings routine 1142 may be implemented within the viewer 266, the library 262, or a combination; for example, it may be implemented by software modules residing within the instruction memory unit 632 for execution by the library processor 628 or within the instruction memory 732 for execution by the viewer processor 621, or by hardware modules, or a combination of hardware and software modules. In the settings routine 1142, a display process 1270 displays a settings menu.

Figure 28:
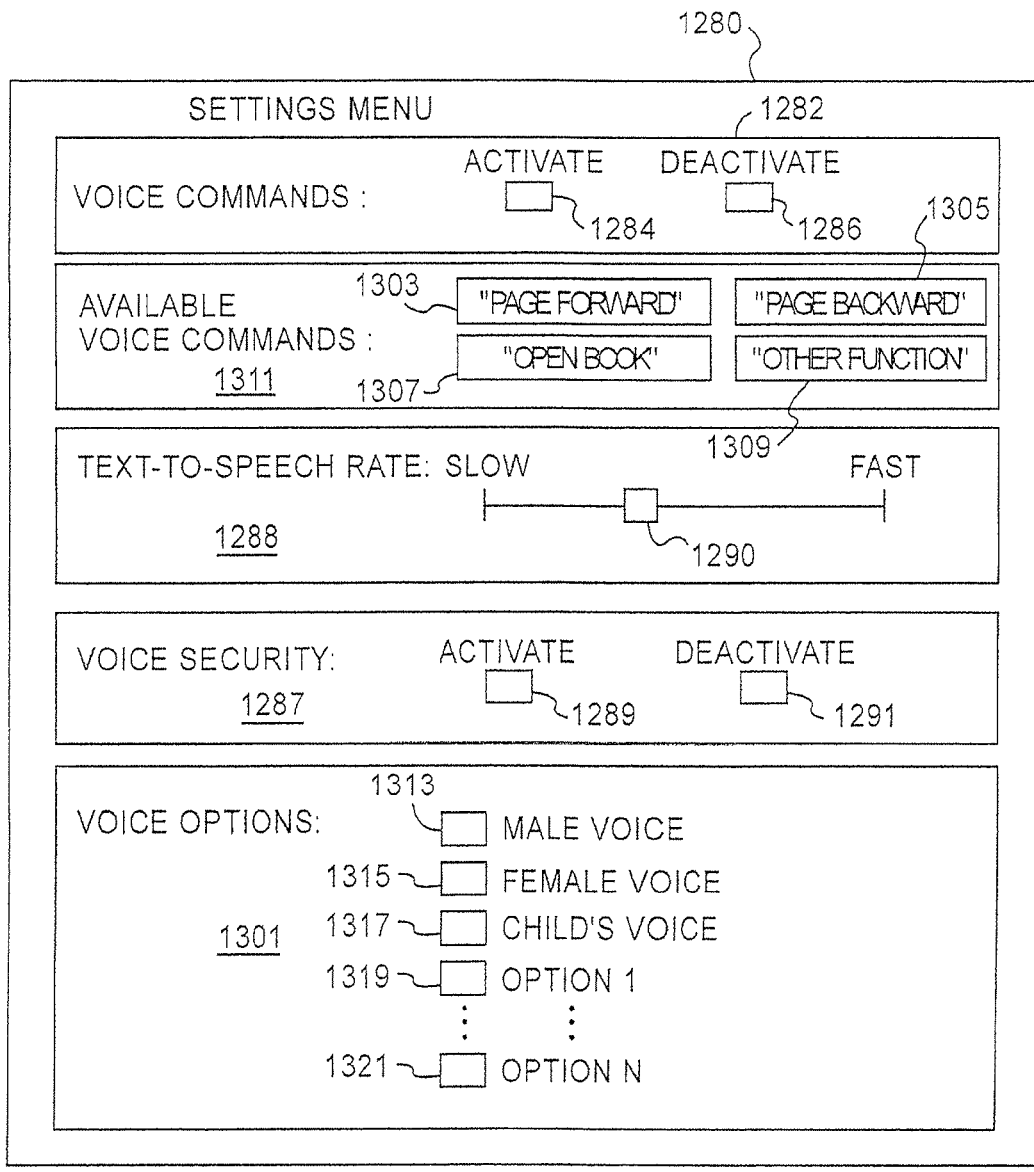
FIG. 28 is a diagram of a settings menu.

FIG. 28 illustrates an example of a settings menu screen 1280 for display on the viewer 266. The settings menu screen 1280 includes a voice commands section 1282 to activate and deactivate voice commands by selecting certain activate and deactivate sections 1284 and 1286, respectively. A user may select the activate or deactivate options by, for example, positioning a cursor over the corresponding section next to the desired option and selecting the section, or by entering various other commands such as a particular selection of input keys. Voice or audible commands are the ability of the viewer 266 to execute a function corresponding to a command provided by a user in speech form. The settings menu screen 1280 also includes an available voice commands section 1311, identifying voice or audible commands available to a user and the following exemplary speech required to execute the command: "page forward" command 1303; "page backward" command 1305; "open book" command 1307; and other functions 1309.

The settings menu screen 1280 also includes a rate section 1288 for setting a rate of text-to-speech conversion by manipulating a marker 1290 and moving the marker along the displayed rate scale. The term rate refers to the relative speed at which text is converted into corresponding speech. The machine speech conversion can be done electronically in advance, but the speech is provided at a certain pace determined by the user. Text-to-speech conversion programs, along with the ability to change a rate of the conversion, are known in the art and examples include the text-to-speech conversion program patents identified above and the products developed by the AT&T Advanced Speech Products Group.

A voice security section 1287 permits a user to activate and deactivate a voice security feature by selecting, respectively, sections 1289 and 1291. A voice security feature provides for activation of the viewer 266 and access to stored electronic books only in response to a voice command from a particular user or particular users.

The settings menu screen 1280 also includes a voice options section 1301 permitting a user to select various options for speech used to convert text. These options include, for example, a male voice 1313; a female voice 1315; a child's voice 1317; voice option 1 (1319); and voice option N (1321). A user may select one of these options by, for example, positioning a cursor over the corresponding section next to the desired option and selecting the section, or by entering various other commands such as a particular selection of input keys. Other options 1319 and 1321 may represent other types of voices such as user-defined voices, voices with particular characteristics, or the actual author's voice, for example. The other options 1319 and 1321 could also include the voice of a famous person, such as James Earl Jones or an imitation of James Earl Jones, for example. Text-to-speech conversion programs, along with varying types of voices for the conversion, are known in the art and examples include the text-to-speech conversion program patents identified above and the products developed by the AT&T Advanced Speech Products Group.

Once the text-to-speech process is executed in the viewer 266, the viewer may display a fixed (JPEG) or moving (MPEG 2) image. The displayed image may be retrieved by the viewer 266 from a specific database related to the electronic book being viewed. Alternatively, the viewer may access such an image using an electronic link. Use of electronic links in an electronic book are described in detail in copending patent application Ser. No. 09/237,828, entitled ELECTRONIC BOOKS ELECTRONIC LINKS, filed Jan. 27, 1999, the disclosure of which is hereby incorporated by reference.

As shown in FIG. 27, a receive process 1272 receives a user's selected settings in settings menu screen 1280. In response, a save process 1274 saves the selected settings for later use in providing text-to-speech functions or receiving voice commands. The settings may be saved in a table or other data structure in the instruction memory unit 632 or within the instruction memory 732 for use in controlling functions related to the electronic books. A decision process 1276 determines if the user closes settings menu screen 1280 and, if so, a return process 1278 returns to the main menu to display the main menu screen 1100.

Figure 29:
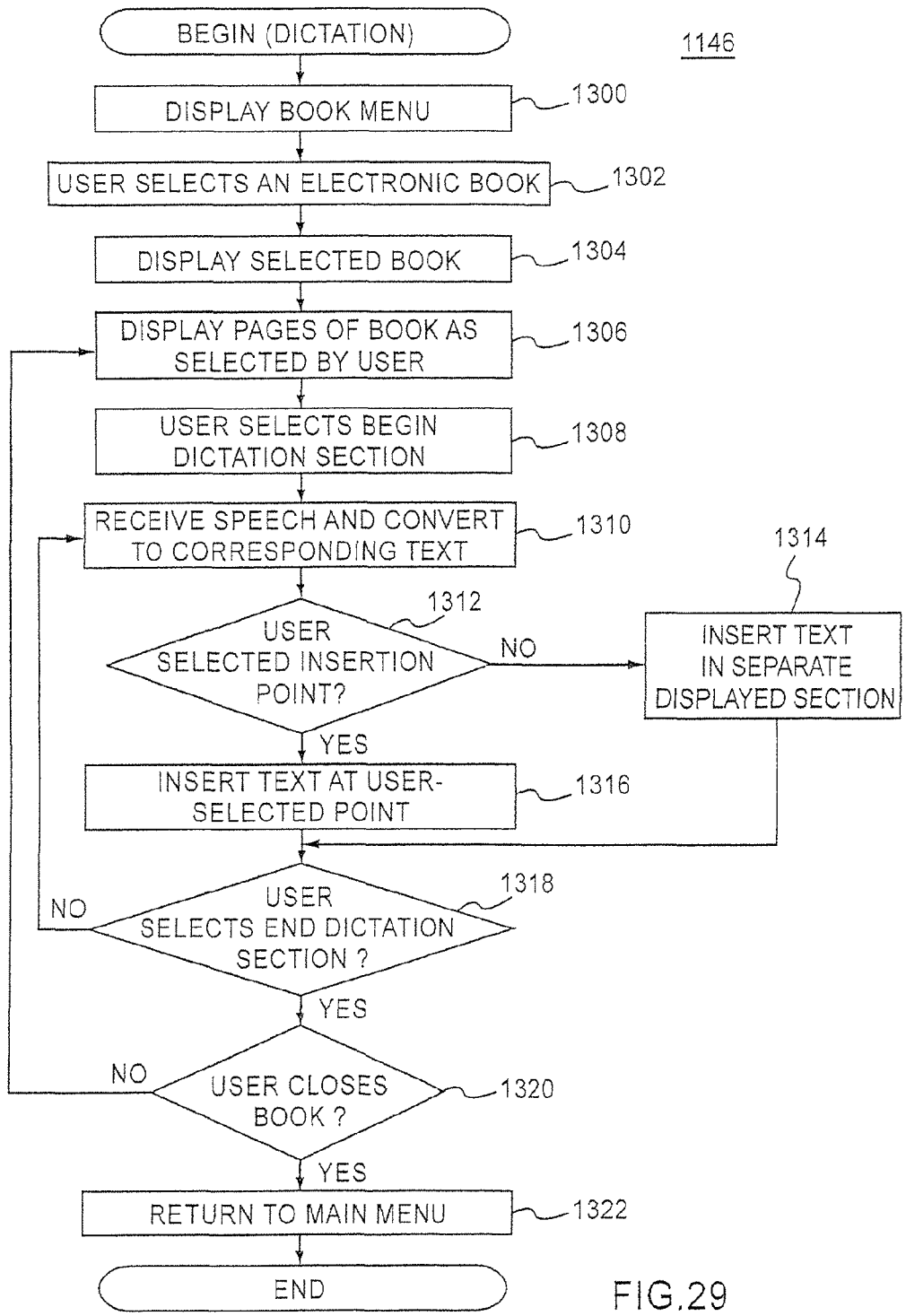
FIG. 29 is a flow chart of a dictation routine.

FIG. 29 is a flow chart of a dictation routine 1146. The dictation routine 1146 may be implemented within the viewer 266, the library 262, or a combination; for example, it may be implemented by software modules residing within the instruction memory unit 632 for execution by the library processor 628 or within the instruction memory 732 for execution by the viewer processor 621, or by hardware modules, or a combination of hardware and software modules. In the dictation routine 1146, a display process 1300 displays a book menu, such as book menu screen 1190. A selection process 1302 receives a user's selected book from the book menu, and in response a display process 1304 displays the selected electronic book. A display pages process 1306 displays pages of the electronic book as selected by the user.

FIG. 30a illustrates a text dictation screen 1330 for display on the viewer 266 and for use with a dictation routine 1146. The text dictation screen includes a page section 1336 for permitting the user to enter a page number and have that page displayed. Page turn sections 1338 and 1340 permit a user to page backward and forward, respectively, in the displayed electronic book. A begin dictation section 1332 permits a user to begin speech-to-text conversion, and an end dictation section 1334 permits a user to end speech-to-text conversion. Text dictation screen 1330 indicates that, when an insertion point is chosen by the user, speech is converted to text directly within the page of the displayed electronic book at, for example, location 1341. The text insertion point may be indicated by the user positioning a cursor 1343 to a desired location on the page. FIG. 30b illustrates that text dictation screen 1330 may also include a separate section 1342 for displaying text converted from speech, particularly when the user does not specify an insertion point.

A selection process 1308 detects when a user has selected the begin dictation section 1332. In response, a conversion process 1310 receives speech and converts it to corresponding text, and it may receive the speech from the user via speaker/microphone 608s. Speech-to-text and speech recognition programs are known in the art and examples include those programs disclosed in the following U.S. patents, which are incorporated herein by reference: U.S. Pat. No. 5,864,805, entitled METHOD AND APPARATUS FOR ERROR CORRECTION IN A CONTINUOUS DICTATION SYSTEM; U.S. Pat. No. 5,799,278, entitled SPEECH RECOGNITION SYSTEM AND METHOD USING A HIDDEN MARKOV MODEL; U.S. Pat. No. 5,615,299, entitled SPEECH REC- OGNITION USING DYNAMIC FEATURES; U.S. Pat. No. 5,325,462, entitled SYSTEM AND METHOD FOR SPEECH SYNTHESIS EMPLOYING IMPROVED FORMANT COMPOSITION; U.S. Pat. No. 5,313,531, entitled METHOD AND APPARATUS FOR SPEECH ANALYSIS AND SPEECH RECOGNITION; U.S. Pat. No. 5,054,074, entitled OPTIMIZED SPEECH RECOGNITION SYSTEM AND METHOD; U.S. Pat. No. 5,050,215, entitled SPEECH RECOGNITION METHOD; and U.S. Pat. No. 4,430,726, entitled DICTATION/TRANSCRIPTION METHOD AND ARRANGEMENT. Other examples include products developed by the AT&T Advanced Speech Products Group.

A decision process 1312 determines if the user has selected an insertion point for the text, which may be indicated by positioning the cursor. If the user has selected an insertion point, an insert process 1316 inserts the text at the user-selected point. Otherwise, if the user has not selected an insertion point, an insertion process 1314 may insert the text in the separate displayed section 1342. A decision process 1318 determines if the user has selected the end dictation section 1334. Until the user selects the end dictation section 1334, conversion process 1310 continues converting speech into text. When the user selects the end dictation section 1334, a decision process 1320 determines if the user has closed the book and, if not, the dictation routine 1146 returns to display pages process 1306 in order to continue displaying pages and converting speech into text as requested by the user. If the user closes the book, a return process 1322 returns to the main menu to display the main menu screen 1100.

Figure 31:
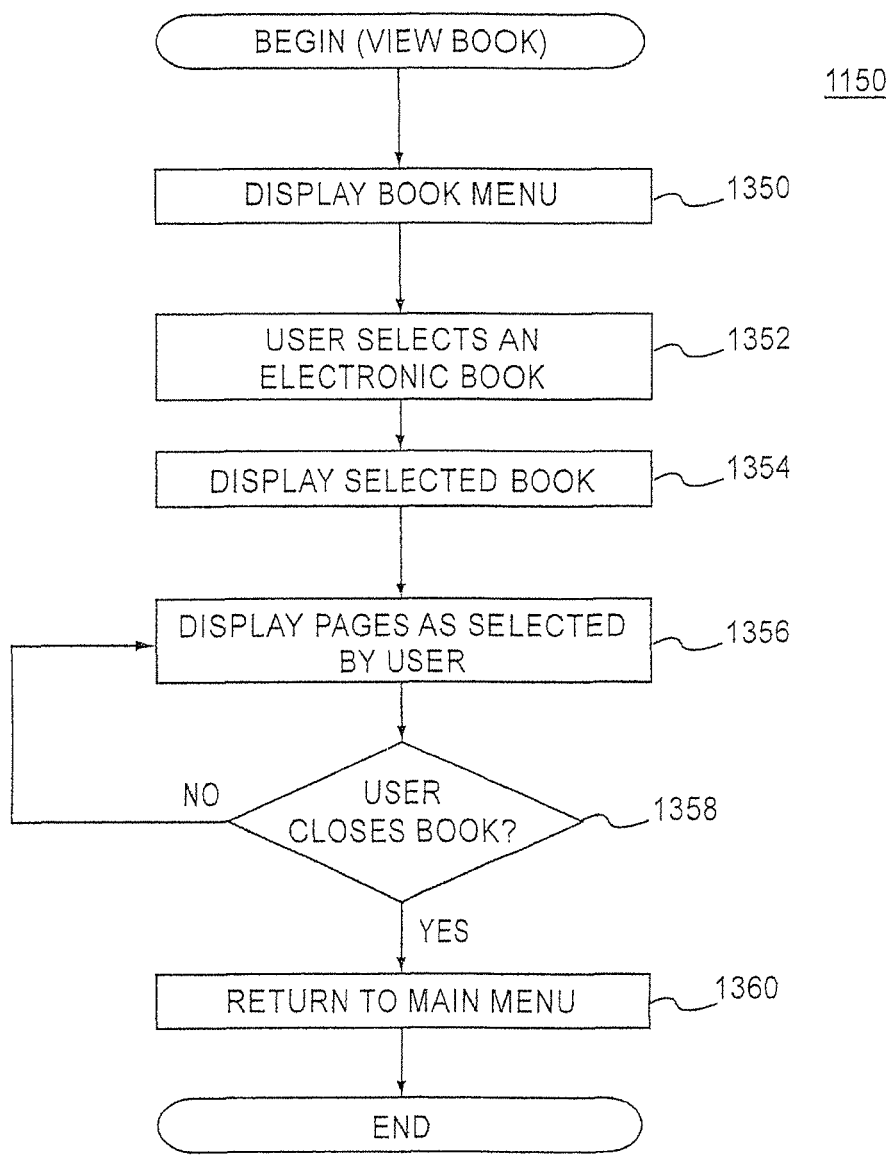
FIG. 31 is a flow chart of a view book routine.

FIG. 31 is a flow chart of a view book routine 1150. The view book routine 1150 may be implemented within the viewer 266, the library 262, or a combination; for example, it may be implemented by software modules residing within the instruction memory unit 632 for execution by the library processor 628 or within the instruction memory 732 for execution by the viewer processor 621, or by hardware modules, or a combination of hardware and software modules. In the view book routine 1150, a display process 1350a displays book menu, such as book menu screen 1190. A selection process 1352 receives a user's selected book from the book menu, and in response a display process 1354 displays the selected electronic book.

Figure 32:
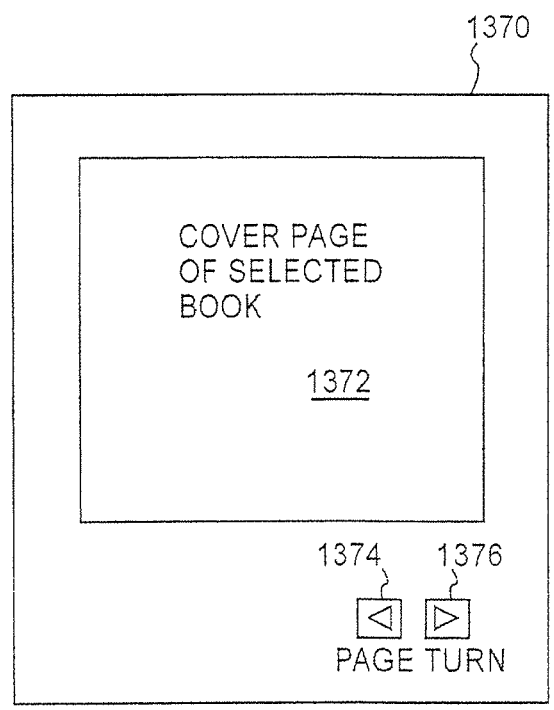
FIG. 32 is a diagram of a view book screen.

FIG. 32 illustrates an example of a view book screen 1370 for displaying on the viewer 266 a cover page 1372 of the selected electronic book. The view book screen 1370 also includes page backward section 1374 and page forward section 1376 for permitting a user to page backward and forward, respectively, within the displayed electronic book. A display pages process 1356 displays pages of the selected electronic book as requested by the user. A decision process 1358 determines if the user has closed the displayed electronic book and, if the user closes the book, a return process 1360 returns to the main menu to display the main menu screen 1100.

The viewer 266 may also incorporate text to speech conversion and text recognition features to guide the user through the menu system 851, shown in FIG. 13. For example, software resident on the viewer 266, or on another component of the home system 258 may be used to provide audio prompts related to menu navigation. When the user activates the menu system 851 and is presented with the main menu 854, the viewer 266 could provide an audio prompt such as: "Hello John. Do you want to order a new book or read an existing book? Please respond new book or existing book." If the user responds with "existing book," then the software operating on the viewer 266 may display the Books in Your Library sub-menu 872, and may provide further audio prompts.

Figure 33:
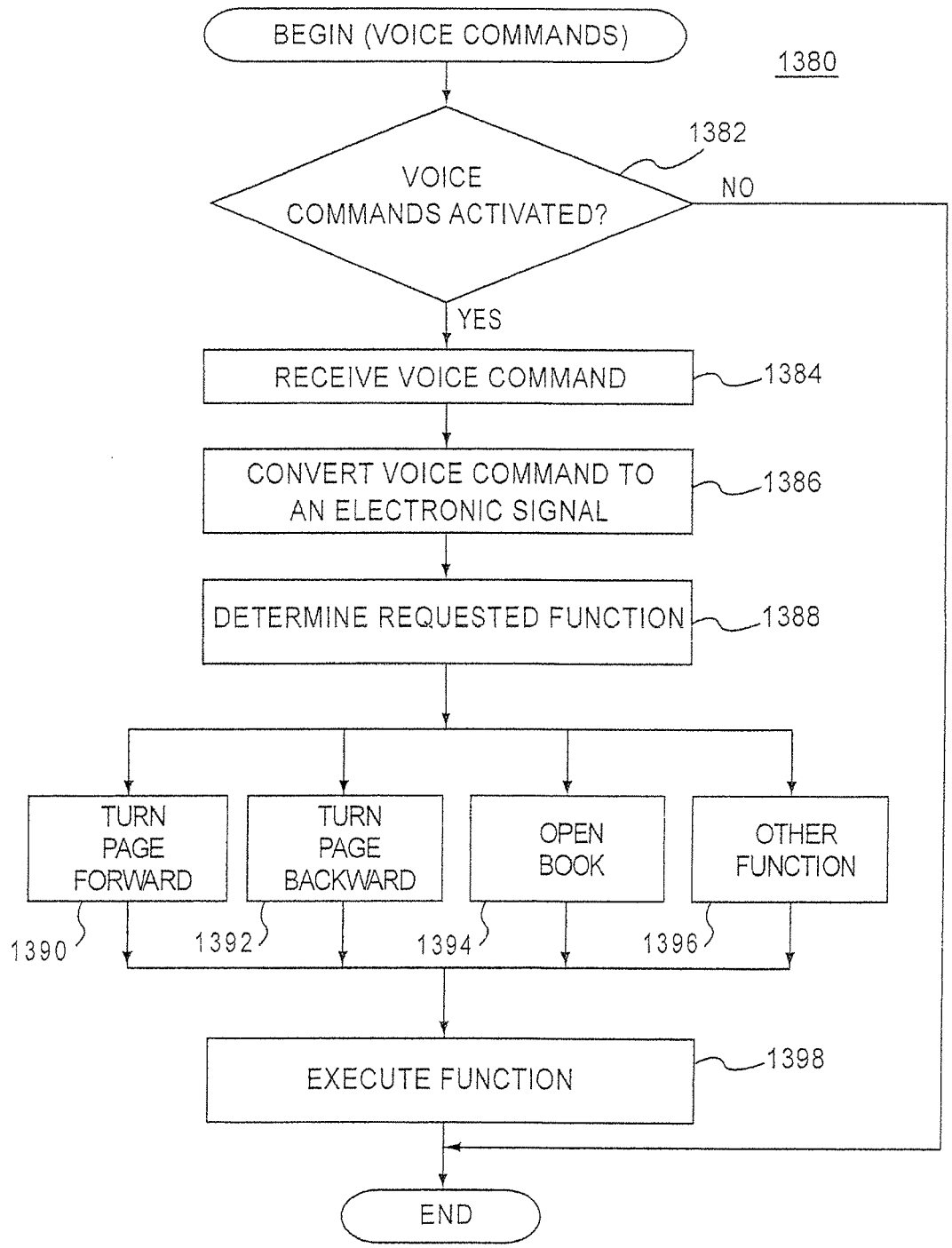
FIG. 33 is a flow chart of a voice commands routine.

FIG. 33 is a flow chart of a voice commands routine 1380. The voice commands routine 1380 may be implemented within the viewer 266, the library 262, or a combination; for example, it may be implemented by software modules residing within the instruction memory unit 632 for execution by the library processor 628 or within the instruction memory 732 for execution by the viewer processor 621, or by hardware modules, or a combination of hardware and software modules. This routine permits a user to enter commands via speech, rather than manipulating the viewer controls to enter commands. In the voice commands routine 1380, a decision process 1382 determines if the user has activated the voice commands option. If the option is activated, a receive process 1384 receives a voice command, and it may receive the voice command from a user via the microphone 634.

A conversion process 1386 converts the voice command to a corresponding electronic signal, and a determination process 1388 determines the requested function by analyzing the electronic signal. Examples of functions corresponding to the command include a turn page forward function 1390 for the viewer 266 to display the next page in the displayed electronic book; a turn page backward function 1392 for the viewer 266 to display the previous page in the displayed electronic book; an open book function 1394 for the viewer 266 to display a particular electronic book; or other functions 1396. After determining the requested function, an execute process 1398 executes the requested function. The viewer 266 may display typical voice command options available to assist the user in understanding the voice commands acted upon by the viewer 266 at a given point in time. The determination process 1388 may use speech recognition programs for the determination; such programs are known in the art and include those exemplary systems in the speech-to-text and speech recognition patents identified above and the products available from the AT&T Advanced Speech Products Group.

Figure 34:
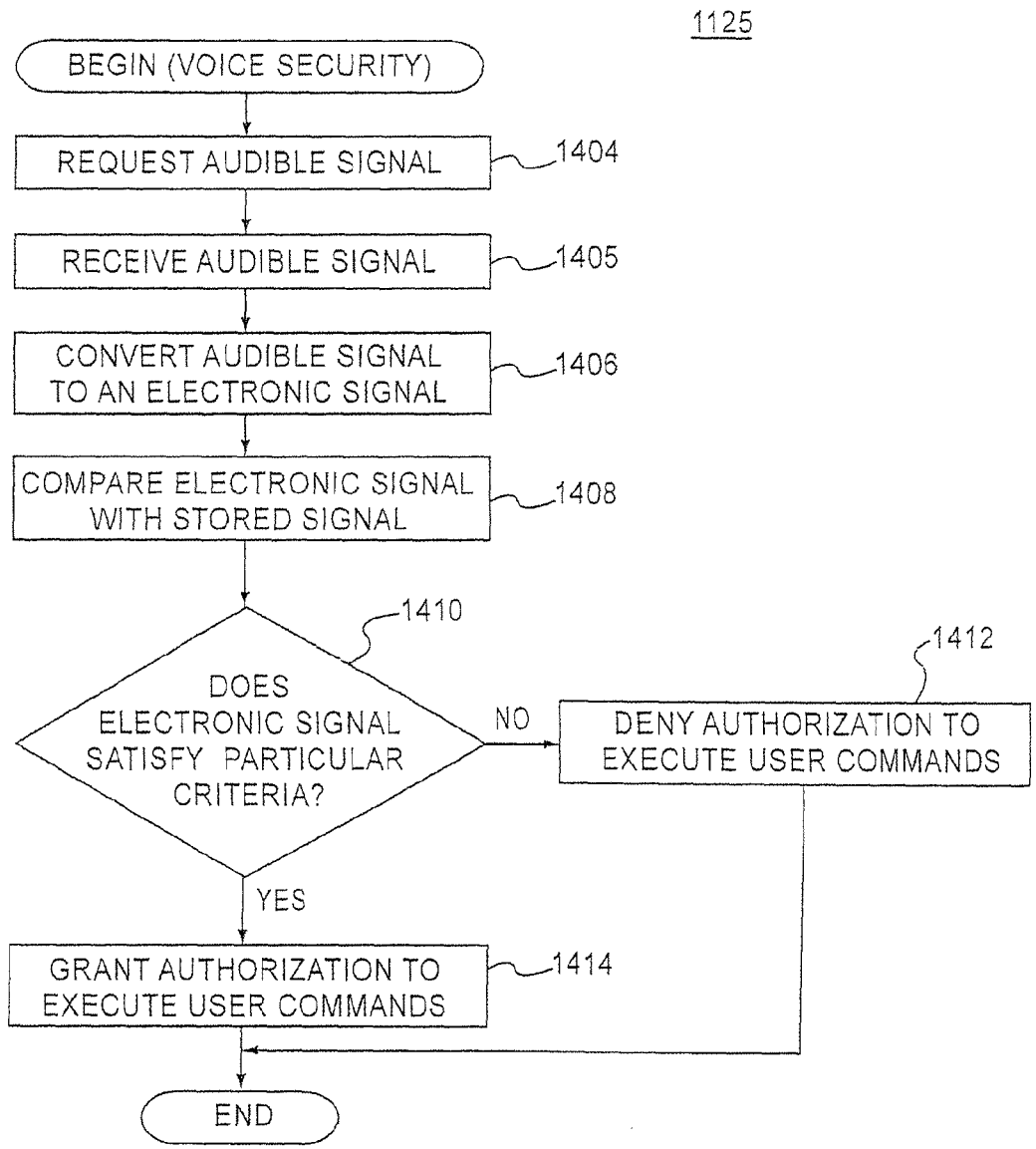
FIG. 34 is a flow chart of a voice security routine.

FIG. 34 is a flow chart of a voice security routine 1125. Voice security routine 1125 may be implemented within the viewer 266, the library 262, or a combination; for example, it may be implemented by software modules residing within the instruction memory unit 632 for execution by the library processor 628 or within the instruction memory 732 for execution by the viewer processor 621, or by hardware modules, or a combination of hardware and software modules. In a voice security routine 1125, a request process 1404 requests an audible signal for security purposes, and it may be requested via a screen on the viewer 266 or in audio form. A receive process 1405 receives the requested audible signal using the microphone 634, and a conversion process 1406 converts the audible signal to a corresponding electronic signal. A compare process 1408 compares the electronic signal with a stored signal, and a decision process 1410 determines if the electronic signal satisfies particular criteria in order to determine if the user has authorization for a requested function.

The decision process 1410 may use speech recognition programs for the determination; such programs are known in the art and include those exemplary systems in the speech-to-text and speech recognition patents identified above and the products available from the AT&T Advanced Speech Products Group. If the criteria are not satisfied, a deny process 1412 denies authorization to execute commands from the user and, if the criteria are satisfied, a grant process 1414 grants authorization to execute commands from the user. Main menu process 1120 uses the granted or denied status to determine whether to executed a user's requested function.

The viewer 266 may also include software that restricts access to specific electronic books based on recognizing a voice of a user. For example, the viewer 266 may determine that a particular user is a child, and then limit access to specific electronic books authorized by a parent for that child to view. Alternatively, the viewer could prevent access to specific electronic books designated by the parent. The same access limitation software may be used to limit access by two or more users to content in the viewer 266 or the home system 258. For example, two adult users of a same viewer 266 may limit access by agreeing that only a first adult user views books one through ten, a second adult user only views books eleven through 20, and that both adult users view books 21 through 30.

While this invention has been described in conjunction with the embodiments described above, it is evident that many alterations, modifications and variations will be apparent to those skilled in the art. Accordingly, embodiments of the invention as set forth above are intended to be only illustrative. Various changes may be made without departing from the scope of the invention as defined in the following claims and their equivalents.

The invention claimed is:

1. A method for receiving commands for executing functions related to an electronic book displayed on a viewer, comprising:
   displaying a page of an electronic book on a viewer;
   receiving an audible command relating to a function of the electronic book;
   converting the audible command into a corresponding electronic signal;
   determining the function by analyzing the electronic signal;
   providing authorization to execute the function only if the electronic signal satisfies a predefined criteria; and
   executing the function in response to the authorization and the electronic signal.

2. The method of claim 1, wherein the receiving step includes receiving a turn page command.

3. The method of claim 1, wherein the receiving step includes receiving an open book command.

4. The method of claim 1, further including displaying an indication of available audible commands.

5. A method for restricting access to an electronic book for display on a viewer, comprising:
   storing an electronic book for display on a viewer;
   receiving an audible command from a user relating to a function of the electronic book;
   converting the audible command into a corresponding electronic signal;
   determining the function by analyzing the electronic signal; and
   providing authorization to execute commands from the user relating to the electronic book only if the electronic signal satisfies a predefined criteria.

6. The method of claim 5, wherein the displaying step includes comparing the electronic signal to a stored electronic signal relating to the user.

7. An apparatus for receiving commands for executing functions related to an electronic book displayed on a viewer, comprising:
   a display that displays a page of an electronic book on a viewer;
   a receive module that receives an audible command relating to a function of the electronic book;
   a conversion module that converts the audible command into a corresponding electronic signal;
   a determination module that determines the function by analyzing the electronic signal;
   an authorization module that provides authorization to execute the function only if the electronic signal satisfies a predefined criteria; and
   an execute module that executes the function in response to the authorization and the electronic signal.

8. The apparatus of claim 7, wherein the receive module includes a page turn module that receives a turn page command.

9. The apparatus of claim 7, wherein the receive module includes an open book module that receives an open book command.

10. The apparatus of claim 7, further including a display commands module that displays an indication of available audible commands.

11. An apparatus for restricting access to an electronic book for display on a viewer, comprising:
    a store module that stores an electronic book for display on a viewer;
    a receive module that receives an audible command from a user relating to a function of the electronic book;
    a conversion module that converts the audible command into a corresponding electronic signal;
    a determination module that determines the function by analyzing the electronic signal; and
    an authorization module that provides authorization to execute commands from the user relating to the electronic book only if the electronic signal satisfies a predefined criteria.

12. The apparatus of claim 11, further comprising a display module, wherein the display module includes a compare module that compares the electronic signal to a stored electronic signal relating to the user.

* * * * *